APPARATUS AND METHOD FOR ASSEMBLING FOUNDRY MOLDS

Original Filed Dec. 15, 1950

21 Sheets-Sheet 1

INVENTORS
S. C. Northington, Jr.
J. A. Lasater
BY C. F. Bryant
ATTORNEY

INVENTORS
S. C. Northington, Jr.
J. A. Lasater
BY
C. F. Bryant
ATTORNEY

INVENTORS
S. C. Northington, Jr.
J. A. Lasater
BY C. F. Bryant
ATTORNEY

APPARATUS AND METHOD FOR ASSEMBLING FOUNDRY MOLDS

INVENTORS
S. C. Northington, Jr.
J. A. Lasater
BY C. F. Bryant
ATTORNEY

Sept. 9, 1958 S. C. NORTHINGTON, JR., ET AL 2,850,775

APPARATUS AND METHOD FOR ASSEMBLING FOUNDRY MOLDS

Original Filed Dec. 15, 1950 21 Sheets-Sheet 5

INVENTORS
S. C. Northington, Jr
J. A. Lasater
BY C. F. Bryant
ATTORNEY

INVENTORS
S. C. Northington, Jr.
J. A. Lasater
BY
R. F. Bryant
ATTORNEY

Sept. 9, 1958 S. C. NORTHINGTON, JR., ET AL 2,850,775

APPARATUS AND METHOD FOR ASSEMBLING FOUNDRY MOLDS

Original Filed Dec. 15, 1950 21 Sheets-Sheet 7

INVENTORS
S. C. Northington, Jr.
J. A. Lasater
BY C. F. Bryant
ATTORNEY

Sept. 9, 1958 S. C. NORTHINGTON, JR., ET AL 2,850,775

APPARATUS AND METHOD FOR ASSEMBLING FOUNDRY MOLDS

Original Filed Dec. 15, 1950 21 Sheets-Sheet 8

INVENTORS
S. C. Northington, Jr.
J. A. Lasater
BY C. F. Bryant
ATTORNEY

Sept. 9, 1958 S. C. NORTHINGTON, JR., ET AL 2,850,775

APPARATUS AND METHOD FOR ASSEMBLING FOUNDRY MOLDS

Original Filed Dec. 15, 1950

21 Sheets-Sheet 9

INVENTORS
S. C. Northington, Jr.
J. A. Lasater

BY C. F. Bryant
ATTORNEY

Sept. 9, 1958 S. C. NORTHINGTON, JR., ET AL 2,850,775

APPARATUS AND METHOD FOR ASSEMBLING FOUNDRY MOLDS

Original Filed Dec. 15, 1950

21 Sheets-Sheet 10

INVENTORS
S. C. Northington, Jr.
J. A. Lasater
BY C. F. Bryant
ATTORNEY

INVENTORS
S. C. Northington, Jr.
J. A. Lasater
BY
C. F. Bryant
ATTORNEY

Sept. 9, 1958 S. C. NORTHINGTON, JR., ET AL 2,850,775

APPARATUS AND METHOD FOR ASSEMBLING FOUNDRY MOLDS

Original Filed Dec. 15, 1950

21 Sheets-Sheet 12

INVENTORS
S. C. Northington, Jr.
J. A. Lasater
BY
C. F. Bryant
ATTORNEY

INVENTORS
S. C. Northington, Jr.
J. A. Lasater
BY C. F. Bryant
ATTORNEY

Sept. 9, 1958 S. C. NORTHINGTON, JR., ET AL 2,850,775

APPARATUS AND METHOD FOR ASSEMBLING FOUNDRY MOLDS

Original Filed Dec. 15, 1950 21 Sheets-Sheet 14

INVENTORS
S. C. Northington, Jr.
J. A. Lasater
BY
C. F. Bryant
ATTORNEY

INVENTORS
S. C. Northington, Jr.
J. A. Lasater
BY C. F. Bryant
ATTORNEY

Sept. 9, 1958 S. C. NORTHINGTON, JR., ET AL 2,850,775

APPARATUS AND METHOD FOR ASSEMBLING FOUNDRY MOLDS

Original Filed Dec. 15, 1950

21 Sheets-Sheet 16

Operation Diagram for "Core Box Off" Station III

INVENTORS
S. C. Northington, Jr.
J. A. Lasater

BY C. F. Bryant
ATTORNEY

INVENTORS
S. C. Northington, Jr.
J. A. Lasater
BY
C. F. Bryant
ATTORNEY

Sept. 9, 1958 S. C. NORTHINGTON, JR., ET AL 2,850,775

APPARATUS AND METHOD FOR ASSEMBLING FOUNDRY MOLDS

Original Filed Dec. 15, 1950 21 Sheets-Sheet 18

Operation Diagram for "Mold Off" Station V

INVENTORS
S. C. Northington, Jr.
J. A. Lasater
BY C. F. Bryant
ATTORNEY

Sept. 9, 1958 S. C. NORTHINGTON, JR., ET AL 2,850,775

APPARATUS AND METHOD FOR ASSEMBLING FOUNDRY MOLDS

Original Filed Dec. 15, 1950 21 Sheets-Sheet 19

Fig. 57. Hydraulic Motors on Machine Turret and Control Valves Therefor

INVENTORS
S. C. Northington, Jr.
J. A. Lasater
BY
C. F. Bryant
ATTORNEY

Control for Turret Indexing and Stop Cylinders plus Carriage Cylinders at Stations and Core Box Turn Over INVENTORS
S. C. Northington, Jr.
J. A. Lasater
BY C. F. Bryant
ATTORNEY

APPARATUS AND METHOD FOR ASSEMBLING FOUNDRY MOLDS

Original Filed Dec. 15, 1950 21 Sheets-Sheet 21

INVENTORS
S. C. Northington, Jr.
J. A. Lasater
BY
C. F. Bryant
ATTORNEY

United States Patent Office 2,850,775
Patented Sept. 9, 1958

2,850,775

APPARATUS AND METHOD FOR ASSEMBLING FOUNDRY MOLDS

Samuel C. Northington, Jr., Lookout Mountain, and John A. Lasater, Chattanooga, Tenn., assignors to Combustion Engineering, Inc., New York, N. Y., a corporation of Delaware Continuation of application Serial No. 200,899, December 15, 1950. This application May 31, 1955, Serial No. 511,941

57 Claims. (Cl. 22—31)

The present application is a continuation of and replaces an original application Serial No. 200,899 filed December 15, 1950 in the names of Samuel C. Northington, Jr. and John A. Lasater and entitled "Apparatus and Method for Assembling Foundry Molds," now abandoned.

This invention relates to the preparation and assembly of foundry molds and it has special reference to an improved method of and to novel apparatus for preparing and assembling molds such as are used to cast soil pipe fittings and other metal parts of either hollow or solid formation.

Broadly stated, the object of this invention is to prepare and assemble such molds faster and more efficiently than has been possible heretofore.

A more specific object is to raise the casting output attainable within a given area of foundry floor space.

Another object is to cut down both the time and the labor needed to assemble the mold components.

A further object is to remove the limitation in casting production speed previously imposed by such required time and labor and to provide a continuous mold assembling cycle from which a high rate of casting production is possible.

A still further object is uniquely to coordinate the mold preparing and assembling operations so that a majority thereof can be performed mechanically and more or less automatically without difficult manual handling and so that a high degree of skill on the part of operating personnel will not be called for.

An additional object is to provide mold assembling mechanism of new and improved form and novelly to organize same for reliable automatic operation with a minimum of attention by operating personnel.

A still more specific object is to make unnecessary a manual lifting of the heavy flask parts incident to charging the drag and the cope with the sand by which the pattern impression is received, to forming the core (when used) and placing same within the pattern cavity of the drag, to placing the sand-charged cope on top of the so-prepared drag, to moving the thus-assembled mold into position for receiving molten metal from a pouring ladle, to breaking the mold up into its component parts before and after removing the solidified casting therefrom, and then making those parts (including drag, cope, core box and sand) available for re-use in the preparation and assembly of a new mold.

Other objects and advantages will become apparent as the disclosure and description hereof proceeds.

One illustrative form of apparatus provided by us for practicing this invention is shown by the accompanying drawings wherein.

Figure 1:
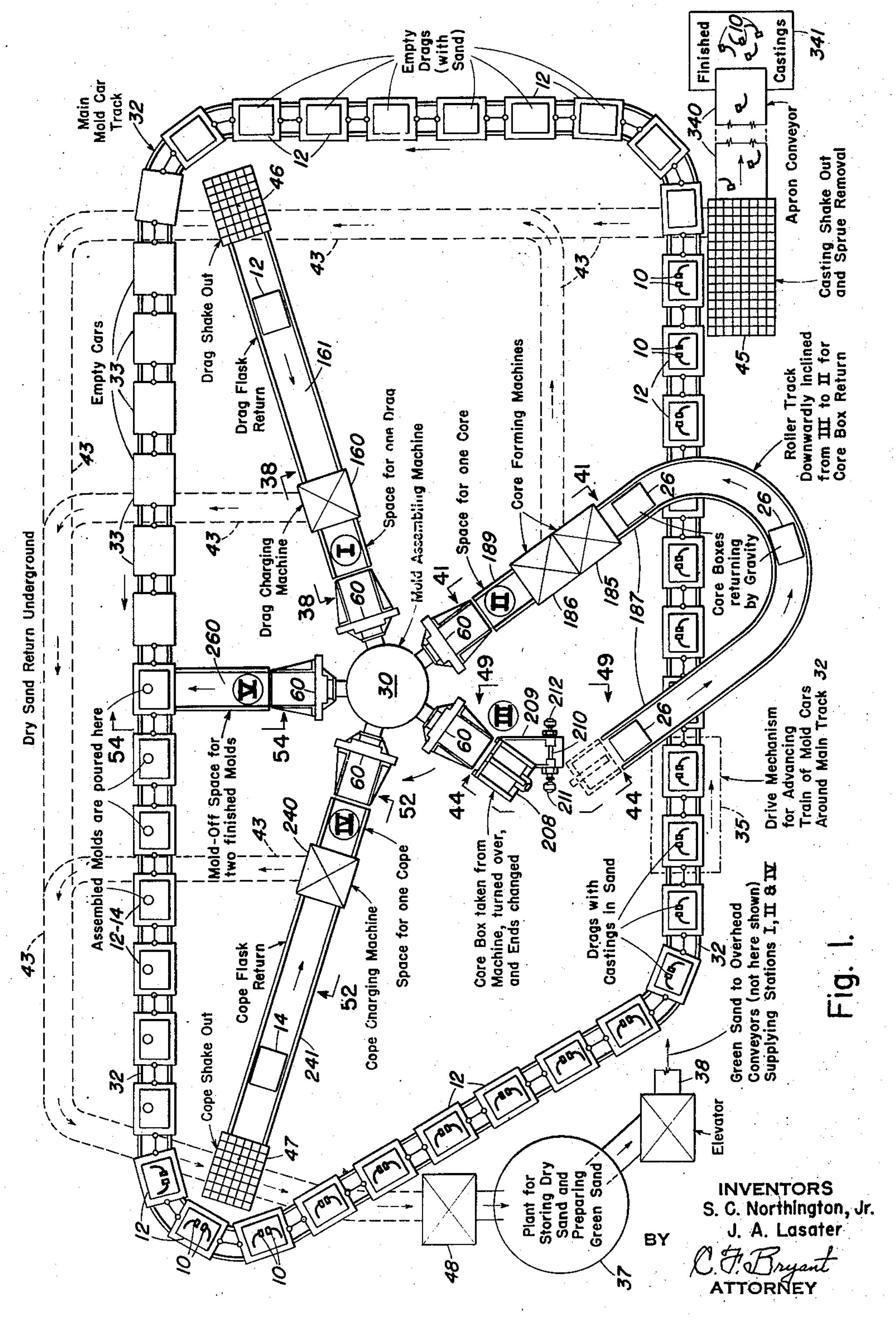
Fig. 1 is a top plan view of a mold assembling installation incorporating our inventive improvements and comprising a central indexing machine surrounded by five cooperating stations which supply the machine with sand-charged drag flasks and cope flasks plus green sand cores and which receive therefrom assembled molds ready for pouring.
Figure 2:
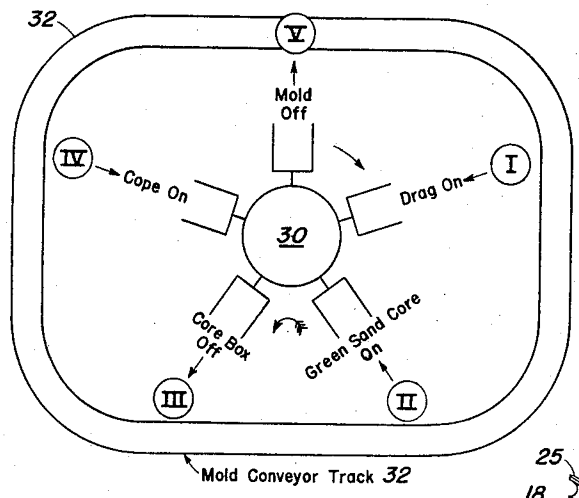
Fig. 2 is a simplified diagram of the operations taking place at the aforesaid five stations with which the central indexing machine of Fig. 1 is provided.
Figures 8, 9, 10:
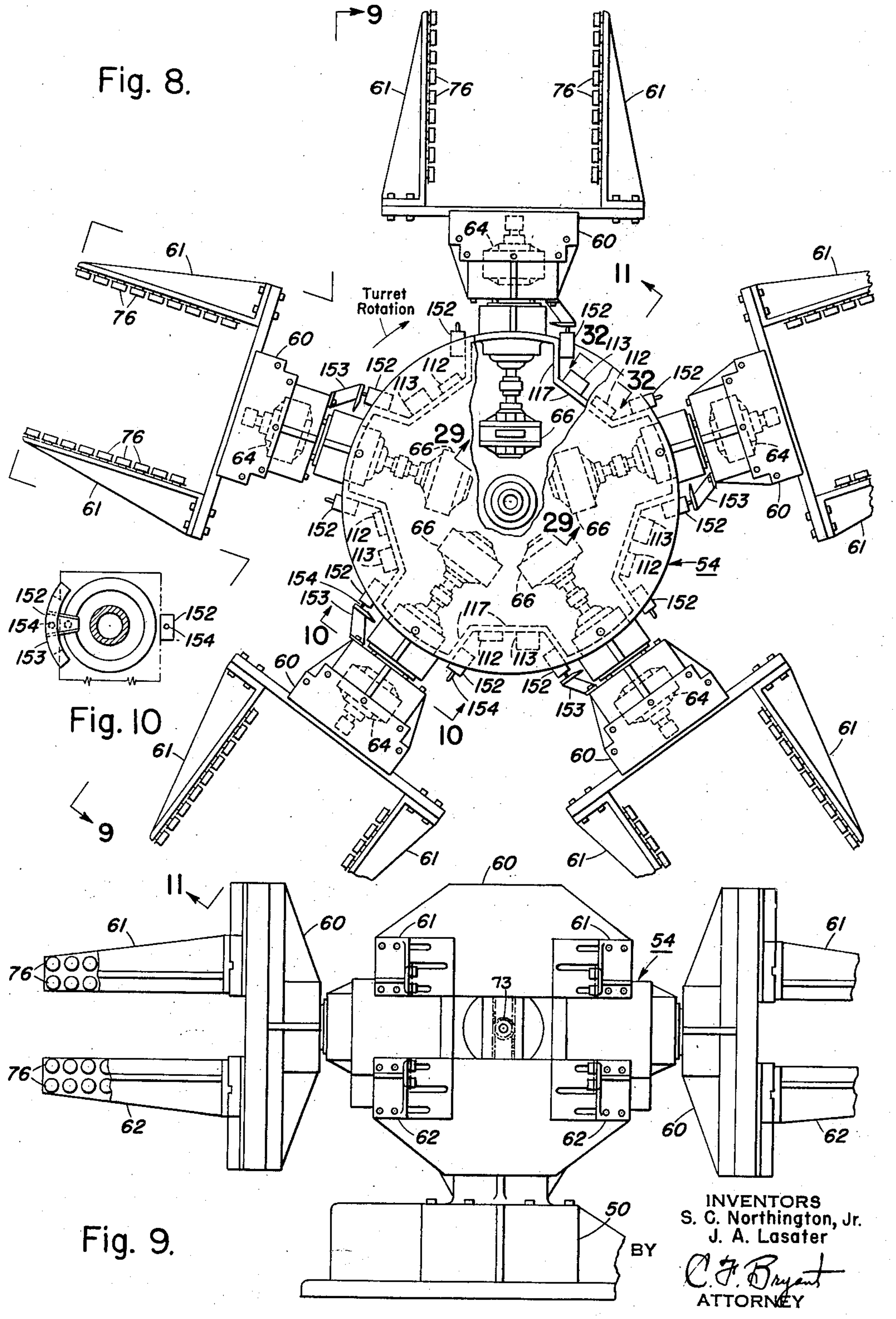
Fig. 8 is a top plan view showing the central mold assembling machine of Fig. 1 to enlarged scale and indicating certain details of the five sets of flask and core box receiving arms with which the machine is provided.
Fig. 9 is a view in elevation from line 9—9 of Fig. 8 showing the central turret and one set of arms viewed from the end plus two other sets of arms viewed from the side.
Fig. 10 is a view on line 10—10 of Fig. 8 showing speed-adjusting mechanism for one of the arm roll-over motors.
Figures 11, 12, 13:
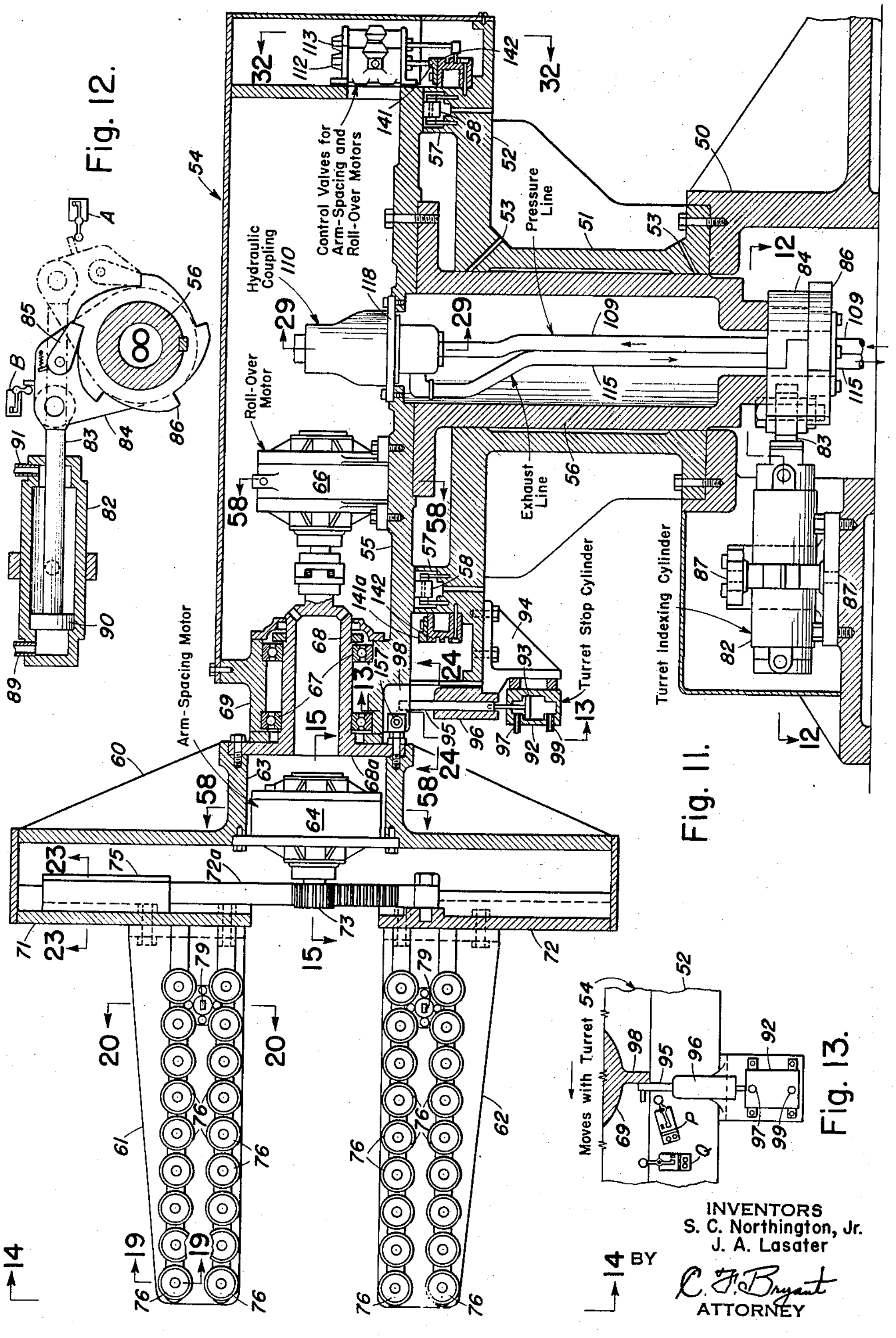
Fig. 11 is a further enlarged view in vertical section on line 11—11 of Fig. 8 showing the two hydraulic motors for respectively moving one set of the arms together and apart and turning over the arm-carrying head, and also showing the hydraulic apparatus by which the assembling machine turret is rotated and stopped.
Fig. 12 is a view, partly in section and partly in plan, on line 12—12 of Fig. 11 showing further details of the turret indexing cylinder.
Fig. 13 is a view on line 13—13 of Fig. 11 showing further details of the turret stop cylinder.
Figure 16:
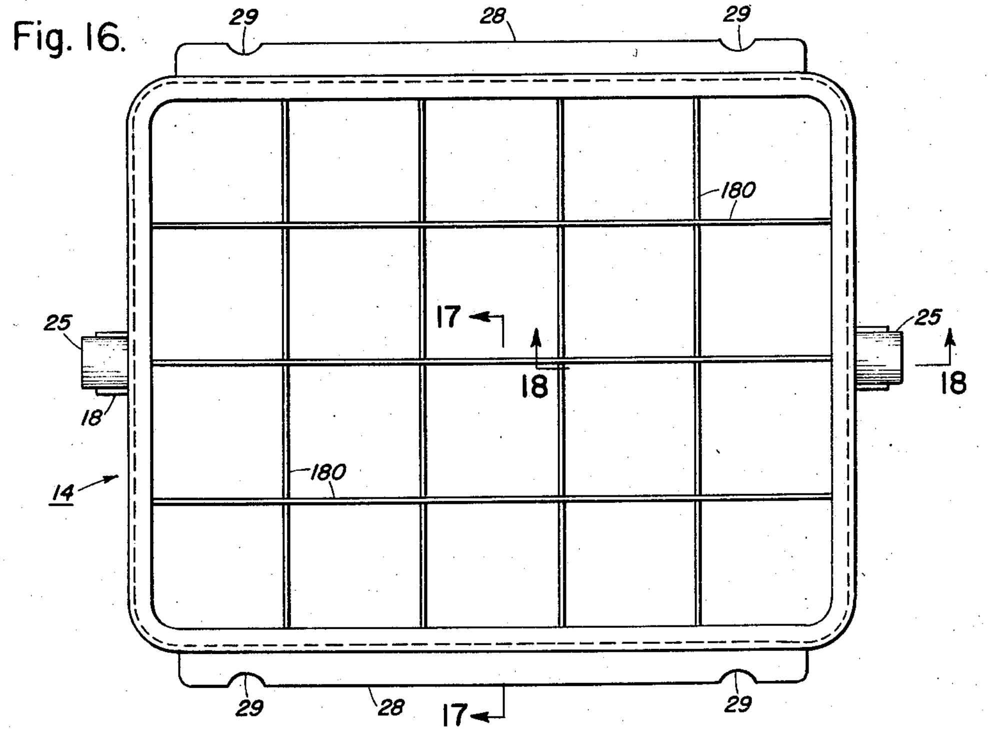
Fig. 16 is a top plan view of the top flask or "cope" portion of a typical mold which the machine of the earlier drawing views is designed automatically to assemble.
Figures 17, 18:
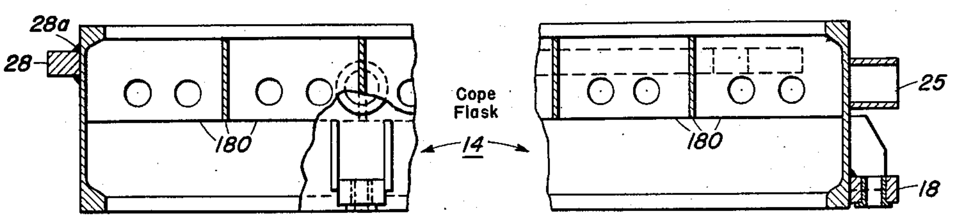
Fig. 17 is a section on line 17—17 through one side of the flask of Fig. 16 showing further details thereof.
Figures 17A, 18A:
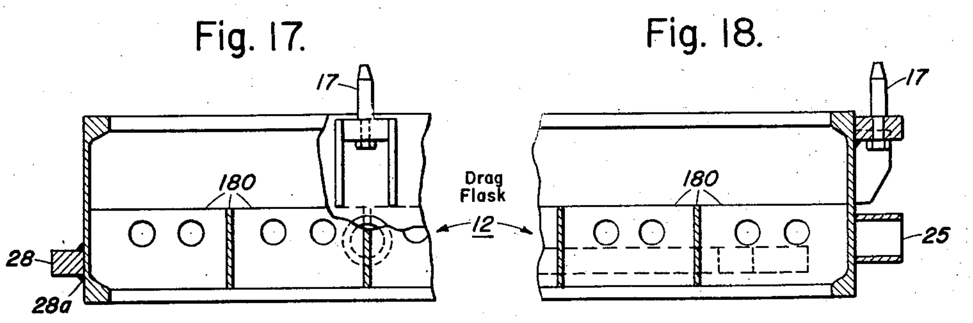
Figure 21:
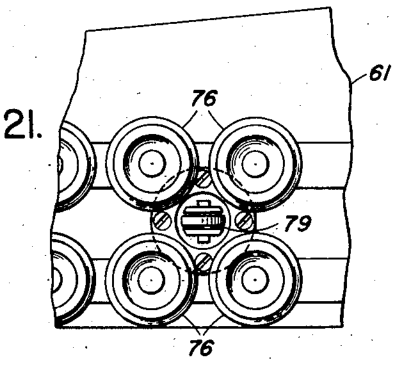
Figure 20:
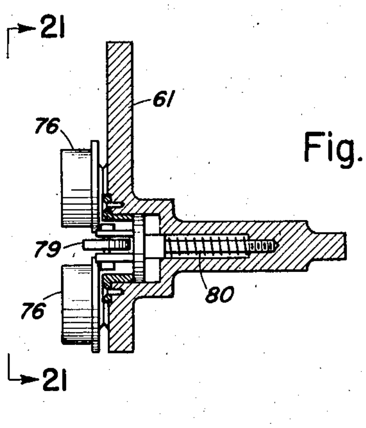
Figure 24:
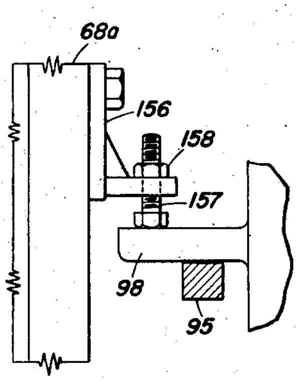
Figure 23:
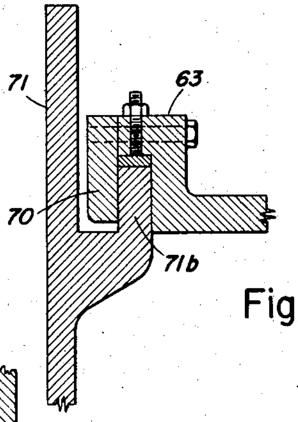
Figure 22:
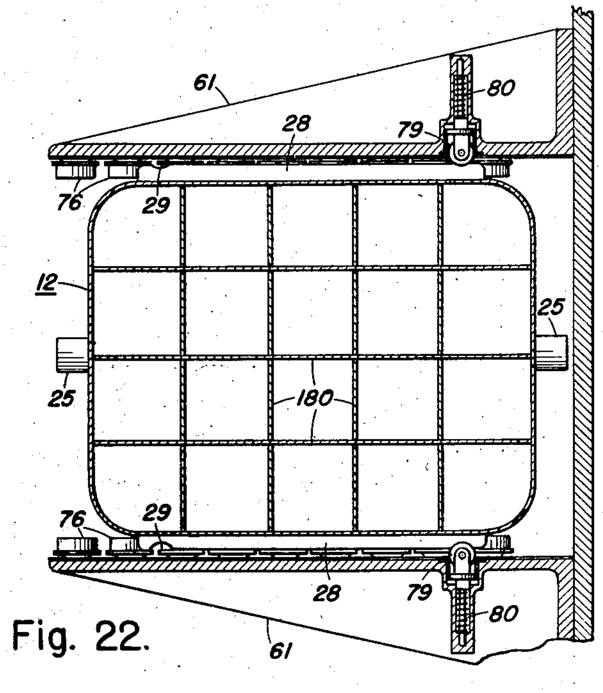
Figure 19:
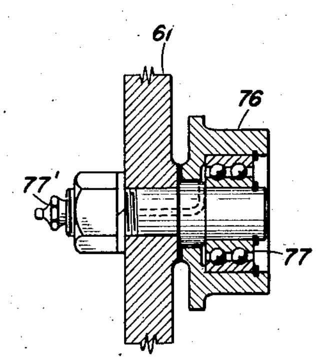
Figures 25, 26:
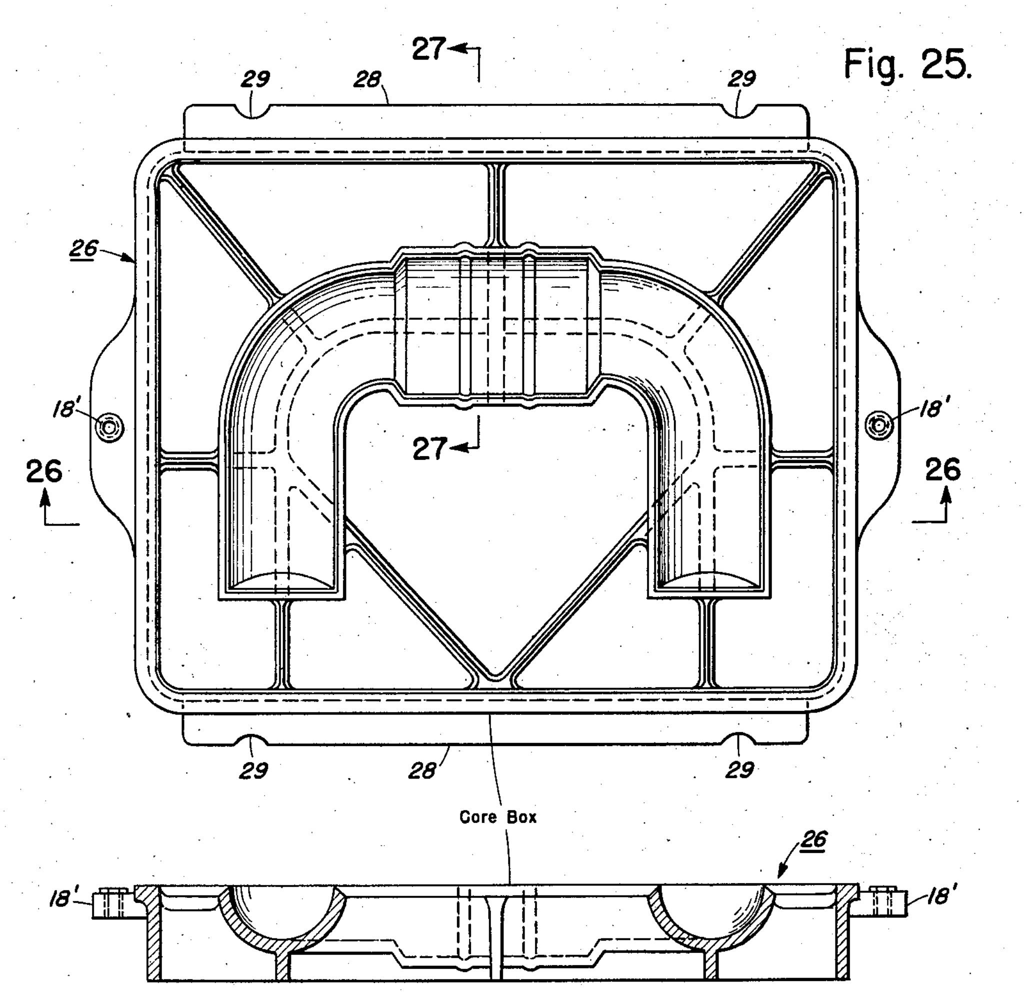
Figure 27:
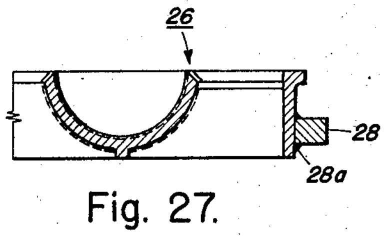
Figure 28:
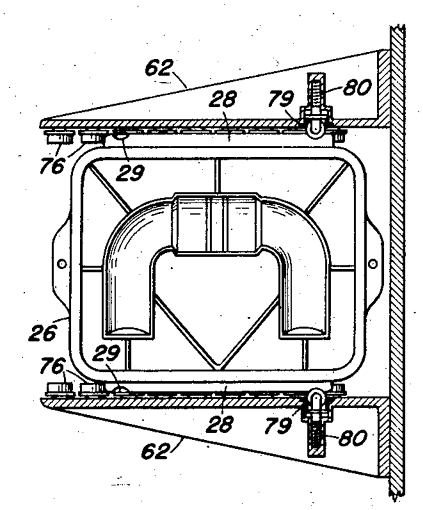
Figures 29, 30, 31:
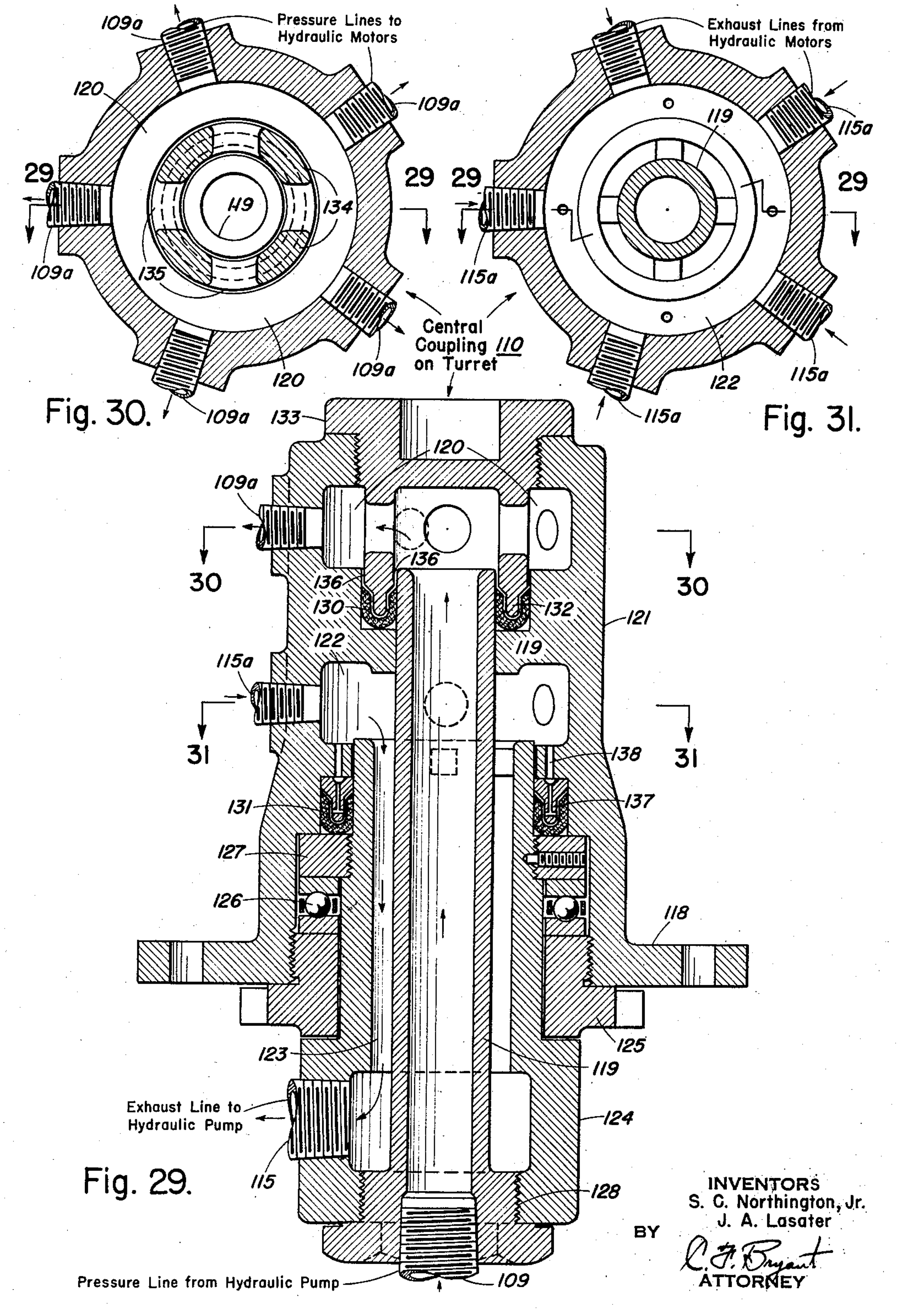
Figures 32, 33, 34, 35:
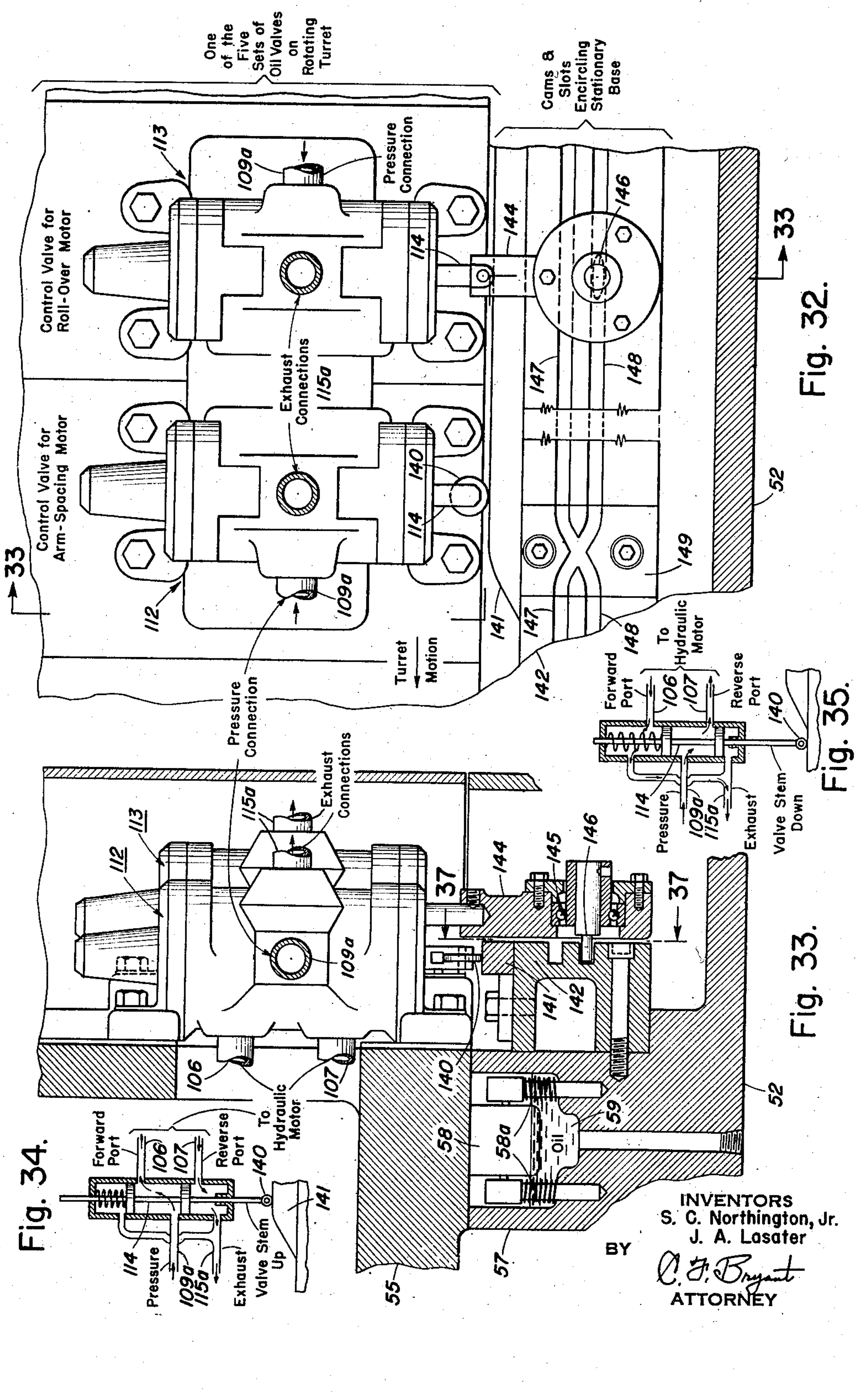
Figure 36A:
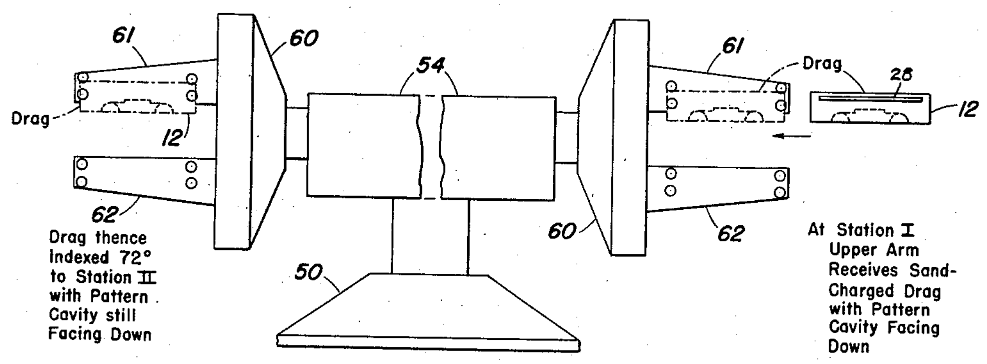
Figure 36B:
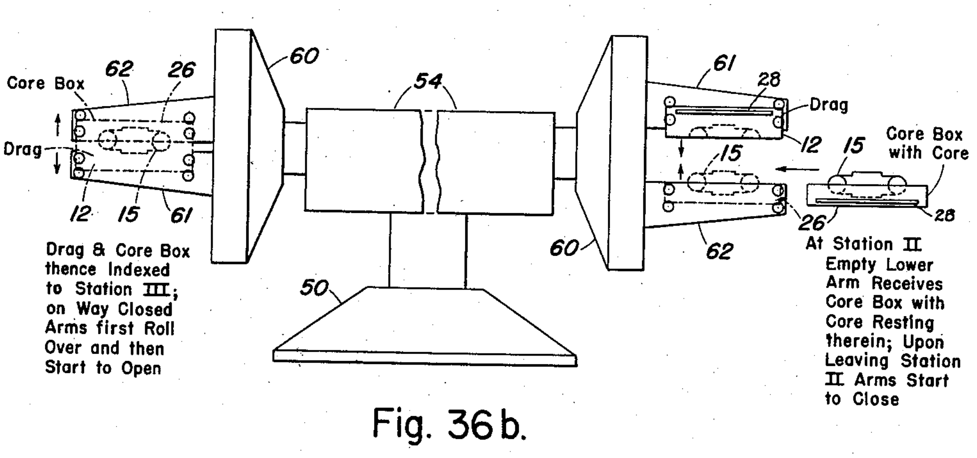
Figure 37:
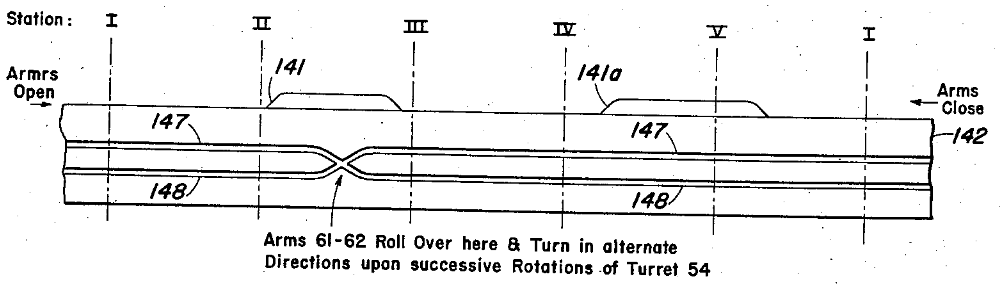
Figures 38, 39, 40:
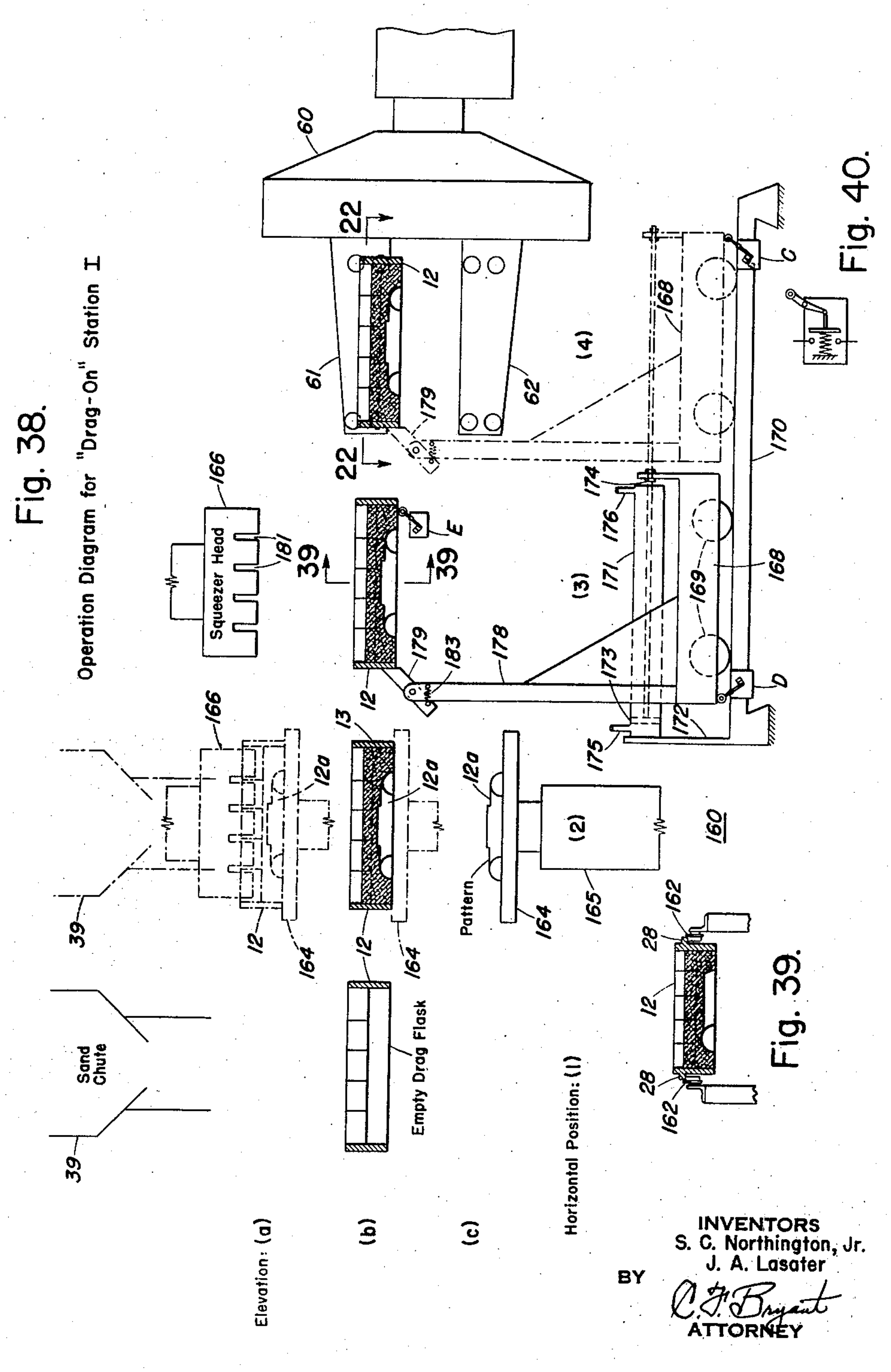
Figures 41, 42:
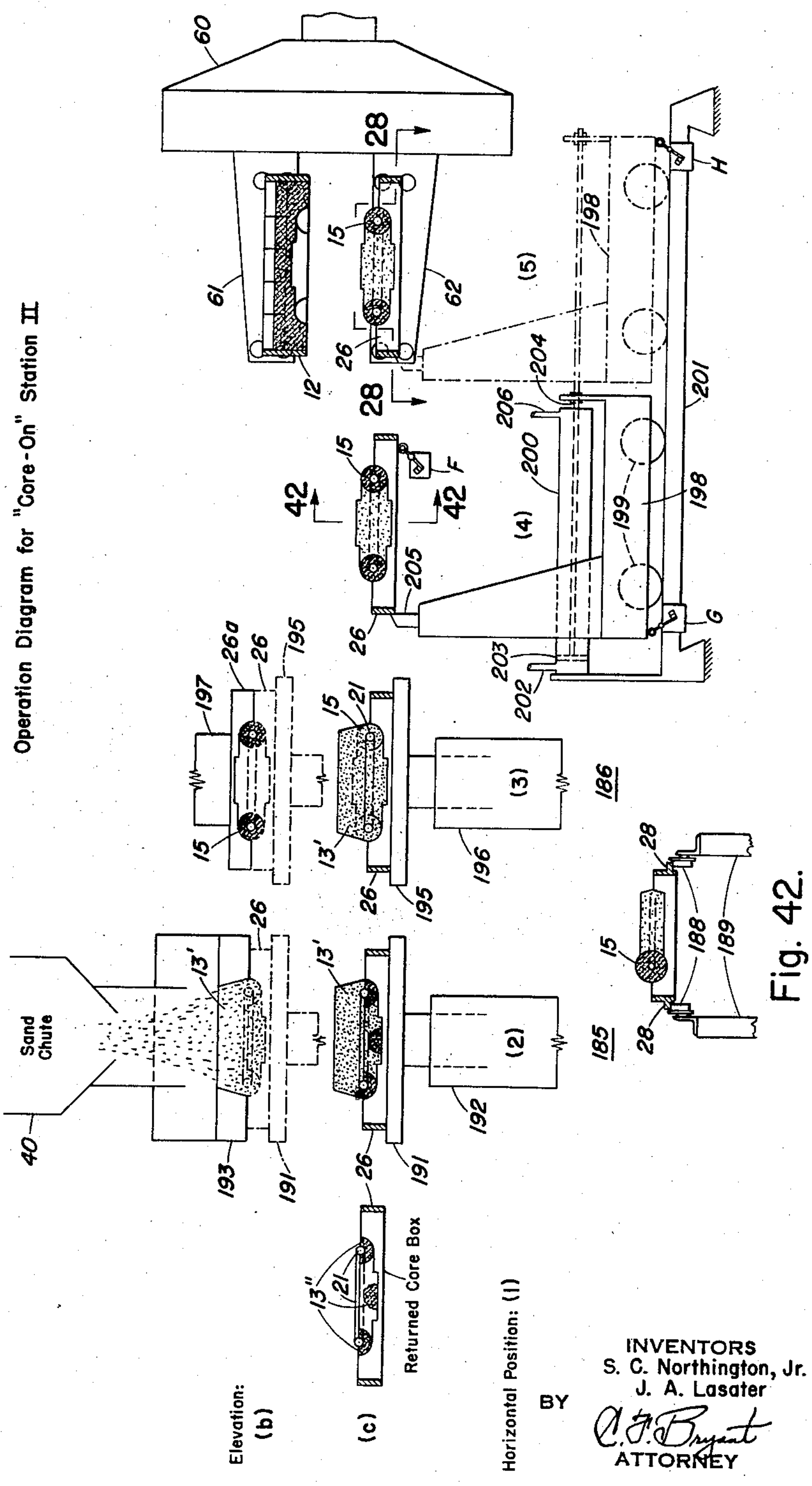

Fig. 17*a* is a corresponding showing of the bottom flask or "drag" portion of the mold upon which the cope is seated during assembly;

Fig. 18 is a section on line 18—18 through one end of the cope flask of Fig. 16 showing further details thereof;

Fig. 18*a* is a corresponding showing of the cooperating bottom flask of the mold;

Fig. 19 is a section on line 19—19 of Fig. 11 through one of the main flask and core box carrying rollers with which each turret-head arm is provided;

Fig. 20 is a section on line 20—20 of Fig. 11 through one of the spring-mounted rollers which engages a cooperating notch in each arm-carried mold-flask (drag or core box) that is inserted into the turret head arms;

Fig. 21 is an elevation view from line 21—21 of Fig. 20 showing the aforesaid spring-mounted roller and the two rows of main flask-carrying rollers respectively thereabove and therebelow;

Fig. 22 is a section on line 22—22 of Fig. 38 showing how the spring-mounted rollers of Figs. 20–21 engage cooperating notches in the side bars of each drag flask or core box that is carried by the arms;

Fig. 23 is a section on line 23—23 of Fig. 11 showing one of the side guides which permits each flask or core box receiving arm to slide in its carrying frame constituting part of the turret head;

Fig. 24 is a bottom plan view from line 24—24 of Fig. 11 showing how each rotative movement of the assembling machine turret is stopped and how each arm turn-over movement is similarly limited;

Fig. 25 is a top plan view of one illustrative form of core box which is fed into the assembling machine at the station designated II in Figs. 1 and 2;

Fig. 26 is a section on line 26—26 of Fig. 25 showing further details of the core box;

Fig. 27 is a section on line 27—27 of Fig. 25 through a side portion of the same core box;

Fig. 28 is a section on line 28—28 of Fig. 41 showing how each core box carried by the assembling machine arms is held therein via the aforesaid spring-mounted rollers which engage cooperating notches in the box side bars;

Fig. 29 is a section on line 29—29 of Figs. 8 and 11 showing the revolving hydraulic distributor joint through which operating fluid under pressure is supplied to the five pairs of hydraulic motors respectively provided for the five sets of flask and core box handling arms on the revolving turret;

Fig. 30 is a section on line 30—30 of Fig. 29 through the fluid supply ports of the distributor joint;

Fig. 31 is a section on line 31—31 through the fluid exhaust ports of the distributor joint of Fig. 29;

Fig. 32 is a view on line 32—32 of Figs. 8 and 11 showing how the two hydraulic valves adjacent each of the five arm-head locations are actuated by rotation of the turret to govern spacing and roll-over actions of the respective arm sets when approaching and leaving different station locations;

Fig. 33 is a view, partly in section and partly in elevation, on line 33—33 of Fig. 32 showing further details of the actuating means for the aforesaid hydraulic valves;

Figs. 34 and 35 are diagrammatic showings of the valve internals when the stem respectively is in the "up" or forward-control position and in the "down" or reverse-control position;

Figs. 36*a–b–c–d–e* are operation diagrams showing how the machine turret arms together with the mold components received thereby are actuated upon movement thereof progressively from Station I to Station II to Station III to Station IV and to Station V in the installation represented by Figs. 1 and 2;

Fig. 37 is a view from line 37—37 of Fig. 33 taken completely around the turret base and showing how the arm-closing cams and the arm roll-over grooves are arranged at and between all five of the station locations;

Fig. 38 is a simplified diagrammatic representation, taken from line 38—38 of Fig. 1, of the drag-charging and arm-loading apparatus provided at Station I in the installation of Fig. 1;

Fig. 39 is a section on line 39—39 of Fig. 38 showing how each sand-charged drag rides on side rollers in approaching the assembling machine arms at Station I;

Fig. 40 is a diagrammatic showing of one of the three normally open electrical switches which the Fig. 38 apparatus at Station I includes;

Fig. 41 is a simplified diagrammatic representation, taken from line 41—41 of Fig. 1, of the core box charging and arm-loading facilities provided at Station II in the mold assembling installation here disclosed.

Figures 43, 44, 45, 46, 47, 48:
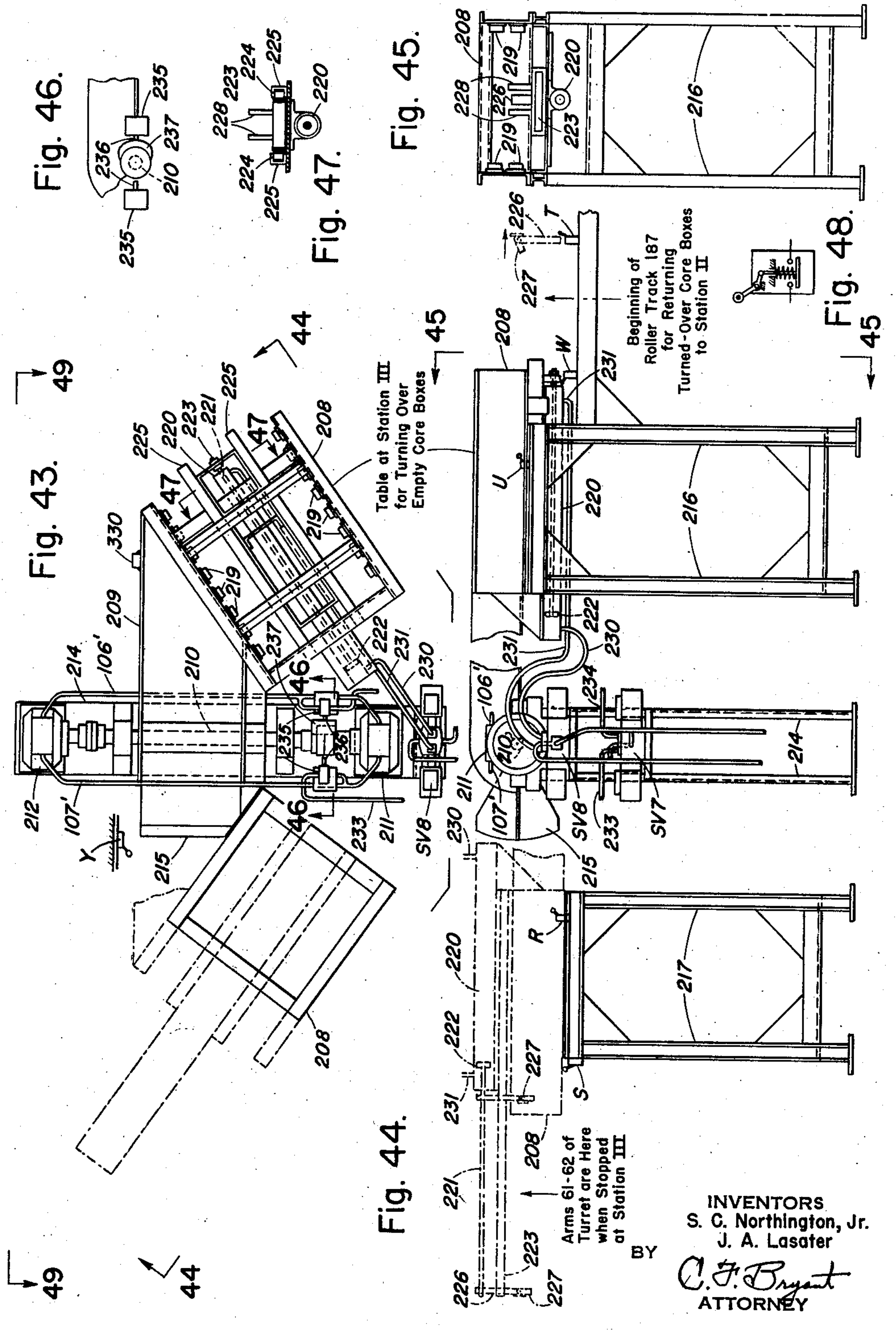

Fig. 42 is a section on line 42—42 of Fig. 41 showing how each core-carrying core box rides on side rollers in approaching the assembling machine arms at Station II;

Fig. 43 is a top plan view of the arm unloading and core box turn-over mechanism which is provided at Station III in the installation of Fig. 1;

Fig. 44 is a combined end and side elevation of the turn-over mechanism of Fig. 43 as viewed from line 44—44 of Figs. 1 and 43;

Fig. 45 is an end view on line 45—45 of Fig. 44 of one of the two platforms and the turn-over table positioned thereon;

Fig. 46 is a view from line 46—46 of Fig. 43 showing speed control devices for the hydraulic motors which drive the turn-over mechanism.

Figure 49:
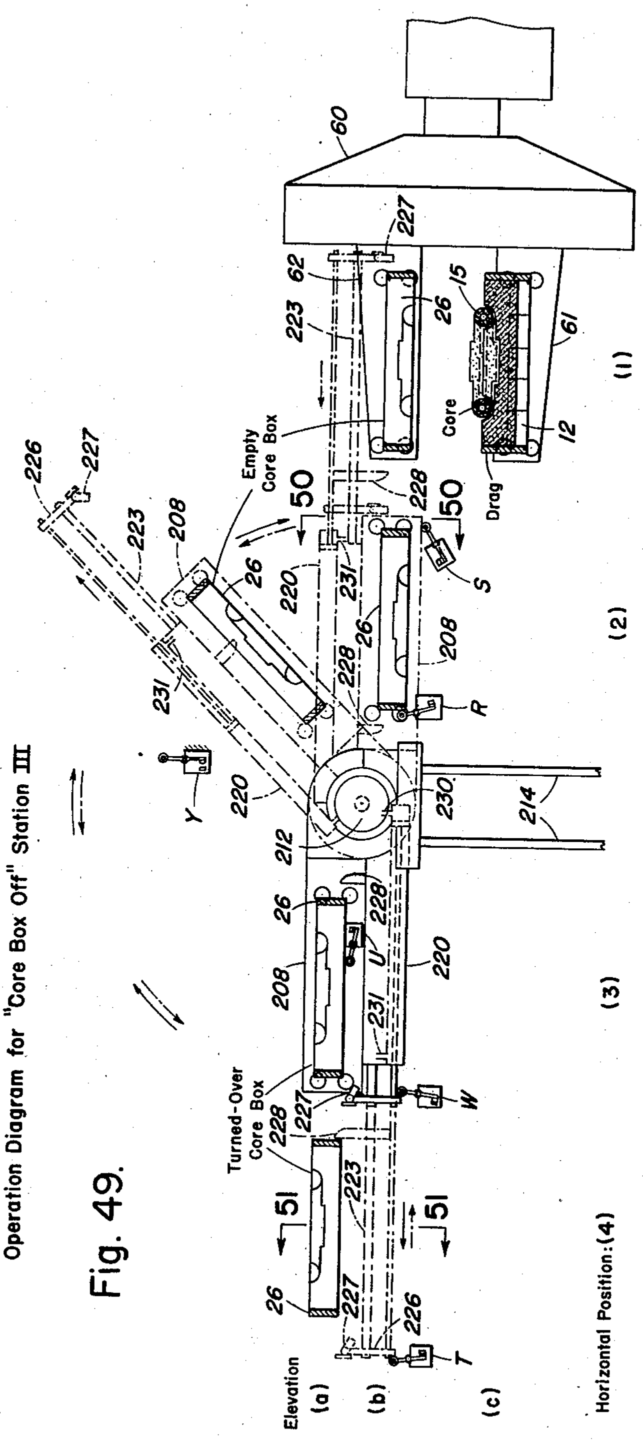
Figure 50:
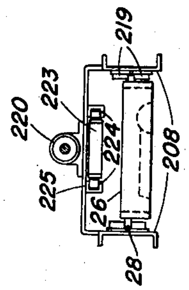
Figure 51:
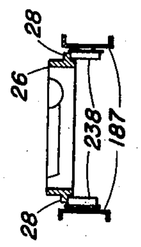
Figures 52, 53:
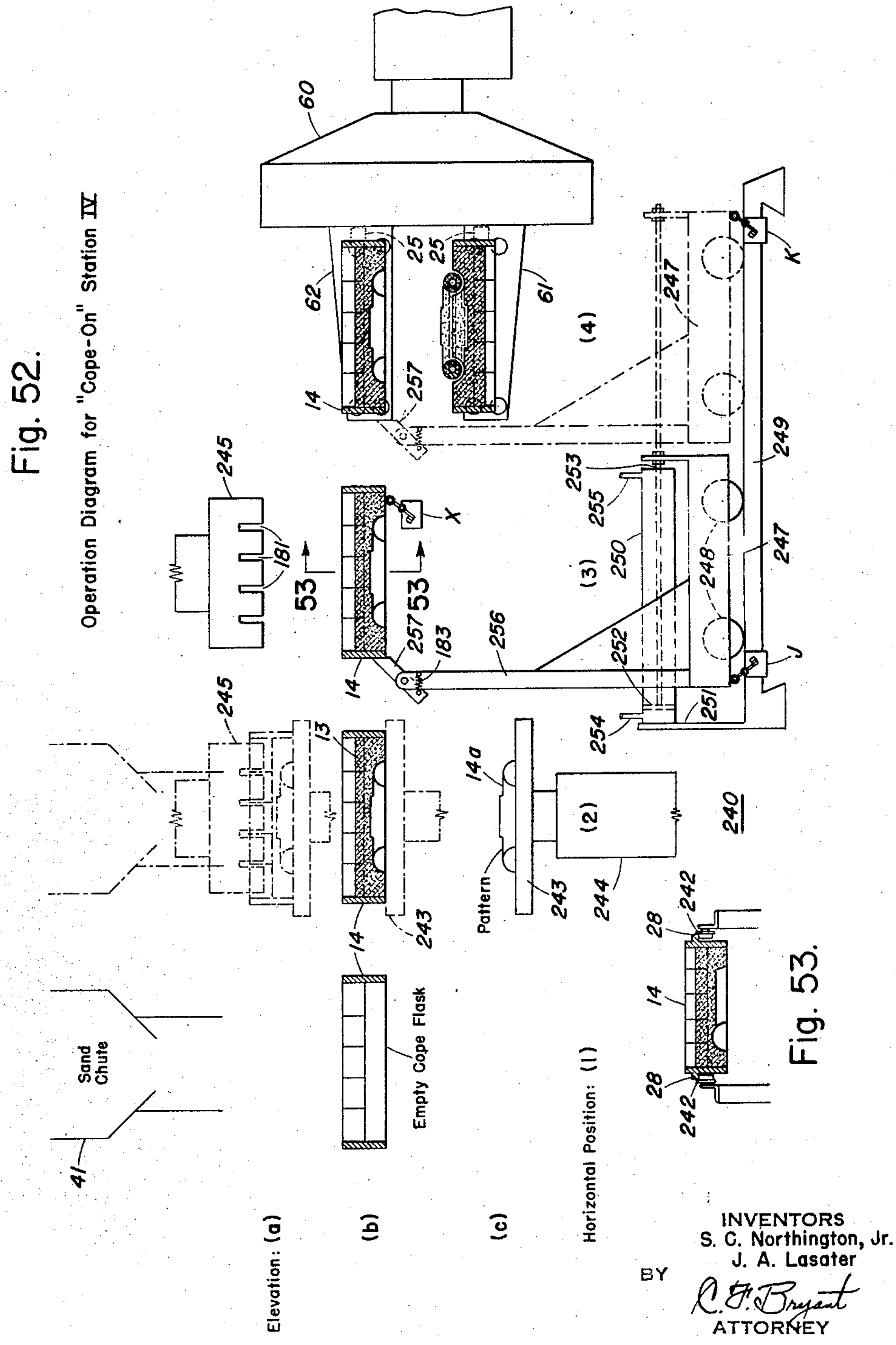
Figure 54:
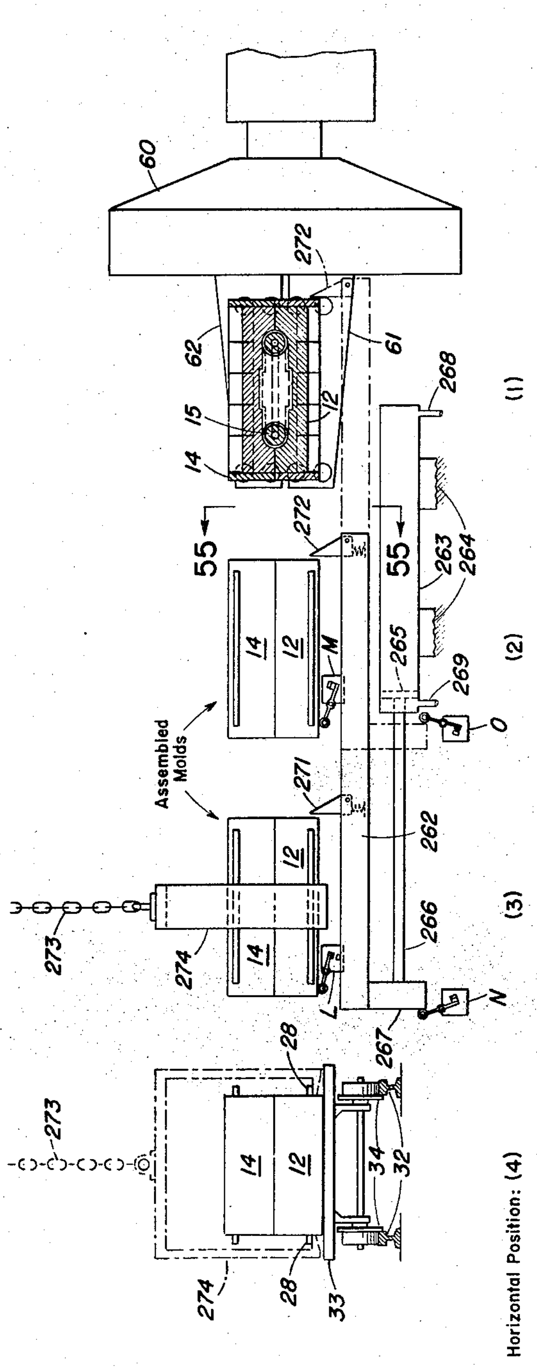
Figure 55:
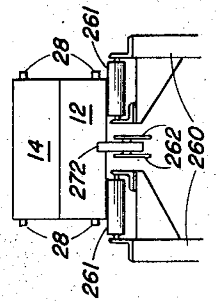
Figure 56:
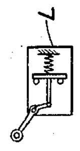
Figures 57, 58:
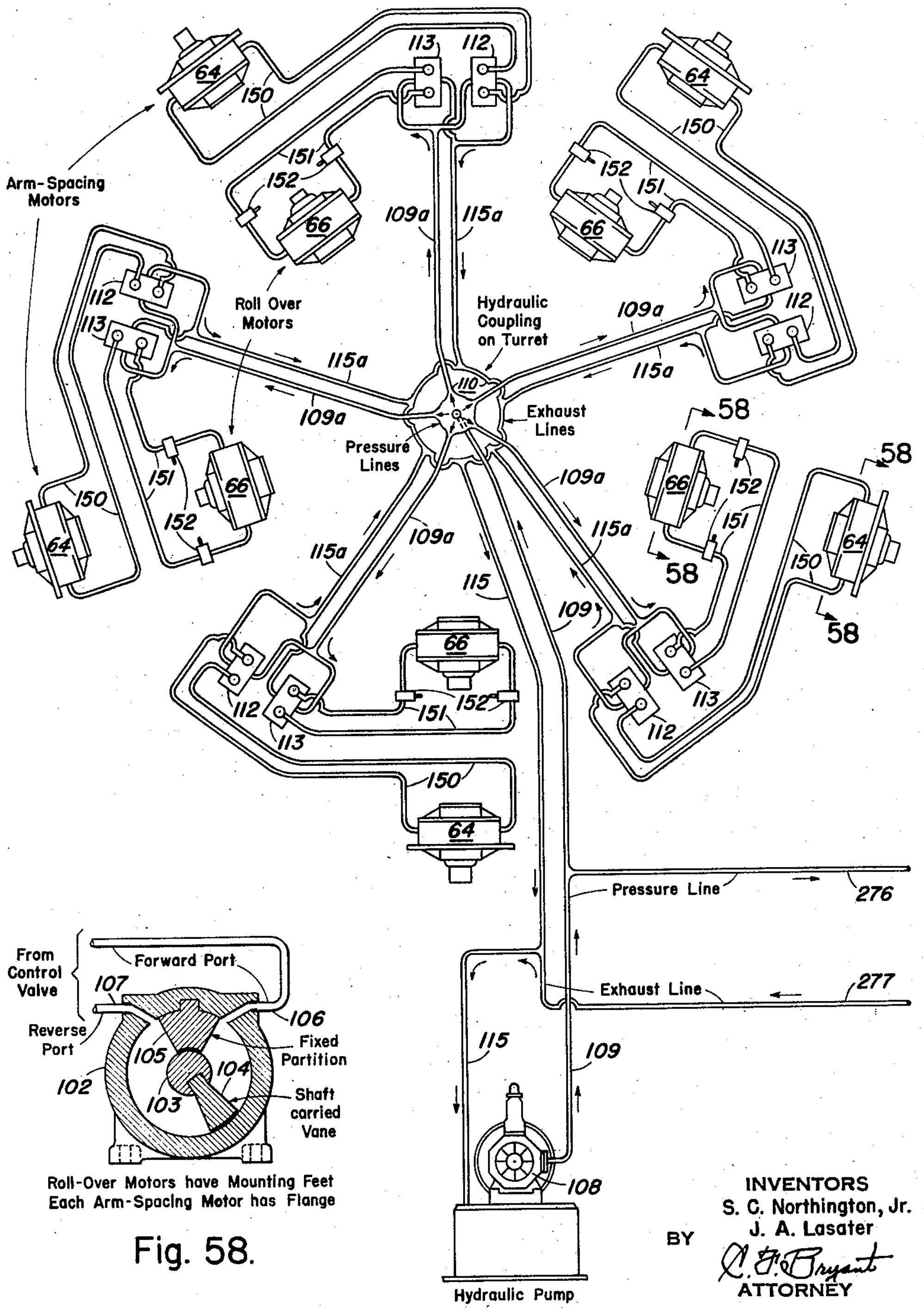
Figures 59, 60:
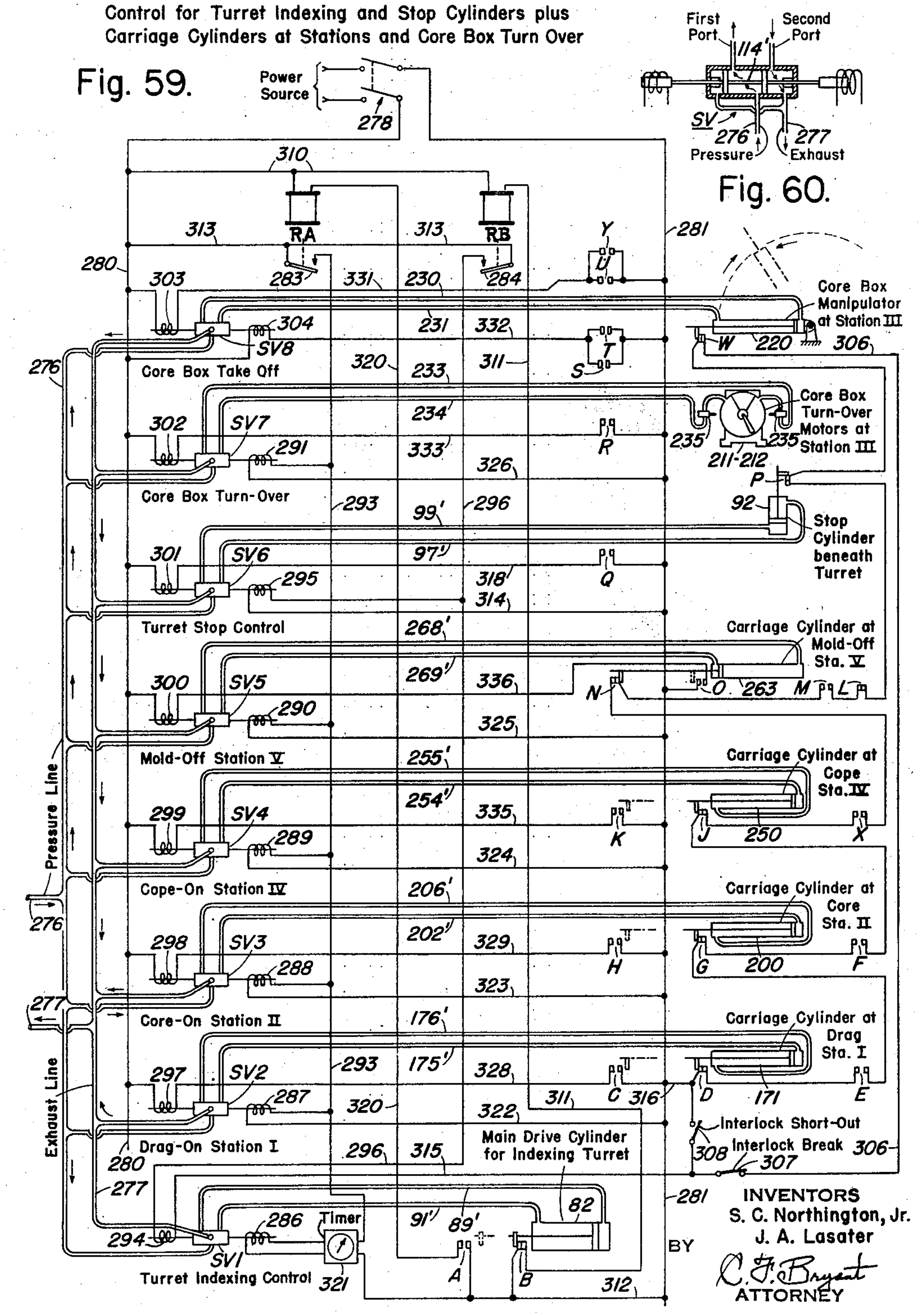
Figures 61A, 61B, 61C:
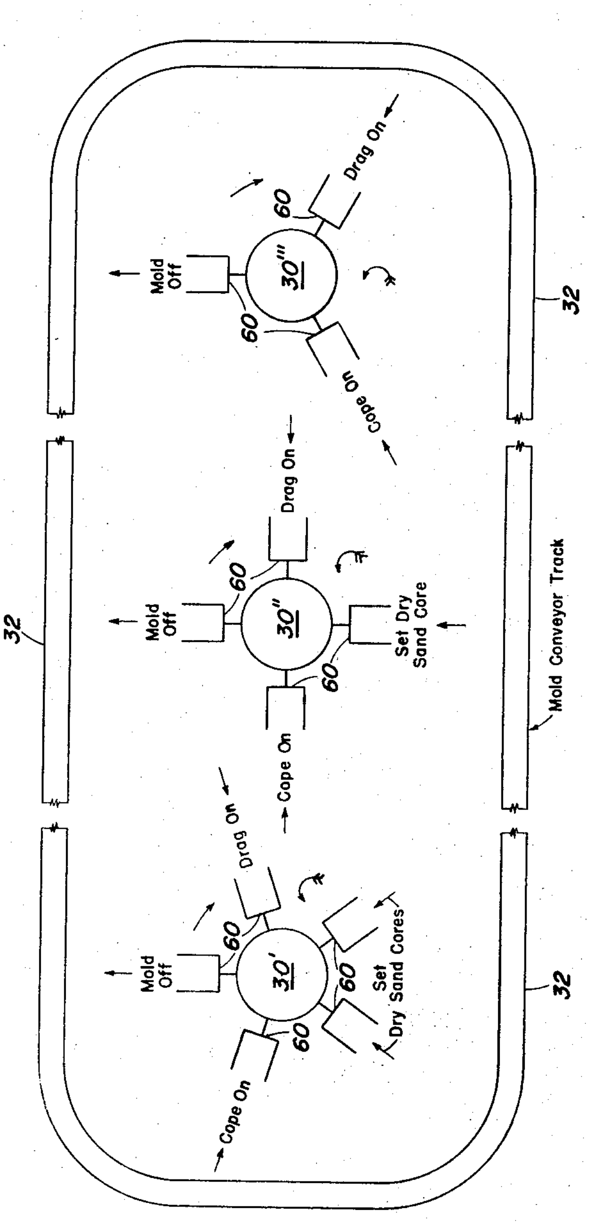

Fig. 47 is a section on line 47—47 of Fig. 43 through the cylinder-actuated slide and its supporting means;

Fig. 48 is a diagrammatic showing of one of the normally-open electrical switches which is included in the Figs. 43–44–45 turn-over mechanism at Station III;

Fig. 49 is a simplified diagrammatic representation, taken from line 49—49 of Figs. 1 and 43, showing how the turn-over apparatus of Figs. 43–44–45 functions at Station III to handle the core boxes automatically taken out of the assembling machine at this station;

Fig. 50 is a section on line 50—50 of Fig. 49 showing how each empty core box withdrawn from the machine arms is engaged at its side bars between spaced rows of rollers in the turn-over table;

Fig. 51 is a section on line 51—51 of Fig. 49 showing how each turned over core box rides on other rollers in approaching the core-box return track of Fig. 1;

Fig. 52 is a simplified diagrammatic representation, taken from line 52—52 of Fig. 1, of the cope-charging and arm-loading apparatus provided at Station IV;

Fig. 53 is a section on line 53—53 of Fig. 52 showing how the side bars of each core box ride on rollers in approaching the assembling machine arms at Station IV;

Fig. 54 is a simplified diagrammatic representation taken from line 54—54 of Fig. 1, showing the apparatus provided at Station V to withdraw the completely assembled molds from the central machine;

Fig. 55 is a section on line 55—55 of Fig. 54 showing how each so-assembled mold rides on side rollers in leaving the assembling machine arms;

Fig. 56 is a schematic showing of the normally closed interlock switch included in the Fig. 54 apparatus at Station V;

Fig. 57 is a diagrammatic showing of the five sets of hydraulic motors and their operation control valves with which the assembling machine turret of the earlier drawing views is provided as best indicated in Fig. 8;

Fig. 58 is a simplified showing of typical internal construction for each of the ten hydraulic motors represented in Fig. 57;

Fig. 59 is a diagrammatic showing of the hydraulic and electrical control circuits utilized in conjunction with the apparatus of Fig. 58 to rotate the central turret in desired manner and to operate the carriage-actuating cylinders at each of the five assembling machine stations;

Fig. 60 shows typical internal construction for each of the eight solenoid valves utilized in the control system of Fig. 59; and Figs. 61*a–b–c* show how the central mold assembling machine of the earlier views may be utilized in still other advantageous ways to perform functions beneficial to foundry operations.

*Illustrative casting and mold for producing same*

Figure 3:
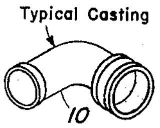
Fig. 3 represents a "quarter-bend" soil pipe casting produced in a mold assembled by the apparatus of Fig. 1 and being only one of a wide variety of forms (solid as well as hollow) sizes and shapes of castings for which the molds may be assembled in accordance with this invention.

By these drawings our improved apparatus and technique for preparing and assembling foundry molds is illustratively shown as being applied to the production of soil pipe fittings typified by the "quarter bend" casting represented at 10 in Fig. 3. Such a quarter bend elbow for four inch diameter soil pipe weighs approximately 12 pounds when formed from cast iron; and its corresponding overall dimensions may be judged from the perspective showing of Fig. 3 wherein the small-end opening is four inches across.

As the description proceeds it will become apparent that the mold assembling technique and apparatus of our invention may also be applied to the production of castings of sizes, characters (including solid as well as hollow formation) and shapes other than the one here disclosed and that the represented quarter bend solid pipe fitting 10 thus has been chosen only to illustrate and not to limit the inherently wide application and scope by which our inventive improvements are characterized.

Figure 4:
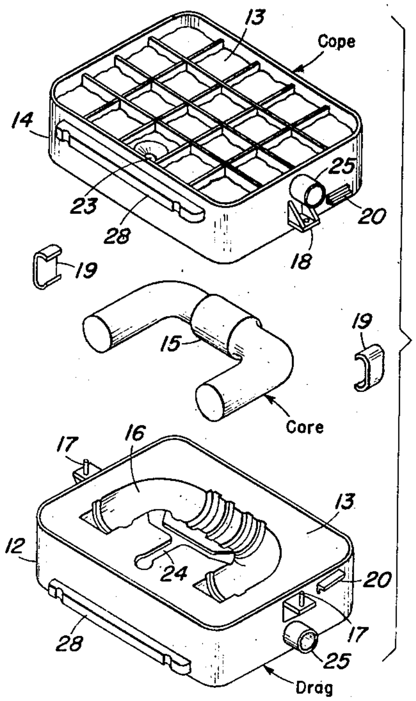
Fig. 4 is an "exploded" view showing the components of a mold for casting two of the quarter-bend soil pipe fittings of Fig. 3.

Production of castings such as 10 of Fig. 3 in static molds of conventional character calls for preparation and assembly of the component parts for each mold which are represented in Fig. 4. These include a lower flask half 12 referred to as the "drag," an upper flask half 14 referred to as the "cope," suitable "green" sand 13 or the like packed into both the drag and the cope for receiving cavity impressions 16 from the casting pattern (drag half thereof shown at 12*a* in Fig. 38 and cope half thereof at 14*a* in Fig. 52), and a core 15 ("green" sand or other) placed within the mold cavity to form the hollow interior of casting 10. In the illustration here made the aforesaid casting pattern and the cooperating core 15 are both shaped to provide for simultaneously casting two of the quarter bend fittings 10 in each mold 12—14 when assembled as illustrated in Fig. 5; and the represented "green" sand core 15 is shown as being provided with a reinforcing arbor indicated at 21 in Figs. 6 and 7.

Figures 5, 6:
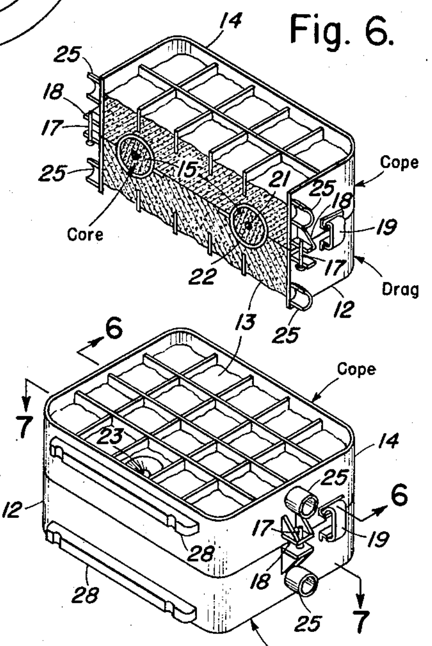
Fig. 5 shows how the drag, core and cope of Fig. 4 appear after having been brought together to produce an assembled mold ready for pouring.
Fig. 6 is a section in vertical elevation on line 6—6 through the assembled mold of Fig. 5.
Figure 7:
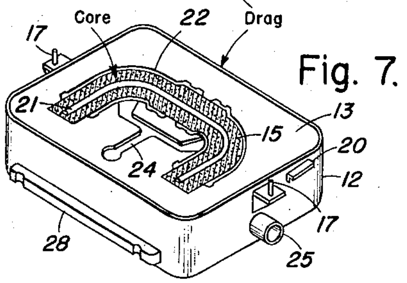
Fig. 7 is a view from line 7—7 of Fig. 6 showing the top of the drag and the interior of the core resting in the mold cavity thereof.

From the aforesaid Figs. 5–6–7 it will be seen that after mold assembly the core 15 rests in cavity 16 of the drag 12; that the cope 14 has been lowered upon the drag where it is maintained in accurately aligned relationship by pins 17 upstanding from the drag ends over which are fitted mating brackets 18 attached to the cope ends; and that the two flask halves 12 and 14 are held together by opposing end clamps 19 that engage cooperating lugs 20 on the drag and cope frames.

When so assembled there is provided within the mold interior an open cavity space shown at 22 in Figs. 6–7 into which space there flows molten metal when poured from a ladle (not shown) into the sprue opening 23 (see Figs. 4–5) in the cope sand; said poured metal flowing downwardly through opening 23 and then horizontally through passage 24 (see Figs. 4 and 7) in the drag sand and thence into the aforesaid mold cavity 22 communicating with that passage.

*The mold assembling problem and how invention solves it*

Preparation of the mold components shown by Fig. 4 involves not only packing sand 13 or the like into the drag flask 12 (shown empty by Figs. 17*a*–18*a*) and the cope flask 14 (shown empty by Figs. 16–17–18) but also accompanying manipulations of a core box whose lower half is shown at 26 in Figs. 25–26–27 and whose cooperating upper half at 26*a* in Fig. 41; such a core box 26—26*a* being required to form the core 15 of Fig. 4 and place it in the cavity 16 of drag 12.

The drag flask 12 and the cope flask 14 each must face down over its pattern half (12*a* of Fig. 38 and 14*a* of Fig. 52) when charged with the sand 13 or the like; yet in the finally assembled mold the drag 12 is required to face up as Figs. 5–6–7 show. Likewise, the lower core box half 26 (Figs. 25–26) must face up (Fig. 41) while the core 15 is being formed therein; yet roll-over thereof along with the drag 12 is necessary incident to transferring the core 15 from box half 26 into drag cavity 16 (Figs. 5–6–7) and then removing that box half from the drag and core assemblage. Moreover, the sand-charged cope 14 must thereafter be brought together with this core-carrying drag 12 and secured thereto in order to provide a finished mold (Fig. 5) that is ready for pouring.

It has been our observation that the speed with which castings may be produced in a given foundry is limited by the time and labor needed to prepare the mold components (Fig. 4) discussed above and to assemble them into finished molds (Figs. 5–6–7) ready for pouring.

Such mold components are typically heavy and cumbersome and therefore difficult to handle. Thus the assembled mold illustratively shown in Fig. 5 (for producing two of the castings 10 of Fig. 3) weighs nearly 400 pounds before the molten iron is poured in and is still heavier after the pouring has been accomplished. Each represented cope flask 14 and drag flask 12 included therein is 26 inches long (inside) by 20 inches wide (inside) and 7 inches deep; thereby giving a height dimension of 14 inches for the assembled mold of Fig. 5. The cooperating core box half 26 of Figs. 25–27 also has inside dimensions of 26 by 20 inches; and even if of somewhat lesser depth than the cope and drag it likewise is heavy and difficult to handle.

In the past the various mold components discussed above have had to be manipulated and assembled manually or with cranes or hoists. This has not only slowed down the assembly operation but has added to the cost of preparing the molds for pouring. In accordance with our invention the preparation, manipulation and assembly operations are accomplished mechanically and more or less automatically with a minimum of attention on the part of operators. Assembly speed is in this way increased and there are made available numerous other benefits later to become evident.

*Illustrative apparatus for practicing invention*

The apparatus here disclosed for practicing our invention illustrates only one of the possible ways in which the benefits deriving therefrom may be realized. In this illustrative apparatus for accomplishing mechanized assembly of the molds use is made of a central indexing machine shown at 30 in Figs. 1–2 as having a turret designated as 54 in Figs. 8–9 and 36, which turret is rotatable about a generally vertical axis as indicated by Fig. 11. Around the periphery of this turret 54 are five arm heads 60 equally spaced circumferentially (72° apart) as indicated by Figs. 1 and 8.

Figure 15:
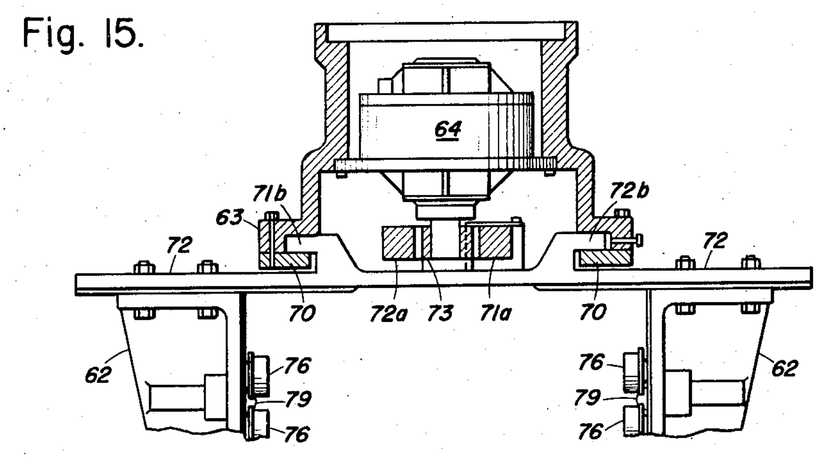
Fig. 15 is a section on lines 15—15 of Figs. 11 and 14 through the motor-driven pinion and racks for effecting said movement of the arms towards and away from each other.
Figure 14:
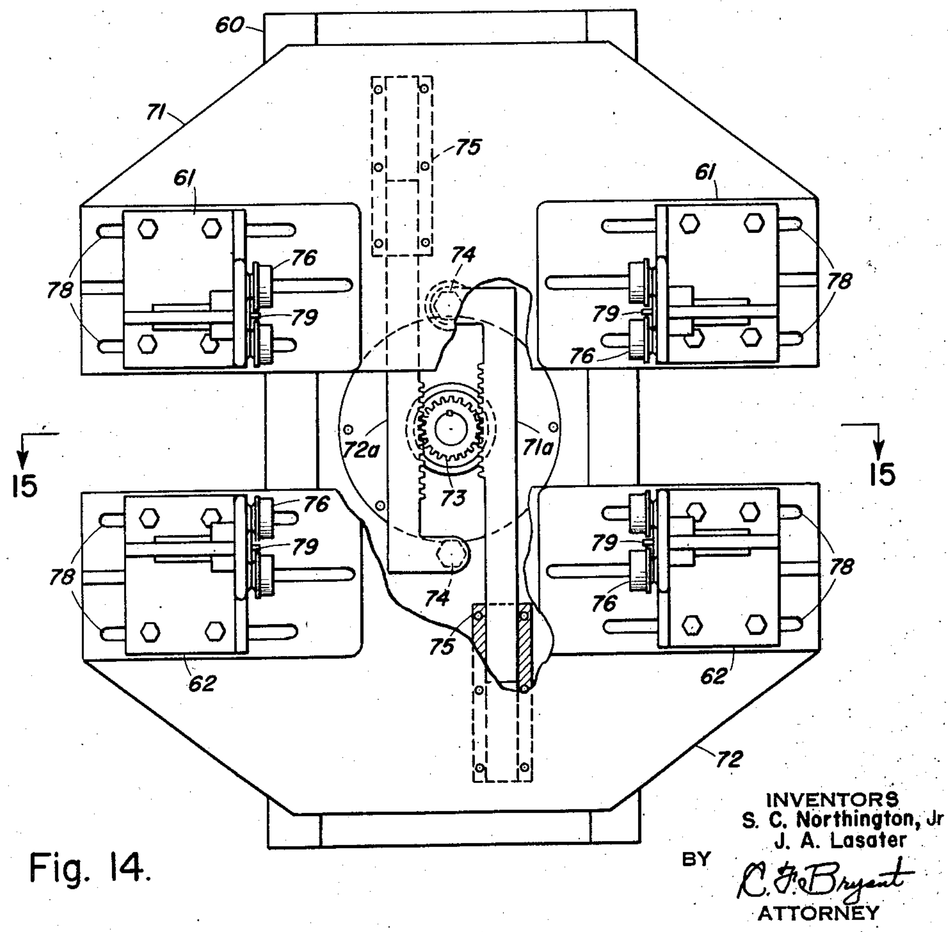
Fig. 14 is an end view from line 14—14 of Fig. 11 showing the arm supporting structure and the gear racks by which the upper and lower flask and core box receiving arms on each turret head are moved together and apart.

Each of these five arm heads 60 is mounted for roll over about an axis that is substantially horizontal as shown by Fig. 11 and that is generally radial to the turret's center as shown by Fig. 8. Carried by each head 60 are flask and core box receiving arms shown at 61—62 in Figs. 8 to 14 as extending outwardly from the head in general radial relation to the central turret 54. These arms 61—62 (upper and lower) are adapted for movement towards and away from each other as shown by Figs. 11, 14–15.

Provision is made (shown by Figs. 11–12) for successively advancing the central turret 54 through the angular distance (72° as shown by Fig. 8) between arm heads 60 whereby each set 61—62 of upper and lower arms progressively occupies at-rest positions spaced around the turret periphery's rotative path at the station locations designated I—II—III—IV—V in Figs. 1–2.

At the first or "Drag" Station I of Figs. 1–2 use is made of the facilities diagrammed by Fig. 38 for inserting into the upper one of the two arms 61—62 there coming to rest a sand-charged drag flask 12 (Fig. 4) having its pattern impression 16 facing down as in Fig. 38.

At the second or "Core" Station II of Figs. 1–2 there are provided the facilities diagrammed by Fig. 41 for inserting into the lower one of the two arms 61—62 there coming to rest a core box half 26 (Figs. 25–26)

having a finished core 15 (Fig. 4) therein facing up (Fig. 41) from the box half.

Figure 36C:
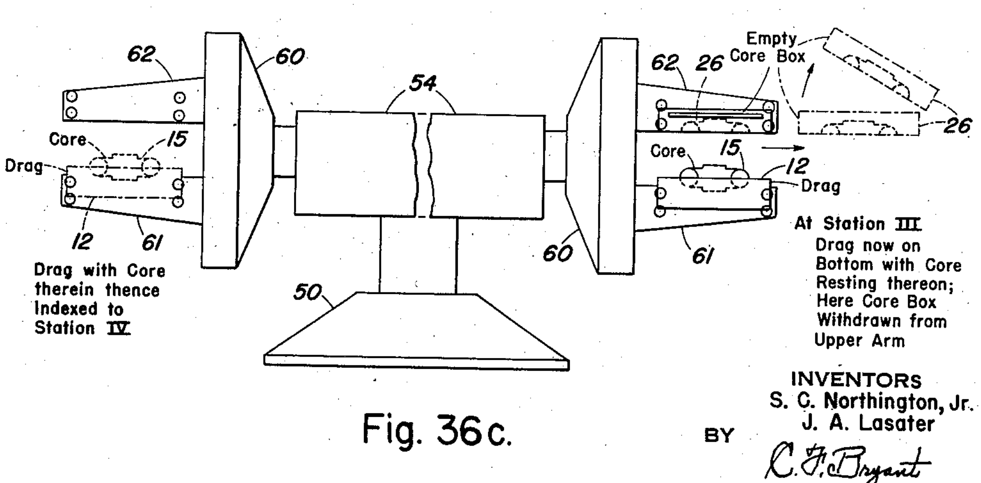

Following Station II is a third or "Core-Box-Off" Station shown at III in Figs. 1–2; and cooperating with the central turret 54 are control means (shown by Figs. 8, 11, 32–33, 57) responsive to advancement by the turret of each arm head 60 from Station II to Station III for first moving the two arms 61—62 on that head together (Fig. 36b) thus bringing the core 15 into the drag 12's pattern cavity 16 (Fig. 4) and then rolling said arms 61—62 through substantially 180° about the head axis (Figs. 11, 32–33, 57) thus placing the drag 12 on the bottom and the core 15 on top thereof with the core box half 26 above the core 15 and then moving the two arms 61—62 away from each other thus lifting the core box half 26 free both of the drag 12 and the core 15 now resting in the drag's attern cavity (Fig. 36c).

At the aforesaid "Core-Box-Off" Station III are the facilities shown by Figs. 43–47, 49–50, 59 for withdrawing the empty and now inverted core box half 26 out of the upper arm of each turret head 60 there coming to rest (Fig. 36c), for turning that box half 26 over and interchanging its two ends, and for returning it to Core Station II via the gravity track 187 of Fig. 1.

At the fourth or "Cope" Station IV of Figs. 1–2 (72° beyond Station III) use is made of facilities shown by Figs. 1 and 52 for inserting into the upper one of the two arms 61—62 there coming to rest a sand-charged cope flask 14 (Fig. 4) having its pattern impression facing down as shown by Fig. 52.

Following Station IV is a fifth or "Mold-Off" Station shown at V in Figs. 1–2; and cooperating with the central turret 54 are control means (shown by Figs. 8, 11, 32–33, 57) responsive to advancement by the turret of each arm head 60 from Station IV to Station V for moving the two arms 61—62 on that head together thus bringing the cope 14 together with the cope's pattern cavity fitting over the core 15 now supported by the drag.

At the aforesaid "Mold-Off" Station V are the facilities shown by Fig. 54 for withdrawing from the two closed arms 61—62 (Fig. 36e) of each turret head 60 there coming to rest the now assembled mold made up of the drag 12, core 15 and cope 14 brought together as just described.

And cooperating with the central turret 54 are further control means (Figs. 8, 11, 14–15, 32–33, 57) responsive to advancement by the turret of each arm head 60 from Station V to the first named "Drag" Station I for moving the two arms 61—62 on that head away from each other preparatory to repeating the mold assembly cycle outlined above.

*Typical installation incorporating inventive apparatus*

In Fig. 1 there is represented in top plan view an installation which utilizes the illustrative apparatus just described; that apparatus being suitable for assembling molds such as Figs. 4–5–6–7 show wherein castings such as the quarter bend elbow 10 of Fig. 3 are produced.

Disposed centrally of this installation is the indexing machine 30; surrounding it are the five cooperating stations I—II—III—IV—V already identified as performing the respective functions diagrammed by Fig. 2; and surrounding the apparatus at those five stations is a main track 32 arranged in a continuous loop or closed circuit and carrying a relatively large number (over forty represented by Fig. 1) of mold cars 33 coupled together as shown into a continuous string or unbroken train.

In operation the cars 33 in this train are slowly advanced around track 32 in counter-clockwise direction as indicated by the arrows. Such advancement may be effected in any suitable manner as through the aid of drive mechanism generally represented at 35 in Fig. 1. Since the construction of cars 33 and mechanism 35 is relatively conventional, no attempt to represent full details thereof is here made. Instead, it will suffice to say that each car comprises a flat top or platform somewhat larger than the contour of the drags 12 and assembled molds 12—14 which are to be carried thereon; that each of these platforms is supported by four wheels (two of which are shown at 34 in Fig. 54) that ride on the parallel rails of track 32 in conventional manner; and that the drive mechanism 35 is positioned beneath track 32 and provided with means for engaging successive cars 33 and thereby pushing the entire train around the track at a speed selectable from nine to twenty-four feet per minute, with a car speed of about fourteen feet per minute being typical.

Sand (designated at 13 in Figs. 4–5–6) or the like for charging the drags 12 and copes 14 and forming the cores 15 is supplied to Stations I, II and IV of the Fig. 1 installation from a sand plant generally designated at 37 by a system of overhead conveyers. As such conveyers are conventional, no attempt to show same is here made; instead it will suffice to say that they carry the "green" sand prepared in plant 37 from elevator outlet 38 to receiving hoppers 39, 40 and 41 respectively provided at Stations I, II and IV as generally sohwn by Figs. 38, 41 and 52.

Spillage sand from the aforesaid Stations I, II and IV is conveyed back to plant 37 by means of a system of underground return conveyers generally designated at 43 in Fig. 1. As such conveyers are conventional, no attempt to represent the details thereof is here made. Instead, it will suffice to say that they pick up sand not only from the aforesaid Stations I, II and IV but also from casting shake-out, drag shake-out and cope shake-out locations 45, 46 and 47; that they return the so picked up sand to an elevator 48 which carries it from the underground level to the top of an elevated storage bin (not shown) comprised by plant 37; and that from this storage bin the sand is released in conventional manner as needed into mixing, moistening and other apparatus used to prepare it for redistribution via the overhead conveyers 38 to Stations I, II and IV.

*Central indexing machine used to assemble the molds*

Attention will now be directed to the mold assembling machine 30 earlier mentioned and positioned as shown by Figs. 1 and 2 centrally of the mold car track 32 and of the five Stations I—II—III—IV—V intermediate that track and the central machine.

In order to adapt the drag flask 12, the cope flask 14 and the core box half 26 for handling by this machine 30, each of these mold parts is provided with the side bars represented at 28 in each of Figs. 4, 5, 7, 16, 17, 17a, 22, 25, 27 and 28. Attachment of these bars 28 to the metal side walls of each drag, cope and core box may be effected in any suitable manner as by welding as indicated at 28a in Figs. 17, 17a and 27. For a purpose later to be made evident, the outer edge of each side bar 28 is provided near each of its ends with an indentation or notch best shown at 29 in Figs. 16 and 25.

The illustrative mold flask parts 12, 14, 26 with which said side support bars 28 are here shown have "lengthwise" dimensions parallel to bars 28 which are somewhat longer than the "endwise" dimensions crosswise of the bars. It will be obvious however that the same support bars 28 also are useable with mold flask parts 12, 14, 26 in which the so-called "endwise" dimensions or axes crosswise of the bars are as long as or even longer than the so-called "lengthwise" dimensions or axes parallel to the flask side walls to which the bars 28 are attached.

The central assembling machine shown at 30 in Figs. 1 and 2 comprises a stationary base generally indicated at 50 in Figs. 9, 11 and 36; a hollow pedestal 51 supported by the base 50 and extending upwardly therefrom into an outwardly extending table 52 as shown in Fig. 11; and the earlier-mentioned rotatable turret generally indicated at 54 in each of Figs. 8, 11 and 36 and further shown by Fig. 11 as including a flat plate member 55 secured at its center to the top of hollow turret shaft 56, which shaft extends downwardly through the base pedestal 51 and is free to rotate relative to the pedestal about a vertical axis.

As earlier mentioned, the rotatable turret 54 is provided with five arm heads generally indicated at 60 in each of Figs. 1, 8, 9, 11, 14, 15, 36, 38, 41, 49, 52, and 54. These five arm heads 60 extend outwardly from the turret 54 in radial directions which Fig. 8 shows to be equally spaced circumferentially of the turret periphery at intervals of 72° and which Figs. 9 and 11 show to be in a horizontal plane. As already indicated each of these heads is provided with a first set of arms 61 and a second set of arms 62 organized as shown in Figs. 8, 11, 14 and 15. At times (and as shown by Figs. 9, 11, 14, 15) each head 60 is positioned with arm set 61 on top and arm set 62 on the bottom; at other times (and as shown by Figs. 36*c–d–e*) each head 60 is rolled over bringing arm set 62 on top and arm set 61 on the bottom.

Each of these five carrying heads 60 is provided with an arm-spacing motor 64 which serves to move arms 61 and 62 towards and away from each other, and also with a roll over motor 66 which serves to roll or turn the entire head 60 and arms 61—62 carried thereby back and forth through an angle of 180°. Such turning takes place in the bearing 67 by which the spindle 68 of each head 60 is carried in the surrounding portion 69 of turret member 55 as shown in Fig. 11; it is accomplished by motor 66 through the represented direct coupling of the motor shaft with the head spindle 68.

Cooperating with the arm spacing motor 64 for each head 60 are plates 71 and 72 which respectively carry the two arms 61 and 62 of that head and which are attached to toothed racks **71*a* and 72*a* that mesh with a pinion 73 on the shaft of arm spacing motor 64 as indicated by Figs. 11, 14–15. Attachment of each of these two racks 71*a* and 72*a* to its respective arm plate 71 and 72 is accomplished by a bolt 74 at one end of the rack while the other or free rack end slides through a guide 75 carried by the other plate. Cooperating here are the mountings for arm plates 71 and 72 which Figs. 15 and 23 show; the portion 63 of arm head 60 (in front of motor 64) having bolted thereto side strips 70 behind which tongues 71*b* and 72*b* of arm plates 71 and 72 are free to slide with their toothed racks 71*a* and 72*a***.

Rotation of motor pinion 73 counter-clockwise as viewed in Fig. 14 thus moves the arm sets 61 and 62 away from each other while rotation of pinion 73 in the opposite or clockwise direction in Fig. 14 moves the two arm sets towards each other.

Each of the arm sets 61 and 62 for each of the five turret heads 60 is adapted to receive a drag flask 12 or a cope flask 14 or a core box half 26 in the manner generally indicated by Figs. 22 and 28. For accomplishing such reception the inner face of each arm is provided with two parallel and spaced rows of flask-supporting rollers 76. A section through one of these rollers 76 is represented in Fig. 19; that view showing a ball bearing 77 for the roller and a fitting 77' for transmitting lubricant thereto. The spacing between the aforesaid parallel rows of rollers 76 is slightly greater than the thickness of the flask side bar 28 so that the drag 12 or the core box 26 carrying these side bars 28 is readily insertable into the machine arms as shown by the aforesaid Figs. 22 and 28; and so that the cope 14 with side bars 28 likewise may be received in the slightly modified manner later to be described.

To accommodate such flask reception the spacing between the two side portions 61 in the first arm set and the two side portions 62 in the second arm set is adjusted to be slightly greater than the outside width of the drag 12, cope 14 and core box 26; provision for such adjustment taking the form of slots 78 (see Fig. 14) in the plates 71 and 72 to which the arms 61 and 62 are attached. This adjustment makes it possible for a given assembling machine 30 to handle flask widths of differing dimensions.

Movement of each flask part 12, 14, 26 into the set of machine arms 61 or 62 receiving it and later withdrawal of the part from said arm set takes place in a direction here designated as "lengthwise." This direction earlier was defined as being parallel to the aforesaid support bars 28; and with reference to this invention it is to be designated as "lengthwise" regardless of whether the flask part carrying those bars has a so-called "endwise" dimension crosswise of the bars 28 that is shorter (as here illustratively shown) than or as long as or even longer than the flask side walls to which said support bars 28 are affixed.

Once the flask has been moved into position in the machine arms as represented by Figs. 22 and 28, it is yieldingly there held through engagement with one of the indentations 29 in each side bar 28 of a spring-mounted roller shown at 79 in each of Figs. 11, 14, 15, 20, 21, 22 and 28. From Figs. 20, 22 and 28 it will be seen that each of these rollers 79 is urged by a compression spring 80 toward the space between adjacent arms in the set. In consequence the two opposing rollers 79 seat themselves in the indentations 29 of the flask side bars 28 which they engage, thereby retaining the flask in desired position between the arms until such time as it is forcibly drawn out of the arms away from the center of the assembling machine.

From Fig. 1 it will be seen that in each "at rest" position of the turret 54 the five arm heads 60 accurately align themselves with the five Stations I—II—III—IV—V surrounding the central indexing machine 30. As earlier indicated the turret 54 of this machine is arranged to rotate so that the arms carried by a given head 60 may be successively advanced from Station I to Station II to Station III to Station IV to Station V and back to Station I. During this rotation the vertical turret shaft 56 rides in the upper and lower bearing portions of the base pedestal 51; Fig. 8 showing passages 53 through which these bearing surfaces may be supplied with lubricant.

The weight of the rotating turret structure then is carried by the top face of an outer rim 57 upstanding from the pedestal table 52 as Fig. 11 shows; said top face being engaged by a cooperating lower face of the rotatable turret plate 55. In order continuously to supply lubricant to these sliding surfaces use is made of rollers shown at 58 in Figs. 11 and 33 pressed by springs **58*a* against the lower face of turret plate 55 and being immersed at their lower edges in a bath of oil indicated at 59** in Fig. 33.

In the indexing machine 30 here represented such advancement is imparted to the turret 54 by motor means taking the form of a hydraulic cylinder 82 disposed in the machine base 50 as shown by Fig. 11 and having piston rod 83 (see Fig. 12) attached at its free end to a member 84 journalled on the lower end of the hollow vertical turret shaft 56. This member 84 carries a pawl 85 which engages a toothed ratchet wheel 86 that is keyed to turret shaft 56 as best shown by Fig. 12; said wheel having the five represented teeth spaced equally (at 72° intervals) around the wheel periphery. This turret indexing cylinder 82 is mounted so as to rock around top and bottom pins 87 (see Fig. 11) as piston rod 83 moves member 84 back and forth between the position shown by full lines in Fig. 12 and the position shown by dotted lines.

Pressure fluid for operating cylinder 82 is supplied thereto via the conduits shown at 89' and 91' in Fig. 59 under the control of a hydraulic valve SV1 later to be described. Admission of pressure fluid into cylinder 82's drive port 89 forces piston 90 forward causing pawl 85 to rotate ratchet wheel 86 and turret shaft 56 thereto attached in the clockwise direction as viewed from the turret top; which direction is the operative one for the Fig. 1 installation. Each such rotative movement is limited to 72° by a stop cylinder shown at 92 in Figs. 11 and 13 and later to be described; and attainment of each such 72° movement is accompanied by closure of the normally open contacts of a first limit switch shown at A in each of Figs. 12 and 59.

When now pressure fluid is admitted into return port 91 for cylinder 82, the piston 90 thereof draws rod 23 back into the cylinder and thereby pulls pawl 85 back of the next tooth on the ratchet wheel 86. This conditions the indexing mechanism for rotating the turret 54 through an additional travel of 72°. Attainment of the above piston rod withdrawal (represented by full lines in Fig. 12) is accompanied by closure of the normally-open contacts of a second limit switch shown at B in each of Figs. 12 and 59. Each of these two limit switches A and B may have the internal construction generally indicated by Figs. 40 and 48; their purpose will later become evident when the control system of Fig. 59 is described.

The stop cylinder 92 mentioned above may be mounted as shown in Figs. 11 and 13 on the stationary supporting structure 52 for rotatable turret 54; a bracket 94 being there represented for this purpose.

Attached to the piston 93 of this stop cylinder is a bar 95 vertically movable through a guide 96 here shown as being integral with the mounting bracket 94. Normally this bar 95 occupies the upward position shown by Figs. 12 and 13 wherein it engages the web 98 carried on the lower side of each of the five spindle mounts 69 for the five arm heads 60 on the rotatable turret 54.

An interlock switch shown at P in each of Figs. 13 and 59 closes its contacts when the turret stop bar 95 is drawn down by cylinder 92; and an indexing detector switch shown at Q in each of Figs. 13 and 59 also is mounted on the stationary supporting structure 52 for the turret 54 just beyond the stop cylinder 92 to be engaged by the web 98 on each of the five arm head supports 69 as same travels past the stop cylinder at the start of each turret indexing movement. Such engagement (as will later become evident) returns the stop bar 95 to the upward position shown in Figs. 11 and 13.

Through the control system for indexing and stop cylinders 82 and 92 which Fig. 59 shows (and which is more fully described later) the bar 95 is moved down by stop cylinder 92 before indexing cylinder 82 is called upon to advance the machine turret through another 72°; such downward movement resulting from admission of pressure fluid (under the control of limit switch B on indexing cylinder 82) into release port 97. Once the turret rotative movement has been started pressure fluid is (under the control of switch Q just discussed) admitted into stop port 99 for the aforesaid cylinder 92, thereby returning the stop bar 95 to the upward position represented in Figs. 12 and 13. The mentioned pressure fluid for operating stop cylinder 92 is supplied thereto via the conduits shown at 97' and 99' in Fig. 59 under the control of a hydraulic valve SV6 later to be described.

*Arm spacing and roll-over motors and control therefor*

From Figs. 8 and 11 it has been seen that the machine turret 54 is provided with five sets of motors 64—66; that the motor 64 in each set moves the arms 61 and 62 of the associated head 60 towards or away from each other and hence may be called the "arm-spacing" motor; and that the second motor 66 in each set serves to roll over the arms 61—62 and their carrying head 60 and hence may be called the "roll-over" motor.

Each of the five arm-spacing motors 64 and each of the five roll-over motors 66 may satisfactorily be of the hydraulic type disclosed and claimed by a co-pending application Serial No. 162,282 filed in the name of John A. Lasater on May 16, 1950 and issued March 31, 1953 as U. S. Patent No. 2,633,105 entitled "Vane Type Fluid Motor." The essentials of such a hydraulic motor are schematically represented by Fig. 58 hereof and the piping and valve system through which the aforesaid ten motors 64 and 66 are supplied with pressure fluid is diagrammed by the accompanying Fig. 57 hereof.

Figs. 8 and 11 show that all ten of these motors are similar both as to size and general construction, and a section through each taken on line 58—58 of Figs. 11 and 57 reveals the internal construction shown by Fig. 58. From Fig. 58 it will be seen that each of the hydraulic motors under discussion comprises a main casing or cylinder body 102 through which the central shaft 103 extends axially. A vane or paddle 104 carried by this shaft is free to rotate therewith through the arc of the cylinder body's interior that is not occupied by a partition block 105 fixed as indicated to said cylinder body 102. With this arrangement each motor 64 and 66 is capable of rotating its shaft 103 back and forth through a range of well over 180°.

A first inlet port 106 admits into the interior of cylinder body 102 fluid for driving the vane 104 and shaft 103 in one direction; and a second inlet port 107 on the other side of partition 105 similarly admits fluid for driving the vane and shaft in the opposite direction. The named operating fluid admitted as aforesaid may satisfactorily take the form of oil under pressure supplied through any suitable piping arrangement such as that shown in Fig. 57. There use is made of a pump or compressor 108 which generates a pressure of some suitable substantial value such as about 500 p. s. i. The oil or other working fluid under this pressure feeds through main pressure line 109 into a central hydraulic coupling shown generally at 110 in Figs. 11 and 57 and as to mechanical detail by Figs. 29–30–31 later to be described.

From the central coupling 110 on the assembling machine turret there extend branch pressure lines represented at **109*a* in Figs. 29, 30, 34, 35 and 57; each of these pressure lines leading to a pair of control valves shown generally at 112 and 113 in Figs. 32 and 33 and similarly designated in the diagram of Fig. 57. Each of these valves 112—113 is organized as shown in Figs. 34 and 35 and serves to transmit the pressure fluid from line 109*a* to one or the other of the aforesaid inlet ports 106 and 107 of the hydraulic motor 64 or 66 controlled by the valve. A better understanding of how this feeding occurs may be gained by assuming that the hydraulic motor of Fig. 58 has its ports 106—107 directly connected to the similarly marked outlets from the control valve diagrammed in Figs. 34–35 to show the two control positions of valve stem 114**.

With the control valve (112 or 113) in the stem-up position of Fig. 34 pressure fluid from supply line **109*a* enters the forward port 106 of the controlled hydraulic motor to produce rotation of vane 104 and shaft 103 that is clockwise as viewed in Fig. 58. This forces fluid from the other side (left in Fig. 58) of the vane out of the casing 102 through reverse port 107 and into exhaust line 115*a* leading from the motor valve (see Fig. 34) back to the central hydraulic coupling 110 on the turret as represented by Fig. 57; that diagram showing connections via coupling 110 of all five of the exhaust branch lines 115*a* with the main exhaust line 115 leading back to the sump of oil pump or compressor 108. In this way there may be established for each of the hydraulic motors 64 and 66** on the machine turret a pressure fluid circuit which operates the motor in the forward direction.

Operation of each controlled motor 64 and 66 in the opposite or reverse direction is accomplished by moving the stem 114 of the control valve (112 or 113) to the down position represented by Fig. 35. Now the pressure fluid from supply line **109*a* flows out of the valve through the lower outlet and into the reverse port 107 of the controlled motor (64 or 66). Under this condition the vane 104 and shaft 103 (see Fig. 58) are rotated counter-clockwise thereby forcing fluid from the other side of the vane (right in Fig. 58) out of cylinder 102 through port 106 and thence into exhaust line 115a as indicated by Fig. 35. As before, the incoming pressure fluid reaches the valve and motor through central coupling 110 on the machine turret and returns to the hydraulic pump 108 through the same coupling via main exhaust line 115**.

One satisfactory design for the aforesaid hydraulic coupling 110 is shown by Figs. 29–30–31. Fig. 11 shows that this coupling 110 is mounted at the top of the turret's hollow vertical shaft 56 through attachment of the coupling flange 118 (see also Fig. 29) over the opening in the horizontal turret plate 55. The fluid pressure line represented at 109 in Fig. 57 extends upwardly from the machine base through the hollow turret shaft 56 and into the coupling bottom as Figs. 11 and 29 show; the exhaust line represented at 115 in Fig. 57 leaves the coupling base at one side thereof as the same two drawing views further indicate.

Pressure line 109 thus feeds into a central extension tube shown at 119 in Figs. 29, 30–31. The top of this extension tube 119 communicates with a ring-like space 120 as shown by Figs. 29–30, and from that space there emanate the five pressure branch lines represented at 109a in Fig. 57. Said branch lines (not shown in Fig. 11) lead to the five sets of valves 112—113, one of which sets is shown by Figs. 32–33 and all five of which sets are represented by Fig. 8 as being mounted in suitable recesses in a casting portion 117 that extends around the turret periphery.

The branch exhaust lines 115a extend (as shown in Fig. 57) from the five valve sets 112—113 into a lower portion of the coupling body 121 which includes the five openings shown by Fig. 31 which lead into an annular exhaust space 122. As shown in Fig. 29, this exhaust space 122 communicates with a space 123 around central tube 119 through which space 123 fluid from all five of the branch lines 115a is free to flow through the wall of the lower body portion 124 into the main exhaust line 115 leading to the pressure pump 108 as shown by Figs. 11 and 57.

Said lower body portion 124 of the coupling is held in a stationary position by the main conduits 109 and 115 which lead thereinto (see Fig. 11); but the upper body portion 121, integral with flange 118 bolted to the turret plate 55 (again see Fig. 11), rotates with that turret plate and thus moves relative both to the lower body portion 124 and the central tube 119 of the coupling. At the same time vertical support is imparted to the said lower body portion 124 from the mounting flange 118 via a threaded collar 125 upon which there rests a ball thrust bearing 126 and on top of that bearing there rests a ring 127 having a threaded interior screwed on to the upper portion of the aforesaid lower body 124 of the coupling; the central tube 119 attaching via threads 128 to lower body portion 124 as shown by Fig. 29.

With this arrangement the coupling's upper body portion 121 carried by turret plate 55 (see Fig. 11) is free to move with the turret relative to the stationary coupling parts 119, 124 and 127. For preventing leakage of the pressure fluid between such relatively moving parts use is made of a pressure-line packing 130 and of an exhaust-line packing 131 organized as shown in Fig. 29.

The pressure-line packing 130 bears against the outside of central extension tube 119 and has the U cross-section shown. It is held in place by the lower rim 132 of a plug 133 screwed into the top of coupling body 121, web 134 (Fig. 30) attaching that rim 132 to the plug body and through the sides of that body there extend openings 135 (Figs. 29–30) which freely pass pressure fluid from the top of central tube 119 into annular port 120 and thence out through branch pressure lines 109a. Grooves 136 (Fig. 29) admit that pressure fluid to the inside of the U gasket 130 and thereby press same firmly against tube 119 to establish the required seal between that stationary tube 119 and the aforesaid gasket 130 which rotates relative thereto.

The exhaust line gasket 131 is similarly arranged. It is held in position against the upper outside of stationary coupling member 124 by means of a rim member 137 extending downwardly as shown into the U-shaped packing 131 and abutting at its top with the represented shoulder of the coupling body 121 which rotates with the machine turret. Holes 138 communicate to the inside of packing 131 the fluid pressure in exhaust port 122 and thereby hold this packing firmly against the outside of stationary member 124 to establish the required seal against leakage of pressure fluid.

Other forms of rotatable coupling obviously can be used in the mold assembling machine of our invention; however the coupling device 110 just explained is found to give especially satisfactory results and is therefore preferred.

Attention will now be directed to the facilities for actuating the five sets of hydraulic motor valves represented at 112—113 in Figs. 8 and 11 and shown in greater detail by Figs. 32–33–34–35 and 57. Fig. 32 shows that each of the valves 112 for controlling an arm spacing motor 64 has its stem 114 provided with a roller 140 which rides either on a cam 141 (Figs. 32–33–34) or on the top of a ring or band 142 which completely encircles the turret's stationary table portion 52 as represented in Fig. 11; this band or ring 142 being shown in developed schematic form by Fig. 37. It will also be seen that the stem 114 of each of the valves 113 which controls a roll-over motor 66 carries on the lower end thereof a member 144 in which there is rotatively mounted (via ball bearing 145 see Fig. 33) a cam follower 146 which rides in one or the other of two parallel grooves 147—148 in the valve control ring or band 142 encircling the stationary table 52 of the turret. At a point between Stations II and III as generally indicated by Fig. 37 there is provided a cross-over insert shown at 149 in Fig. 32.

As each pair of valves 112—113 moves with the turret structure 55 around the stationary table or platform 52 therebeneath (see Figs. 11 and 33) the follower cam 146 shifts from the lower groove 148 to the upper groove 147 upon its first encounter with cross-over insert 149, then continues in upper groove 147 for a complete turret rotation and upon its second encounter with cross-over 149 it shifts back from the upper groove 147 to the lower groove 148. During one rotation of the turret 54 a given roll-over control valve 113 therefore has its stem 114 down as shown in Figs. 32 and 35 with the result that pressure fluid from branch line 190a enters the reverse port 107 of the associated motor 66 (see Figs. 57–58) and thus moves the associated set of arms 61—62 to the position corresponding to movement of motor vane 104 (Fig. 58) toward the limit of possible counter-clockwise travel.

During the next rotation of the turret the same cam follower 146 of each roll-over valve 113 shifts to and rides in upper groove 147 bringing valve stem 114 up as indicated by Fig. 34. This reroutes pressure fluid from branch line 109a to the forward port 106 of the associated motor 66 and causes rotation of vane 104 in the clockwise direction, thereby turning the associated set of arms 61—62 completely over or through 180°. On the third rotation of the turret the cam follower 146 returns (at cross over 149—Fig. 32) from upper groove 147 to lower groove 148 and thereby brings the associated set of flask arms 61—62 back to their original position.

Accordingly, each set of flask and core box-receiving arms 61—62 rolls over through 180° once during each complete rotation of the machine turret 54 and the arms are turned in alternate directions upon successive turret rotations. This alternate turning action is indicated by Fig. 37; and by reason thereof satisfactory use may be made of flexible leads shown at 150 in Fig. 57 between each arm spacing motor 64 on the rotatable turret and the hydraulic valve 112 by which that motor is controlled. The need for such flexibility is occasioned by the fact that each motor 64 turns over with the head 60 for the associated set of arms 61—62, which head is rolled over in alternating directions by the associated motor 66; and in practice we find that lengths of heavy duty hose are adequate for providing this flexibility while conveying the pressure fluid to each motor 64.

But such flexible fluid connections are not required for the roll-over motors 66, since each of these is fixedly mounted on the turret platform 55 as shown in Fig. 11. The fluid connections from each hydraulic valve 113 on the turret to the associated motor 66 may, therefore, be of conventional metal tubing; these being shown at 151 in Fig. 57.

In each of these roll-over motor connections 151 there is inserted a flow-reducing valve shown at 152 in Fig. 57 and also at 152 in each of Figs. 8 and 10. The purpose of these valves 152 is to slow the roll-over speed as each set of flask-receiving arms 61—62 approaches the limit of travel in each roll-over direction. This is accomplished by equipping each turret head 60 with a bracket shown at 153 in Figs. 8 and 10.

During the intermediate portion of each arm roll-over movement this bracket 153 is disengaged from both of the valves 152 that are positioned on opposite sides of the arm carrying head 60 and that are connected in the fluid supply lines 151 for each roll-over motor 66 as indicated by Fig. 57. Under this condition the fluid supply line to the motor is unobstructed and the motor 66 therefore turns the arms 61—62 over at full speed. As, however, the limit of turnover travel is approached the leading edge of bracket 153 (beveled as indicated in Fig. 8) engages the stem 154 of valve 152 that is in the active fluid line to the motor and cuts down the rate of fluid flow by a predetermined amount.

This cut-down continues until the full limit of roll-over travel has been reached; the bracket 153 then occupying the position represented in Fig. 10. Upon return of the arm carrying head 60 in the opposite turnover direction, the same action is repeated. Each of the valves 152 imposes the aforesaid restriction in fluid flow therethrough only in the active pressure direction and allows the full rate of fluid flow therethrough in the reverse direction. This means that each turnover movement starts at full speed and continues thereat until the bracket 153 engages the valve 152 on the side of the arm head 60 which is opposite to that engaged by bracket 153 at the start of the turn-over movement.

In order that each turnover movement will stop with both flask-receiving arms 60—61 in the true horizontal represented by Figs. 11 and 14 there is attached to the back portion 68*a* of each head 60 a pair of diametrically disposed brackets 156, one of which is shown in Fig. 24. Each of these brackets is provided with a screw 157 whose head contacts the webs 98 (see also Fig. 11) which extends radially out from the rotatable turret table 55 beneath the bearings 67 and mounting 69 for each turret head. A locknut 158 permits adjustment in the length of bolt 157 beneath the bracket 156 and stop web 98 and thereby enables the limiting position of each arm head 60 to be accurately set for both directions of roll-over.

As has been seen from the diagram of Fig. 37, each set of flask-receiving arms 61—62 rolls over upon reaching a point between Stations II and III around the mold assembling machine 30; this rollover point further being designated by the curved arrow of Figs. 1 and 2. The accompanying movements of each set of arms towards and away from each other are as diagrammed by Figs. 36*a–b–c–d–e* later to be described.

From Figs. 36 and 37 it can be seen that each set of arms 61—62 is open upon leaving Station I and so stays until after passing Station II. At that point the roller 140 on the stem 114 of the associated hydraulic valve 112 encounters cam 141 on band 142 encircling the stationary member 52 beneath the rotating turret platform 55 (see Fig. 11). This raises the valve stem from the original position of Fig. 35 to the elevated position of Fig. 34 and thereby shifts transmission of pressure fluid in branch conduit 109*a* from the valve's lower or reverse port 107 to the upper or forward port 106 (see also Fig. 58). Such action by the control valve 112 causes the associated motor 64 to close the two arms 61—62 towards each other.

Once closed, the arms so remain until Station III is approached. At this point the roller 140 of valve 112 leaves cam 141 and reverses the flow of pressure fluid into the associated motor 64. This flow reversal reopens the arms 61—62. The arms stay reopened until after Station IV has been passed when the roller 140 of the valve 112 encounters a second cam shown at 141*a* in Fig. 37. Here the actions just described are repeated with the result that the arms 61—62 once more close. They then remain close until after Station V has been passed when the roller 140 on valve 112 leaves cam 141*a* and reopens the arms before they have returned to the original Station I.

Looking once more at the machine arm roll-over motors shown at 66 (Figs. 8, 11 and 57), it will be seen that the pressure fluid initiating each roll-over movement of each arm head 60 continues to be applied by control valve 113 (Figs. 32–33, 37, 57) to the interior of motor 66's casing 102 (Fig. 58) during all of the time that the head carried arms 61—62 stay in the position defining the roll-over movement end. As earlier seen from Fig. 24 each such roll-over movement is stopped by contact of screw 157 carried by the rear head portion 68*a* with the web 98 carried beneath the head mounting 69 as shown in Figs. 11 and 13.

Such stoppage in roll-over movement occurs when the head carried arms 61—62 are accurately aligned with respect to the horizontal and vertical as the views of Figs. 8, 9, 11, 14, 15 show. By reason of the continued application of pressure fluid to the interior of rollover motor 66 said accurately aligned position is positively maintained until the motor control valve 113 is called upon (as shown by Figs. 32–35, 37) to transfer application of the pressure fluid to the opposite port (see Fig. 58) of the motor 66.

A similar functioning is provided for on the part of each arm spacing motor 64 controlled by a valve 112 (Figs. 32–33, 57) as earlier described. Referring to Figs. 11, 14–15, 57–58 it will be seen that when the arms 61—62 on each turret head 60 are brought together (by rotation of motor pinion 73 which is clockwise in Fig. 14) the closing movement continues until the arm plates 71 and 72 come together in abutting relation at their facing edges. This abutment blocks further rotation of the motor pinion 73; but the motor 64 continues to exert torque on the pinion by reason of continued application within the interior of the motor casing 102 (Fig. 58) of the pressure fluid transmitted thereto through the aforesaid control valve shown at 112 in Figs. 32–35 and 57.

The spacing of the machine arms 61—62 in this closed position is so chosen that the drag 12 and the core box 26 brought together by closure of the arms between Stations II and III are held firmly against each other with the two arms 61—62 closely approached to their limiting positions as determined by the aforesaid abutment of arm plates 71 and 72. The aforesaid relationship does not prevent free withdrawal of the assembled mold 12–14 after arrival at Station V since the side bars 28 of the drag 12 supporting the cope 14 ride on the arm rollers 76 out of which they are readily withdrawn by the mold-off apparatus shown in Fig. 54.

Similarly when the arms 61—62 carried by each of the turret heads 60 occupy the open position shown in Figs. 9, 11 and 14 the spacing motor 64 positively holds them in that open position by reason of continued application to the motor interior 102 (Fig. 58) of the pressure fluid transmitted to the motor via the control valve shown at 112 in the drawings hereof.

*Drag-charging and arm-loading apparatus at station I*

The apparatus provided at "Drag-On" Station I is generally indicated by the top plan view of Fig. 1 and further elements thereof are shown in simplified schematic form by the operation diagram of Fig. 38 (side elevation on line 38—38 of Fig. 1).

At this Station I use is made of a drag-charging machine shown at 160 in Fig. 1 intermediate the drag shake-out 46 and the arms 61—62 (see Fig. 38) carried by the registering turret head 60 of the central mold assembling machine 30. Between the sake-out 46 and this machine 160 is a length of flask return track shown at 161 in Fig. 1. This track extends to machine 160 at the elevation represented at *b* in Fig. 38 and may satisfactorily be equipped with side rollers corresponding to 162 in Fig. 39, along the tops of which the side bars 28 of the drag flasks 12 may ride as represented by Fig. 39.

The drag-charging machine 160 of Fig. 1 is represented by the central portion of Fig. 38 as comprising apparatus of conventional character which is shown only schematically herein; disclosure of full details not being deemed essential to an understanding of the present invention. Said conventional drag machine 160 is here illustratively shown as utilizing a platen 164 carrying on its upper face the drag-half of the pattern 12*a* for the casting that is to be produced. This platen 164 is supported by a cylinder 165 which at proper times is controlled by an operator to move the platen 164 (and its pattern-half 12*a*) from the represented elevation *c* to the elevation *b* of flask track 161 (Fig. 1) and then on to even higher elevation *a*; such elevational changes being for a purpose to be made evident presently.

Said drag-charging machine 160 of Figs. 1 and 38 also utilizes the earlier mentioned chute 39 through which "green" sand from the overhead conveyer system (fed from elevator outlet 38 in Fig. 1) may at proper times be released into the empty flask 12 when supported on platen 164 as shown in Fig. 38. This chute normally occupies the position shown at 39 in full lines but at proper times is moved (to the right in Fig. 38) over the platen 164 and pattern 12*a*. As here illustratively shown, the same machine 160 also utilizes a squeezer head 166 which normally occupies the full line position of Fig. 38 but at times may be moved (to the left in that figure) directly over the flask 12 when supported on the platen 164.

To the right of machine 160, as shown in Fig. 38, there is provided a carriage 168 mounted via wheels 169 on a staitonary track 170. This carriage normally occupies the retracted position shown in full lines but at proper times is moved forward by cylinder 171 to the position shown by dotted lines underneath the assembling machine arms 61—62. The shell of this cylinder is attached as shown to an upward extension 172 from the rear of track 170 while the piston 173 is connected via rod 174 to the forward portion of carriage 168.

Admission of pressure fluid into cylinder inlet 175 drives the piston 173 forward moving the carriage 168 with it; while admission of pressure fluid into the opposite inlet 176 returns the carriage to the full line position. Respectively registering the completion of such forward and return movements is a limit switch shown at C and an interlock switch shown at D in Figs. 38 and 59. The mentioned pressure fluid for operating carriage cylinder 171 is supplied thereto via the conduits shown at 175′ and 176′ in Fig. 59 under the control of a solenoid valve SV2 later to be described.

To simplify explanation, it will here be assumed that there is provided at elevation *b* in Fig. 38 a series of side rollers 162 along which each drag flask 12 approaching the charging machine 160 from track 161 (Fig. 1) rides on side bars 28 as indicated by Fig. 39; such rollers serving to carry the flask from horizontal position 1 of Fig. 38 successively to position 2 over the platen 164 and pattern 12*a* and then on to position 3 over the withdrawn carriage 168.

Said carriage 168 is provided with a rear upright 178 having a latch 179 which, when positioned behind a drag flask 12, serves to carry that flask forward on rollers 162 with the carriage 168, but which upon return of the carriage from the dotted to full line position of Fig. 38 is pushed down beneath the drag flask bottom along which it rides until returned behind a successive drag flask 12 as shown by the full lines of Fig. 38.

Further utilized by the apparatus at Station I is an interlock switch shown at E in both of Figs. 38 and 59. The purpose of this interlock switch is to register the presence of a flask 12 above the retracted carriage 168 at horizontal position 3. Said interlock switch E and each of the earlier mentioned switches C and D at Station I is of the "normally open" type diagrammatically represented by Fig. 40.

The manner in which the just described apparatus at Station I operates will now be explained. Drag flasks 12 with sand remaining therein are lifted by a powered hoist (not shown here) from the main mold track shown at 32 in Fig. 1 as they approach the drag shake-out 46; this lifting being accomplished through a hoist-attached chain or cable (not shown) provided with a conventional hoist hook (not shown) whose opposing prongs engage lift fittings secured in the usual way to the ends of each drag flask 12 as shown at 25 in Figs. 4–5–6–7, 16–17–18. Each flask 12 is in this manner placed upon the shake-out 46 which through mechanical vibrations causes all the sand to drop from the flask interior down through the shake-out grate and into the underground return system 43 (Fig. 1).

Thus freed of sand, each drag flask 12 is lifted by the aforesaid powered hoist from the shake-out 46 to the flask return track 161; this track being substantially horizontal and having the elevation shown at *b* in Fig. 38. Each drag flask 12 so placed upon the track 161 is related thereto as shown by Fig. 39 so that the open portion of the flask faces down with the side bars 28 riding on track rollers 162 as indicated. An operator then pushes each empty flask 12 along roller track 161 (Fig. 1) first to position 1 of Fig. 38 adjacent the drag charging machine 160, and then into position 2 over the platen 164 and pattern 12*a* which initially are at lower elevation *c*.

Said platen and pattern 12*a* are now moved by cylinder 165 upwardly beneath the flask 12 at position *b*2 into contact with the lower face of the flask rim. The sand chute 39 is next moved to the dotted position over the empty flask 12 at *b*2 and there is released therefrom a measured quantity of sand which falls into the flask 12 as generally indicated at 13; the sand being loose and uncompressed at this point. The chute 39 is thereupon returned to the solid line position of Fig. 38 leaving the sand filled drag 12 on platen 164 with the drag exposed at its top.

The squeezer head 166 is now moved from position 3 to position 2 over the sand filled flask 12 at *b*2 and the platen 164 is by cylinder 165 moved further upwardly bringing the loose sand in flask 12 against the lower face of squeezer head 166. Said head is next mechanically vibrated in well known manner for the purpose of compacting the sand firmly around the pattern 12*a* and against the sides of the flask and between the perforated cross members shown at 180 in Figs. 16–17–18; those members imparting support to the compacted sand in conventional manner. It will be noted that the squeezer head 166 has the customary slots 181 into which the flask cross members 180 (Figs. 16–18) fit, thereby allowing intervening portions of the head to rest directly upon and firmly compact the sand 13 in flask 12.

Following this compacting operation the drag flask 12 filled with sand above and around pattern **12*a* is lowered by plate 164** from elevation *a* to elevation *b* where the side bars 28 of the flask rest upon track rollers 162 as shown in Fig. 39. The platen 164 and pattern **12*a* are then further lowered by cylinder 165** to elevation *c* leaving the pattern cavity 16 (Fig. 4) in the exposed bottom face of the sand 13 within flask 12. While this is going on the squeezer head 166 is shifted from the dotted position of Fig. 38 to the full line position out of vertical register with the sand filled flask 12 at location *b*2.

From this location *b*2 the sand filled flask 12 is advanced along track rollers 162 to horizontal position 3 directly over the carriage 171. During such advancement the latch 179 at the carriage rear is pushed downwardly and forwardly until the rear edge of flask 12 has cleared same when the spring 183 returns the latch to the full line position shown behind flask 12. At the same time the forward end of the flask engages interlock switch E and effects closure of its contacts for a purpose later to be explained.

The drag flask 12 thus charged with sand which carries the impression of pattern **12*a* is now ready for advancement into the upper arm 61 of the assembling machine head 60 which is in register with Station I as represented in Figs. 1 and 38. Such advancement is accomplished by admitting into port 175 of cylinder 171 pressure fluid which forces piston 173 forward carrying with it carriage 168; the latch 179 now moving sand-charged drag 12 into the arm-engaged position represented by Fig. 22. Spring held rollers 79 in the sides of arm 61 thereupon engage notches 29 in side bars 28 and thereby hold the drag 12 in this upper machine arm 61** during subsequent indexing thereof to Station II (Fig. 1), and then on to Station III accompanied by arm roll-over as will later be described.

Following advancement of each sand charged drag 12 from position *b*3 to position *b*4 of Fig. 38 the carriage 168 is automatically returned by cylinder 171 to position *b*3. This return is accomplished by admitting into port 176 of that cylinder pressure fluid which moves the piston 173 to the left; the control facilities utilized for accomplishing such admission being actuated by limit switch C as diagrammed in Fig. 59 later to be described.

The Station I apparatus of Fig. 38 is now in condition for receiving another empty drag flask 12 from location *b*1, charging it at locations *b*2 and *a*2 with sand which receives the impression of pattern **12*a***, and moving it on to location *b*3 where carriage 168 functions as just described to enter it into the upper arm of the next head 60 which machine 30 brings into register with Station I.

*Core-forming and arm-loading apparatus at Station II*

At Station II there is provided a pair of core forming machines shown at 185 and 186 in Fig. 1; these being organized as indicated by the simplified schematic representation of Fig. 41 wherein the Station II apparatus is viewed from line 41—41 of Fig. 1. This apparatus may satisfactorily be of conventional character and hence detailed representation thereof has not been attempted herein; disclosure of full details not being deemed essential to an understanding of the present invention.

Empty core boxes 26 of the type shown in Figs. 25–26–27 are returned from Station III (the details of which will later be described) by gravity along downwardly inclined track 187 (Fig. 1) to position *c*1 of Fig. 41 where they continue to be supported on the rollers (not shown) of track 187. At this point each core box 26 is ready for entry into core forming machine 185 where support may satisfactorily be derived from side rollers corresponding to those shown at 188 in Fig. 42; and in the description which follows it will be assumed that the side bars 28 of each core box 26 ride on the tops of generally similar rollers during horizontal advancement of each core box through machines 185 and 186 and then on to the section of track 189 (Fig. 1) between core machine 186 and the assembling machine arms 61—62 that are in register with Station II. In order to simplify the diagram of Fig. 41, no attempt has been made therein to show such rollers 188 except in the companion view of Fig. 42.

The first machine 185 at Core Station II is here illustratively shown as utilizing an elevator platform 191 supported by a cylinder 192 capable of moving platform 191 upwardly from the full line elevation *c* to the higher elevation *b* shown dotted and also of lowering the platform somewhat below full line position *c* so as to clear the bottom of core box 26. Above elevator 191 at horizontal position 2 is the earlier mentioned sand chute 40 from which "green" sand 13′ (brought to the chute via the overhead conveyor system) can be released in measured quantities into the cavity of an upset member or retainer 193 when the elevator 191 has positioned the core box 126 therebeneath as shown by dotted lines at *b*2 in Fig. 41.

Looking now at the companion core machine 186, it is illustratively here shown as utilizing a squeezer platform 195 carried by a cylinder 196 which at proper times raises the platform from the position shown in full lines at elevation *c* to the higher position shown in dotted lines at elevation *b*; and which also can lower the platform below core box 26 when riding via side bars 28 at elevation *c* on the tops of rollers such as shown at 188 in Fig. 42. In the arrangement represented there is carried above the squeezer members 195—196 in a suitable stationary support 197 an upper core box half **26*a* which substantially duplicates the lower core box design represented at 26 in Figs. 25–26–27; the difference being that the upper portion 26*a*** is inverted as shown at *b*3 in Fig. 41.

Beneath the roller track 189 between the second core machine 186 and the registering arms 61—62 of the central assembling machine 30 (see Fig. 1) there is provided a core box carriage 198 mounted on wheels 199 which ride on a stationary track 201. This carriage normally occupies the retracted position shown at 4 in Fig. 41 but at times may be moved forwardly to position 5 beneath assembling machine arms 61—62 under the action of cylinder 200 when pressure fluid is admitted into port 202 to drive piston 203 forward and thereby push the carriage forward via piston rod 204.

In this illustrative organization of apparatus at Station II, such forward movement is transmitted by latch 205 to a core box 26 in location *c*4 bringing that core box into the lower arm 62 of the assembling machine as shown at *c*5 in Fig. 41 and as also shown by Fig. 28. Return of the carriage from the dotted position 5 is later accomplished by admitting into port 206 pressure fluid that moves piston 203 to the left and with it piston rod 204 and carriage 198 attached thereto. The mentioned pressure fluid for operating carriage cylinder 200 is supplied thereto through the conduits shown at 202′ and 206′ in Fig. 59 under the control of a solenoid valve SV3 later to be described.

Also provided at Station II is an interlock switch shown at F in each of Figs. 41 and 59. The purpose of this interlock switch is to register the presence of a core box 26 above the retracted carriage 198 at horizontal position 4; as represented it is of the "normally open" type shown by Fig. 40. Other similarly constructed switches at Station II designated G and H in Figs. 41 and 59 close their normally open contacts respectively when carriage 198 reaches its fully retracted position shown in full lines and its fully advanced position shown in dotted lines.

The operation of the core forming apparatus represented in Fig. 41 will now be reviewed. Each empty core box 26 arriving from return track 187 (Fig. 1) at position *c*1 of Fig. 41 first has placed therein by an operator three small quantities of sand 13′; these placements being at near the center and near the two ends of the core box cavity (best shown in Fig. 25). Upon these three sand support points there is now placed the core arbor shown at 21 in each of Figs. 6, 7 and 41.

The core box 26 thus carrying this arbor is next moved horizontally from the end of roller track 187 (Fig. 1) to position *c2* above elevator platform 191 of machine 185 (Fig. 41). Cylinder 192 is now brought into action to raise box 26 on elevator 191 to position *b2* immediately beneath the stationary upset retainer 193. The cavity in this retainer 193 is now filled with sand 13' released from stationary chute 40. Vibration is next applied (by conventional means not shown in Fig. 41) to the lower core box half 26, thereby settling the sand 13' into the core box cavity and flush with the top of upset retainer 193. This having been done, the elevator 191 lowers the core box with the contents from the elevation *b* (shown in dotted lines) to elevation *c* (shown in full lines). In this condition the sand fully fills the cavity in the lower core box half 26 and extends up therefrom as shown by 13' at location *c2*; the excess sand there represented being sufficient to completely fill the cavity in the upper core box half 26a and receive firm compacting therefrom.

Next the core box with contents is moved horizontally (along side rollers corresponding to 188 in Fig. 42) from location *c2* to location *c3* immediately above the squeezer platform 195. Said platform is by cylinder 196 now raised bringing the core box 26 and contents up against the open face and cavity of the upper core box half 26a stationarily mounted at 197. Here there is effected the firm compacting earlier mentioned which forms the finished core shown at 16 in Figs. 4 and 41. This finished core includes the arbor 21 positioned as indicated by Figs. 6 and 7. This having been accomplished, squeezer platform 195 is now lowered by cylinder 196, withdrawing the lower core box half 26 and the finished core 15 therein away from the upper core box half 26a and into position *c3*.

From here the lower core box half 26 with finished core 15 resting therein is moved horizontally to position *c4* over carriage 198 where side rollers 188 of track 189 impart the necessary support via box side bars 28. Such forward movement advances the core box 26 ahead of depressable latch 205 which thereupon engages the back of the core box as shown at *c4*. By means of the control facilities diagrammed in Fig. 59 pressure fluid is thereupon admitted at 202 causing cylinder 200 to travel forward and carry the core box 26 into the registering lower arm 62 of the central assembling machine 30. When so positioned the core box relates itself to the arm sides 62 as represented in Fig. 28; spring mounted rollers 79 holding the box in position for the indexing and turnover movements which later occur.

The control facilities of Fig. 59 thereafter admit pressure fluid into port 206 causing cylinder 200 to return carriage 198 from position 5 beneath machine arms 61—62 to position 4 shown in full lines by Fig. 41. This places the apparatus at Station II (as shown by Fig. 41) in condition to receive another empty core box 26 from return track 187 (Fig. 1), to form a completed core 15 in same, and to insert that core box and core in the next set of arms that later is brought by assembling machine 30 into registry with Station II.

Meanwhile the assembling machine arms 61—62 at Station II respectively hold the drag 12 and the core box 26 as indicated at the right of Fig. 41 and also at the right of Fig. 36*b*. As the assembling machine turret 54 now advances these arms 61—62 from Station II to Station III the arms first close and then roll over as indicated by the diagram of Fig. 37; their condition just before arriving at Station III being as represented at the left of Fig. 36*b*. The aforesaid arm closure brings the openings 18' (Fig. 25) in the core box ends over the pins 17 of the drag 12 thereby guiding the core box into accurate alignment with the drag and assuring that the completed core 15 resting therein is accurately positioned in the drag cavity (shown at 16 in Fig. 4).

This positioning is maintained by the closed arms 61—62 during their aforesaid roll over which puts the drag 12 on the bottom and core box 26 on the top. Upon arriving at Station III the rolled over arms 62—61 have been opened (again see Fig. 37) allowing the finished core 15 to rest in the core box 12 as shown in Fig. 36*c* and the empty core box 26 to be lifted upwardly away therefrom.

*Arm-unloading and core box turnover apparatus at station III*

Looking at the right portion of Fig. 36*c* it will be seen that the empty core box 26 is there being withdrawn from the upper arm 62 and being turned over at Station III preparatory to being returned to Station II by gravity along the downwardly inclined roller track shown at 187 in Fig. 1. The apparatus for accomplishing such withdrawal and turn-over is represented by Figs. 43–44–45 and an operation diagram therefor is presented by Fig. 49; said diagram making a simplified showing of the turn-over apparatus as viewed from line 49—49 of each of Figs. 1 and 43.

The top plan view of Fig. 43 constitutes an enlarged showing of the turn-over facilities shown at Station III in Fig. 1. As here illustratively represented these comprise a turn-over table 208 carried by a mounting frame 209 secured to a shaft 210 that is powered by a pair of hydraulic motors 211 and 212 coupled with the two shaft ends. Serving to support these motors and the turnover shaft 210 which they drive is a pedestal structure shown at 214 in Figs. 43–44.

Each of the turnover motors 211—212 is here shown as being of the same general type earlier described by reference to Fig. 58; it comprising a cylinder body 102 having fixed therein a partition 105 along one side of the motor shaft. Carried by this shaft is a vane 104 which serves to rotate the shaft in one direction when pressure fluid is admitted through port 106 and to rotate the shaft in the other direction when pressure fluid is admitted into port 107. In the showings of Figs. 43–44 the pressure lines leading to the aforesaid two motor ports are marked 106' and 107'; these two lines establishing parallel connection for the two turnover motors 211—212. A single motor of higher torque output can of course be substituted if desired.

The turnover shaft 210 driven by the two motors here represented at 211—212 imparts rotative movement to mount 209 by which turnover table 208 is carried. This table is comparatively heavy and to reduce the torque necessary to lift same, use is made of a counter weight shown at 215 in Figs. 43–44. On the two sides of the central pedestal 214 there are provided two additional pedestals 216 and 217 which respectively take the weight of table 208 when it occupies the two extreme positions in the range of its turnover travel. Pedestal 217 is closest to the central mold assembling machine 30 of Fig. 1 while pedestal 217 is closest to the core box return track 187.

Looking now at the turnover table 208 itself, each side thereof is provided with two parallel rows of rollers 219 spaced from each other as shown in Fig. 45 sufficiently to allow entry therebetween of the side bars 28 with which each of the core boxes 26 is provided; one such core box so held between the roller rows 219 being represented in Fig. 50.

The turnover table is further provided with a manipulator cylinder shown at 220 in each of Figs. 43–44–45, 49 and 50; the shell of this cylinder being fixed to the structure of table 208. A rod 22 driven by the piston 222 of this cylinder is attached at its outer end to a carriage 223 that is free to slide outwardly from the table on rollers 224 mounted in guide brackets 225 as best shown by Figs. 43, 47 and 50. At the outer end of this carriage 223 is a member 226 provided with a hookover latch represented at 227 in Figs. 44 and 49.

With the carriage 223 extended this latch functions to hookover the inner end of a core box 26 still in the assembling machine arms as represented at the right of Fig. 49 (and also by Figs. 28). Then as the manipulator cylinder withdraws the carriage into the turnover table 208 the latch 227 brings with it the empty core box 26, thereby transferring the core box from the assembling machine arms into the turnover table as indicated by Fig. 50. As hydraulic motors 211—212 thereafter turn the table over (from pedestal 217 to pedestal 216 in Fig. 44) gravity causes the latch 227 to continue to hang down from member 226 so that when the turnover table 208 reaches the other extreme position (over support 216 in Fig. 44) the latch 227 will have dropped down below the level of the empty core box 226 as represented at the left of Fig. 49. In this way the latch 227 serves to pull the core box 26 out of the assembling machine arms and then automatically to drop away from the core box after turnover has been effected.

At the inner end of turnover carriage 223 there is mounted an ejector shown at 228 in each of Figs. 44, 45 and 49. Like hookover latch 227 this ejector 228 travels with the carriage 223. Each empty core box 26 is drawn into turnover table 208 ahead of this ejector 228 so that when carriage 223 is pushed out from table 208 at the end of the turnover cycle the ejector will push the empty core box 26 thereahead as represented at the left of Fig. 49.

Pressure fluid for operating the manipulator cylinder 220 is supplied to the two admission ports thereof through flexible conduits shown at 230 and 231 in Figs. 43, 44, and 59; control of such pressure fluid being effected by a solenoid valve shown at SV8 in Fig. 59 and also in Figs. 43 and 44. Control of this valve SV8 is accomplished by means of electrical switches shown at S, T, U, and Y in Figs. 43, 44, 49 and 59; each of these switches being of the "normally open" type diagrammed by Fig. 48. Further provided in the turnover apparatus at Station III are the additional switches R and W which perform functions later to be made evident.

Pressure fluid for operating the parallel turnover motors 211—212 is supplied thereto through conduits shown at 233 and 234 in Figs. 43, 44 and 59; such pressure fluid being under the control of a solenoid valve shown at SV7 in Figs. 44 and 59. For slowing the speed of turnover upon approach to the limit thereof in each direction there are inserted between fluid lines 233—234 and the port conduits 106' and 107' (see Fig. 43) for motors 211—212 the flow reducing valves shown at 235 in each of Figs. 43, 46 and 59. These correspond to the earlier described devices 152 provided for the arm rollover motors 66 on the turret 54 of the central assembling machine; and the stems 236 thereof are selectively depressed by a cam shown at 237 in Figs. 43 and 46 as being carried by the shaft 210 to which the turnover motors 211—212 are coupled.

With stem 236 so depressed, each valve 235 restricts the flow of pressure fluid therethrough and thereby causes a slowing down of the turnover table 208 upon approach to its limit of travel in either direction; each of these valves 235 being organized so that stem depression does not restrict fluid flow in the reverse direction. In this way the turnover motors 211—212 begin each table turnover movement at full speed and have their speed cut down only toward the end of the turnover movement.

How the core box turnover apparatus at Station III operates will have become more or less apparent from the foregoing description of the apparatus construction and organization. Upon delivery to Station III of each empty core box 26 in the upper arm of the assembling machine head 60, as shown at the right of Fig. 49, motors 211—212 rotate turnover table 208 (to the right in Fig. 49) from return track 187 (Fig. 1) into registry with the upper arm of machine head 60 while manipulator cylinder 220 pushes carriage 223 out of the table as shown by dotted lines at the upper right of Fig. 49. This carriage extension is completed when the table 208 arrives in the horizontal (at the right in Fig. 49) position adjacent to machine head 60; and latch 227 then is behind the core box 26 as further shown at the right of Fig. 49.

Manipulator cylinder 220 now draws the carriage 223 back into table 208 causing latch 227 to pull the empty core box 26 out of the assembling machine arm and into the table interior with the core box side bars 28 riding between the parallel rows of table side rollers shown at 219 in Fig. 50. In this position the empty core box 26 closes limit switch R causing (as indicated by Fig. 59) motors 211—212 to rotate table 208 (via its mounting shaft 210) to the left (or counterclockwise) as the apparatus is viewed in Fig. 49. Table 208 thus carries the empty core box 26 from position *b2* in Fig. 49 wherein the cavity portion faces down to the position *a3* wherein the cavity portion faces up as shown at the left of Fig. 49.

At this point the manipulator cylinder 220 starts to push the carriage 223 out of table 208. Ejector 228 now moves the empty and turned over core box 226 with the carriage out of the table 208 and onto supporting rollers 238 which at location *a4* engage core box side bars 28 as indicated in Fig. 51. This completes the core box turnover cycle and places the turnover apparatus at Station III in condition for receiving and turning over another empty core box 26.

From location *a4* of Fig. 49 (which corresponds to the extreme right of Fig. 44) the empty core box 26 enters the roller track shown at 187 in Fig. 1 and advances theredown under the action of gravity from Station III back to Station II. How the aforesaid downward inclination of this track 187 is made possible will become apparent upon comparing Fig. 49 with Fig. 41. Fig. 49 shows that upon discharge from the turnover apparatus at Station III each empty core box 26 is at elevation *a* somewhat above the opened upper arm of the assembling machine head 60; Fig. 41 shows that on delivery to the core forming apparatus at Station II each empty core box 26 is at lower elevation *c* corresponding to the opened lower arm 62 of the central assembling machine head 60. In the illustrative apparatus here disclosed, this elevation difference is of the order of two feet; meaning that each turnover core box 26 placed upon return track 187 at Station III is at a level approximately two feet higher than after having been delivered by track 187 to core forming machine 185 at Station II. This provides ample slope down which the empty turned over core boxes 26 can freely gravitate along roller track 187.

*Cope-charging and arm-loading apparatus at Station IV*

Each assembling machine arm head 60 leaving Station III carries to Station IV in the lower arm thereof (61 as here shown) the drag 12 with the core 15 resting therein as represented by Fig. 36*c*; the upper arm of the head (62 as here shown) now being empty and the two arms 61—62 being spread from each other and arriving at Station IV in the same relative positions as they had when leaving Station III (see Fig. 37).

Figure 36D:
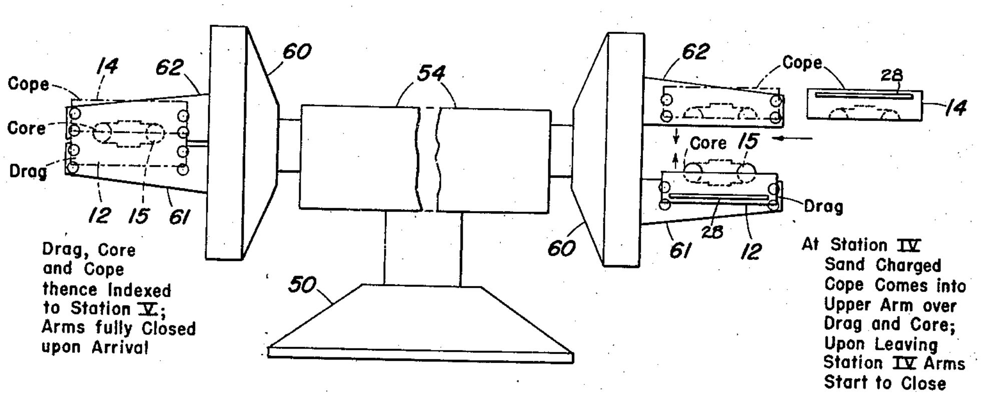

In reaching Station IV the upper arm 62 is therefore ready (as shown at the left of Fig. 36*c*) to receive the sand-charged cope represented at 14 in Fig. 4 and at the right of Fig. 36*d*. The apparatus provided at Station IV for charging the cope flasks with sand is shown by Fig. 52 in simplified schematic form as viewed on line 52—52 of Fig. 1; this "Cope-On" apparatus at Station IV being generally indicated by Fig. 1 in top plan view.

Said Station IV apparatus makes use of the cope-charging machine shown at 240 in Fig. 1 intermediate the cope shake-out 47 and the set of central machine arms 61—62 (see Fig. 38) that is in registry with this Station IV. Between the shake-out 47 and this machine 240 is a length of flask return track shown at 241 in Fig. 1. This track extends to machine 240 at the elevation represented at *b* by Fig. 52 and it may satisfactorily be equipped with side rollers corresponding to 242 in Fig. 53, along the tops of which rollers the side bars 28 of each cope flask 14 may ride as represented by Fig. 53.

The cope charging machine shown at 240 in Fig. 1 is represented by the central portion of Fig. 52 as comprising apparatus of conventional character which is shown only schematically herein; disclosure of full details not being deemed essential to an understanding of the present invention. Said conventional cope machine 240 is here illustratively shown as utilizing a platen 243 carrying on its upper face the cope half of the pattern **14*a* for the casting that is to be produced. In the arrangement represented this platen 243 is supported by a cylinder 244 which at proper times moves (under the control of an operator) the platen 243 (and its pattern half 14*a***) from the represented elevation *c* to the elevation *b* of flask track 241 (Fig. 1) and then on to even higher elevation *a*; the purpose of such elevational changes to become evident presently.

The cope-charging machine 240 of Figs. 1 and 52 also utilizes the earlier mentioned chute 41 through which "green" sand from the overhead conveyor system may at proper times be released into the empty flask 14 when supported on platen 243 as shown in Fig. 52. This chute normally occupies the position shown at 41 in full lines but at proper times is moved (to the right in Fig. 52) over the platen 243 and pattern **14*a*. The illustratively disclosed machine 240 also utilizes a squeezer head 245 which normally occupies the full line position of Fig. 52, but which at times may be moved (to the left in that figure) directly over the flask 14 when supported on the platen 243**.

To the right of machine 240 shown in Fig. 52 there is provided a carriage 247 mounted via wheels 248 on the stationary track 249. This carriage normally occupies the retracted position shown in full lines but at proper times is moved forward by cylinder 250 to the position shown by dotted lines underneath the assembling machine arms 61—62. The shell of this cylinder is attached as shown to an upward extension 251 from the rear of track 249, while the piston 252 is connected via rod 253 to the forward portion of carriage 247. Pressure fluid for operating carriage cylinder 250 is supplied thereto via the conduits shown at 254′ and 255′ in Fig. 59 under the control of a solenoid valve SV4 later to be described.

Admission of pressure fluid into port 254 drives the piston 252 forward moving the carriage 247 with it; while admission of pressure fluid into the opposite port 255 returns the carriage to the full line position. Respectively registering the completion of such forward and return movements is a limit switch shown at K and an interlock switch shown at J in Fig. 52 and also in the control diagram of Fig. 59.

To simplify explanation it will here be assumed that there is provided at elevation *b* in Fig. 52 a series of side rollers 242 along which each cope flask approaching the charging machine 240 from track 241 (Fig. 1) rides on side bars 28 as indicated by Fig. 53; such rollers serving to carry each flask 14 from horizontal position 1 of Fig. 52 successively to position 2 over the platen 243 and pattern **14*a* and then on to position 3 over the withdrawn carriage 247**.

Said carriage 247 is provided with a rear upright 256 having a latch 257 which, when positioned behind a cope flask 14, serves to carry that flask forward on rollers 242 (Fig. 53) with the carriage 247, but which upon return of the carriage from the dotted to full line position of Fig. 52 is pushed down beneath the cope flask bottom along which it rides until returned (as shown by the full lines of Fig. 52) behind a successive cope flask 14.

Further utilized by the apparatus at Station IV is an interlock switch shown at X in both Figs. 52 and 59. The purpose of this interlock switch is to register the presence of a cope flask 14 above the retracted carriage 247 at horizontal position 3. Said switch X and each of the earlier mentioned switches J and K at Station IV is of the "normally open" type diagrammed by Fig. 40.

Still further included in the Station IV apparatus generally represented by Fig. 52 are conventional means (not shown) for forming in one side of the cope sand 13 the sprue opening represented at 23 in Figs. 4 and 5. Mechanism for forming such sprue openings being well known, no attempt is here made to represent same in detail; instead it will suffice to say that each cope flask 14 filled with sand 13 by the apparatus of Fig. 52 in the manner here described will in finished form have therein the usual sprue opening 23 (Figs. 4–5) into which molten metal may later be poured.

The manner in which the just described apparatus at Station IV operates will now be explained. Cope flasks 14 with sand remaining therein are lifted by a powered hoist (not here shown) from the tops of the poured molds as they approach the cope shake-out 47 in traveling on cars 33 along the main mold track 32 of Fig. 1; this lifting being accomplished through a hoist chain or cable (not shown) provided with a conventional hoist hook (not shown) whose opposing prongs engage lift fittings secured in the usual way to the ends of each cope flask 14 as shown at 25 in Figs. 4–5–6–7, 16–17–18. Each cope flask 14 is in this way placed upon the shake out 47 which through mechanical vibration causes all the sand to drop from the flask interior down through the shake-out grate and into the underground return system indicated at 43 in Fig. 1.

Thus freed of sand each empty cope flask 14 is lifted by the aforesaid powered hoist from the shake-out 47 to the cope return track 241 of Fig. 1, whose elevation is indicated at *b* in Fig. 52. Each flask 14 so placed upon the track 241 is related thereto as shown by Fig. 53 so that the open portion of the flask faces down with the side bars 28 riding on track rollers 242 as shown. An operator then pushes each empty flask 14 along track 241 (Fig. 1) to position 1 of Fig. 52 next to cope charging machine 240 and then into position 2 over the platen 243 and pattern **14*a*** initially at lower elevation *c*.

Said platen 243 and pattern **14*a* are now moved by cylinder 244 upwardly beneath flask 14 in position *b*2 into contact with the lower face of the flask rim. The sand chute 41 is next moved to the dotted position over the empty flask 14 at *b*2 and there is released therefrom a measured quantity of sand which falls into the flask 14 as generally indicated at 13; the sand being loose and uncompressed at this point. The chute 41 is thereupon returned to the solid line position of Fig. 52 leaving the sand filled cope 14 on platen 243** exposed at its top.

The squeezer head 245 is next moved from position 3 to position 2 over the sand filled flask 14 at ***b*2, and the platen 243 is by cylinder 244** moved further upwardly (to elevation *a*) bringing the loose sand in flask 14 against the lower face of squeezer head 245. Said head is now mechanically vibrated in well known manner for the purpose of compacting the sand firmly around the pattern **14*a* against the sides of the flask 14 and between the perforated cross members shown at 180 in Figs. 16–17–18. The squeezer head 245 has the customary slots 181 into which the flask cross members 180 (Figs. 16–18) fit, thereby allowing intervening portions of the head to rest directly upon and firmly compact the sand 13 in flask 14**.

As earlier indicated, the aforesaid filling of the cope flask 14 with sand and the compacting of same therein is accompanied by the formation of a sprue opening designated at 23 in Figs. 4–5. Each cope 14 accordingly has such a sprue opening 23 therein when picked up by the Station IV carriage 247 for transfer into the upper arm 62 of the central mold assembling machine 30.

Following this compacting operation the cope flask 14 filled with sand above and around pattern 14*a* is lowered by platen 243 from elevation *a* to elevation *b* where the side bars 28 of the flask rest upon track rollers 242 as shown in Fig. 53. The platen 243 and pattern 14*a* are then further lowered by cylinder 244 to elevation *c* leaving in the exposed bottom face of the flask sand 13 a pattern cavity corresponding to that represented at 16 in Fig. 4. While this is going on the squeezer head 245 is shifted from the dotted position of Fig. 52 to the full line position out of vertical register with the sand filled flask 14 at location *b*2.

From this location *b*2 the cope flask 14 filled with sand as aforesaid is advanced along track rollers 242 to horizontal position 3 directly over the carriage 247. During such advancement the latch 257 at the carriage rear is pushed downwardly and forwardly until the rear edge of flask 14 has cleared same, when spring 183 returns the latch to the full line position shown behind the flask. At the same time the forward end of the flask engages interlock switch X and effects closure of its contacts for a purpose later to be explained.

Figure 36E:
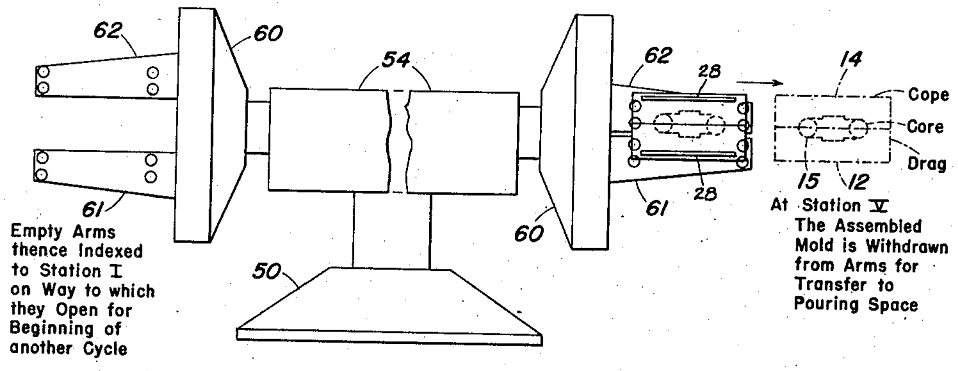

The cope 14 thus charged with sand 13 which carries the impression of pattern 14*a* is now ready for advancement into the upper arm 62 of the head 60 which is in register with Station IV as represented in Figs. 1 and 52. Such advancement is accomplished by admitting into port 254 of cylinder 250 pressure fluid which forces piston 252 forward moving with it carriage 247 which pushes (via latch 257) the sand filled cope 14 into an arm-engaged position generally similar to that represented in Fig. 22 for drag 12 but preferably differing therefrom in that the cope flask side bars 28 ride above the top row of main support rollers 76 as indicated by Figs. 36*d* and 36*e*, instead of between top and bottom roller rows as do the side bars 28 on each drag flask 12 (see Figs. 36*a*–*b*, 36*d*–*e*, 28, 14, 11 and 9).

Each cope 14 is in this way entered into the upper machine arms (62 here) with side bars 28 resting on the top rollers 76 thereof until the lift fitting 25 on the cope flask end (see Figs. 4–5–6–7, 22) closely approaches or abuts the face of arm head 60 as shown by Fig. 52. Thus aligned over the drag 12 in the lower head arms (61 here) therebeneath, the cope 14 is carried by said arm head 60 during subsequent indexing thereof to Station V (Fig. 1), as later described.

Following advancement of each sand charged cope 14 from position *b*3 to position *b*4 of Fig. 52 the carriage 247 is automatically returned by cylinder 250 to position *b*3. This return is accomplished by admitting into port 255 of that cylinder pressure fluid which moves the piston 252 to the left; the facilities utilized for accomplishing such admission being controlled by limit switch K as diagrammed in Fig. 59 later to be described.

The Station IV apparatus of Fig. 52 is now in condition for moving another empty cope flask 14 to the right from location *b*1 of Fig. 52, charging it at locations *b*2 and *a*2 with sand which receives the impression of pattern 14*a*, and then moving it on to location *b*3 where carriage 247 functions as just described to enter it into the upper arms 62 of the next head 60 which machine 30 brings into register with Station IV.

From Fig. 36*d* it will be seen that prior to their advancing from Station IV to Station V the lower and upper assembling machine arms (61 and 62 in Fig. 52) respectively carry the sand filled drag 12 with core 15 resting therein and the sand filled cope 14 positioned directly thereover; this relationship being represented at the right of Fig. 36*d*. In now moving to Station V it will be seen from the diagram of Fig. 37 that these two assembling machine arms 61—62 are first closed together bringing the three components represented at 12, 14 and 15 in Fig. 4 into the assembled position shown by Fig. 5 wherein the cope 14 has been lowered upon the drag 12 in proper alignment as determined by engagement of cope brackets 18 with drag pins 17; the core 15 being accurately positioned in the opposed pattern cavities of the drag and cope as represented by Figs. 6 and 7. It is in this condition (represented at the left of Fig. 36*d* and at the right of Fig. 36*e*) that the assembled mold is delivered by arms 61—62 to "Mold-Off" Station V.

*Mold take-off apparatus for unloading arms at Station V*

At this "Mold-Off" Station V there is provided the apparatus represented generally in top plan view by Fig. 1 and in simplified schematic form by the diagram of Fig. 54 (comprising a view on line 54—54 of Fig. 1). Included in this Station V apparatus is a track shown generally at 260 in Fig. 1 and in somewhat greater detail by Fig. 55. This track spans the distance between the assembling machine arms 61—62 at Station V and the main mold track 32 passing Station V as indicated by Fig. 1; on it there is space for two of the assembled molds 12—14 as shown in Fig. 54.

Looking at Fig. 55, it will be seen that each of the two side supports comprising the mold-off track 260 has mounted thereon a series of rollers 261 which extend lengthwise of the track 260 and completely span horizontal locations 2 and 3 of Fig. 54; but in the interests of simplification no attempt has been made in Fig. 54 to show those rollers 261. Fig. 55 shows that they are arranged in two parallel rows spanned by a central space through which there is free to travel a retractor carriage represented at 262 in each of Figs. 54 and 55. This carriage is supported on guide rollers (not shown) along which it is free to ride horizontally back and forth between the side rollers 261 of track 260; such back and forth movement being parallel to that track.

Said back and forth movement on the part of retractor carriage 262 is produced by a cylinder 263 the shell of which is fixedly mounted as at 264; the cylinder piston 265 being connected via rod 266 with a downward extension 267 of the retractor carriage 262. Admission of pressure fluid into port 268 causes piston 265 to move carriage 262 to the eject position (to the left) shown in full lines by Fig. 54; similarly, admission of pressure fluid into port 269 effects movement of the carriage back (to the right) towards the arm head 60 of the assembling machine and into the position shown by dotted lines in Fig. 54. The mentioned pressure fluid for operating carriage cylinder 263 is supplied thereto via the conduits shown at 268' and 269' in Fig. 59 under the control of a solenoid valve SV5 later to be described.

Protruding upwardly from the top of carriage 262 are a pair of latches 271 and 272. Each of these latches is organized so that as the carriage 262 moves to the right in Fig. 54 the latch will slide under the assembled mold 12—14 on the track 261 (Fig. 55) and then spring up behind said mold as shown in Fig. 54. Forward or eject movement of the carriage 262 (to the left in Fig. 54) now carries (via latches 271—272) first and second assembled molds 12—14 away from the assembling machine head 60 and towards the main mold track 32.

In this way each assembled mold 12—14 brought by a pair of assembling machine arms 61—62 to Station V is engaged by rear latch 272 when the carriage 262 is moved to the extreme right in Fig. 54, as there shown dotted. Such carriage movement brings the forward latch 271 behind a second assembled mold 12—14 shown at location 2 in Fig. 54; said second mold having previously been drawn out of a preceding set of assembling machine arms 61—62. Admission of pressure fluid into port 268 now causes cylinder 263 to move the carriage 262 away from arm head 60 thereby transferring the two assembled molds 12—14 now shown at positions 1 and 2 to the left of Fig. 54 to positions 2 and 3; the length of track 260 between the assembling machine arms 61—62 and the main mold track being (as earlier stated) sufficient to accommodate two assembled molds 12—14 as represented at positions 2 and 3 in Fig. 54.

The assembled mold 12—14 now at position 3 (closest to main mold track 32) is ready for transfer to one of the empty mold cars 33 approaching Station V along track 32 as represented by the upper portion of Fig. 1. One satisfactory way for accomplishing such transfer is through the use of a conventionally powered overhead hoist (not shown) whose lift chain 273 carries the lifting frame shown at 274 in Fig. 54. The lower and inwardly extending shelf portions of this frame 274 may be slid beneath the side bars 28 on the drag flask 12 of the assembled mold 12—14 and when substantially centered, as represented at location 3 in Fig. 54, the overhead hoist is brought into action to lift (via chain 273) the assembled mold from horizontal position 3 above carriage 262 to one of the empty cars 33 slowly approaching or traveling past Station V along the main mold track 32. If desired the overhead hoist can be arranged to place such assembled mold 12—14 on an empty car 33 further back along the track 32 towards drag shake-out 46.

During this lifting operation the assembled mold is rotated through 90° and set down on the mold car 33 in the position shown at the extreme left of Fig. 54. This makes room on the left end of track 260 (see Fig. 1) at position 3 of Fig. 54 for the assembled mold 12—14 originally in position 2 above carriage 262, as immediately after its withdrawal from the assembling machine. As soon as a following set of assembling machine arms 61—62 delivers another assembled mold to Station V cylinder 263 shifts carriage 262 towards the newly arrived machine head 60 (to the right in Fig. 54); latches 271—272 respectively hook behind the two molds 12—14 that respectively are in position 2 and in the newly arrived arms 61—62 of the assembly machine; and the cylinder 263 in returning carriage 262 to the left (in Fig. 54) simultaneously withdraws the newly arrived assembled mold from the machine arms 60—61 bringing it to position 2 in Fig. 54, and transfers the earlier delivered assembled mold from position 2 to position 3 along track 260.

Further included in the Station V apparatus are an interlock switch shown at N and a limit switch shown at O in each of Figs. 54 and 59. These are of the "normally open" type represented in Fig. 40 and they respectively register arrival of carriage 262 at the extreme left position shown in solid lines in Fig. 54 and at the extreme right position shown dotted. Another interlock switch shown at M in Figs. 54 and 59 also is of the normally open type and it registers the presence at location 2 of an assembled mold 12—14 as there shown by Fig. 54.

Still further provided at Station V is an additional interlock switch shown at L in each of Figs. 54 and 59. It is of the "normally closed" type schematically represented by Fig. 56. Its purpose is to register the presence at location 3 of an assembled mold 12—14 as there represented by Fig. 54; when a mold is there present switch contacts L are opened thereby, but in the absence of a mold at location 3 the switch contacts are closed as in Fig. 56.

Each assembled mold so delivered from Station V on to an empty car 33 traveling around main track 32 has the drag and cope portions 12 and 14 secured together by placement of the end clamps 19 over the cooperating flask lugs shown at 20 in Fig. 4. Such conventional fastening having been accomplished, each fully assembled mold riding on car 33 along track 32 is ready to have molten metal poured into sprue opening 23 (see Figs. 4–5) in the usual way. In the installation represented by Fig. 1 such molten metal is brought to the pouring location in the customary ladles which are carried by trolleys traveling on overhead tracks (not shown).

*Hydraulic and electrical control system of Fig. 59*

Attention will now be directed to the hydraulic and electrical facilities for controlling the turret indexing and stop cylinders 82 and 92 plus the carriage cylinders 171, 200, 250 and 263 at Stations I, II, IV and V plus the core box turn over motors 211—212 and the manipulator cylinder 220 at Station III. A simplified schematic showing of these facilities appears in Fig. 59.

The fluid pressure and fluid exhaust lines represented at 276—277 in Fig. 59 may be connected with any suitable pressure supply apparatus such as the hydraulic pump shown at 108 in Fig. 57. In the description which follows it will be assumed that these pressure and exhaust lines 276—277 of Fig. 59 are so joined with the pressure and exhaust mains 109—115 of Fig. 57 and thus communicate with oil pump 108 earlier described as providing an operating pressure of about 500 pounds per square inch; obviously however, some other source of pressure supply may instead be utilized.

Each of the eight solenoid valves SV1—2—3—4—5—6—7—8 of Fig. 59 has the internal construction diagrammed by Fig. 60. The valve stem there designated 114′ is by energization of the solenoid shown at the left of the diagram withdrawn to the left as represented in Fig. 60 where it remains even after the left solenoid is deenergized; but upon energization of the right solenoid (with the left winding deenergized) the stem 114′ is drawn to the right where it remains until the left winding again is energized (with the right winding deenergized).

With the stem at the left (Fig. 60) pressure fluid from line 276 flows as indicated by the small arrows out of the valve casing through the "first" port at the top left thereof; the "second" port at the top right of Fig. 60 now being in communication with the exhaust line 277. When, however, the valve stem 114′ is shifted to the right, pressure fluid from line 276 flows out of the valve casing through the top right or "second" port, and the top left or "first" port is placed in communication with the exhaust line 277.

The transfer action just outlined is accomplished by each of the eight oil valves SV1—2—3—4—5—6—7—8 in the Fig. 59 system. Hence energization of the left solenoid for each of these valves causes flow of pressure fluid from supply line 276 out of the valve body through the left top port thereof; the right top port now being in communication with the exhaust line 277. Similarly energization of the right solenoid for each of the eight "SV" valves of Fig. 59 causes a flow of pressure fluid from supply line 276 out of the right top port of the valve body; the left top port thereof now being in communication with the exhaust line 277.

In this way each of the eight oil valves SV functions to control operation of the cylinder or other hydraulic device with which it is connected. In the Fig. 59 system the main drive cylinder 82 for indexing the assembling machine turret 54 is in this way governed by solenoid valve SV1; the carriage cylinder 171 at Drag Station I is governed by valve SV2; the carriage cylinder 200 at Core Station II has its pressure fluid governed by valve SV3; the carriage cylinder at cope Station IV is controlled by valve SV4; the carriage cylinder at Mold Station V is controlled by valve SV5; the stop cylinder 92 beneath the machine turret is controlled by valve SV6; the core box turn over motors 211—212 at Station III have their presusre fluid controlled by valve SV7; and the core box manipulator 220 at Station III has its pressure fluid controlled by valve SV8.

The electrical control circuits of Fig. 59 are energized through a switch 278 which when closed connects main supply conductors 280—281 with any suitable power source, such as a commercial 110 volt lighting circuit of either the alternating current or the direct current type. In the description which follows it will be assumed there is in this manner made available between control conductors 280—281 a substantially constant electrical potential of about 110 volts.

In the electrical system here illustratively disclosed use is made of a pair of relays RA and RB which are respectively activated when it is desired to move the station carriages in towards the central indexing machine 30 and when it thereafter is desired to index the turret 54 of that machine through an additional step (72° here) of rotative movement. These two relays are respectively provided with contacts 283 and 284; such contact for each relay occupying the released (or lower) positions as long as the relay winding (shown directly above the contact) is deenergized but moving upwardly to the picked up or closed position whenever the relay winding is connected across supply conductors 280—281.

In the system shown such connection for relay RA is effected by the first limit switch A for the drive cylinder 82 for indexing the assembling machine turret 54 as indicated by Figs. 11–12; and such connection for the relay RB is effected by the second limit switch B with which the same turret indexing cylinder 82 is provided as shown by Fig. 12.

Governed by contact 283 of this first relay RA are the right solenoids, 286, 287, 288, 289, 290 and 291 for the six oil valves SV1, SV2, SV3, SV4, SV5 and SV7. Connection of all of these solenoid windings across supply conductors 280—281 is established via conductor 293 whenever relay RA picks up contact 283 in response to closure of limit switch A; that switch registering completion of an indexing rotation by the assembling machine turret 54 through 72 degrees in advancing the arm heads 60 from each station I—II, etc., to the next succeeding station in the clockwise direction.

Controlled by the second relay RB is the left solenoid 294 of oil valve SV1 and the right solenoid 295 of oil valve SV6; both of these solenoids being energized over conductor 296 and the other circuits shown by Fig. 59 whenever relay RB picks up its contact 284 in response to closure of limit switch B upon return by turret indexing cylinder 82 to its withdrawn-piston condition as shown by full lines in Fig. 12.

From Fig. 59 it will further be seen that the left solenoids 297, 298, 299, 300, 301, 302, and 303 for the oil valves SV2, SV3, SV4, SV5, SV6, SV7 and SV8 are repectively connected across supply conductors 280—281 upon respective closure of the earlier-designated limit and other switches C, H, K, O, Q, R, U, Y; the right solenoid SV8 being similarly connected across supply conductors 280—281 upon closure of either of the earlier-named switches S and T. All of the switches just mentioned are shown as to their physical location by preceding drawing views and general mention of their function already has been given by earlier description.

Additionally included in the energizing circuit for the left solenoid 294 of indexing control valve SV1 is an interlock circuit which includes conductor 306 and the interlock switch contacts, W, P, L, M, N, X, J, F, G, E and D serially connected (as represented by the right portion of Fig. 59) between solenoid winding 294 and supply conductor 281. Also included in this serial connection is an interlock break switch 307, and connected to bypass the various interlock switch contacts just named is an interlock short-out switch shown at 308 in Fig. 59. These two switches normally occupy the closed (307) and open (308) positions respectively represented; they are manually operated; and their purposes will become evident as the description proceeds.

*Assembling apparatus operation as controlled per Figs. 57–59*

The complete mold assembling installation here disclosed (Fig. 1 plus later views) has its operation controlled by the hydraulic and electrical facilities which Figs. 57 and 59 schematically represent. Explanation will now be given of how the various components of apparatus comprising the complete installation operate under such control.

To start such operation the hydraulic pump 108 is first brought into action to make available in lines 109 and 109a of Fig. 57 and in line 276 plus all control valves SV of Fig. 59 a fluid pressure here assumed to be 500 pounds per square inch. With master control switch 278 of Fig. 59 open, all electrical circuits of that diagram are deenergized causing contacts 283 and 284 or relays RA and RB both to be released as shown; but upon closure of master switch 278, control potential (here assumed to be 110 volts) is applied directly between first and second supply conducors 280 and 281 respectively represented at the left and at the right of Fig. 59 diagram.

With indexing cylinder 82 retracted as shown by Figs. 12 and 59, limit switch B is closed thereby completing for relay RB a pick up circuit which extends from the first supply conductor 280 through conductor 310, the winding of relay RB, conductor 311, closed contacts B, and conductor 312 to the second supply conductor 281. Thus energized relay RB picks up its contact 284 completing thereover; (*a*) an energizing circuit for winding 295 for stop cylinder control valve SV6; and (*b*) also setting up an energizing circuit for winding 294 of indexing control valve SV1.

The aforesaid SV6 circuit extends from the first supply conductor 280 through conductor 313, the closed contact 284 of relay RB, conductor 296, the winding 295 of stop cylinder control valve SV6, and conductor 314 to the second supply conductor 281. Thus energized, solenoid 295 pulls the stem (see 114' of Fig. 60) of valve SV6 to the right thereby causing flow of pressure fluid from main supply line 276 through conduit 97' to the top port 97 of the turret stop cylinder 92. This lowers the stop bar 95 (see Figs. 11 and 13) below the level of web 98 projecting down from the mounting 69 for each of the five arm heads 60 on the assembling machine turret 54; thereby conditioning the turret for another indexing movement by the main drive cylinder 82 (Figs. 11—12).

But by reason of the interlock circuit shown at the right of Fig. 59 such movement cannot occur until the apparatus at each and every one of the five Stations I—II—III—IV—V has been fully prepared therefor. Completion of such preparation is registered by the earlier mentioned energizing circuit for the left winding 294 of indexing control valve SV1; said circuit as set up by relay RB extending from the first supply conductor 280 through conductor 313, closed RB relay contact 284, conductor 296, the SV1 valve winding 294, conductor 315, closed switch 307, interlock conductor 306, interlock switch W at Station III, interlock switch P on stop cylinder 92 (closed by the aforesaid downward movement of stop bar 95), interlock switches L, M, and N at Station V, interlock switches X and J at Station IV, interlock switches F and G at Station II, interlock switches E and D at Station I and conductor 316 to the second supply conductor 281.

At Station I interlock switch D is closed by the represented (Fig. 38) withdrawal of carriage 168 away from arms 61—62 of the assembling machine head 60, and interlock switch E is closed by the presence at location 3 (Fig. 38) of sand-charged drag 12 ready for insertion into upper machine arm. At Station II interlock switch G is closed by the represented withdrawal of carriage 198 from beneath the assembling machine arms 61—62 to position 4 of Fig. 41, and switch F is closed by the presence at said location 4 of a core box 26 having therein a finished core 15 ready for insertion into the lower machine arm 62 at that Station II. At Station III interlock switch W is closed by the core box turn over table 208 resting on pedestal 216 as shown by the full lines in Fig. 44, and by manipulator cylinder 220 having withdrawn the core box pull-out carriage 223 into the table as further shown by Figs. 43—44 and also by Fig. 49.

At Station IV interlock switch J is closed by withdrawal of carriage 247 from beneath assembling machine arms 61—62 to the position shown at 3 in Fig. 52, and switch X is closed by the presence in said position of a sand charged cope 14 ready for insertion into the upper arm 62 of machine head 60. At Station V interlock switch N is closed as shown in Fig. 54 by withdrawal of carriage 262 from beneath the assembling machine arms 61—62 into positions 2—3; interlock switch M is closed by the presence in position 2 of an assembled mold 12—14; and interlock switch L (normally closed) is held open by the presence in position 3 of Fig. 54 of a second assembled mold 12—14 ready for lifting via hoist chain 273 out of position 3 and on to an empty mold car 33 carried by main mold track 32.

Such lifting frees position 3 (Fig. 54) along track 260 of Fig. 1 for reception of the assembled mold 12—14 presently shown in position 2 by Fig. 54. Upon accomplishment of such lifting interlock switch L closes (see Fig. 56) to complete (assuming that all other interlock switches also are closed) the interlock circuit earlier traced and thereby to energize the left winding 294 of indexing control valve SV1. Such energization shifts the SV1 valve stem (see 114′ of Fig. 60) to the left thereby causing flow of pressure fluid from main supply line 276 through conduit 89′ and into the drive port 89 of the turret indexing cylinder 82 (Figs. 11–12).

Indexing cylinder 82 now pushes piston 90 to the right in Fig. 12 thereby rotating (via pawl 85) ratchet wheel 86 through 72 degrees in the clockwise direction. Such rotation carries the assembling machine turret 54 through a similar angular travel bringing each of the five arm heads 60 (see Fig. 8) into register with the next station in the path of turret rotative travel. This means that the arms 61—62 originally at Station I move on to Station II; those originally at Station II move on to Station III; and so on.

In the meantime the opening of limit switch B (Fig. 12) which occurred at the beginning of this turret indexing movement (but after oil valves SV1 and SV6 had shifted their stems to the left) broke the pick up circuit for relay RB and caused contact 284 thereof to deenergize the right winding of stop control valve SV6 and the left winding 294 of indexing control valve SV1. Very shortly after this deenergization web 98 of the turret arm mounting 69 above stop cylinder 92 moved to the left in Fig. 13 past stop bar 95 (now down) and into engagement with switch Q. Such engagement closed the contacts of that switch Q thereby completing a circuit for energizing the left winding 301 of stop control valve SV6; Fig. 59 showing a conductor 318 as being included in said circuit.

Valve SV6 thereupon shifts its stem to the left (as in Fig. 69) thereby causing flow of pressure fluid from main supply line 276 through conduit 99′ and to lower port 99 of stop cylinder 92. Such flow raises the stop bar 95 to the position shown by Figs. 11 and 13 wherein the bar will be encountered by the web 98 of the arm head mounting 69 now approaching the location (may be at any one of the five stations) of stop cylinder 92 (Figs. 11 and 13).

During the rotative advance of the turret head now taking place the set of arms 60—61 moving from Station I to Station II remains open and in their original upper and lower positions as represented by Fig. 36*a*; the arms 61—62 moving from Station II to Station III first close and then roll over and then reopen as indicated by Fig. 36*b*; the arms 61—62 moving from Station III to Station IV remain open and in the same upper and lower positions as indicated by Fig. 36*c*; the arms 61—62 moving from Station IV to Station V close as indicated by Fig. 36*d*; and the arms moving from Station V to Station I open as indicated by Fig. 36*e*. Such opening, closing and roll-over actions are accomplished as earlier described by the hydraulic motors shown at 64 and 66 in Fig. 37 under the control of valves 112—113 which respond to rotational advances of the turret as earlier explained (Figs. 32–35 etc.) and as diagrammed by Fig. 37.

The turret indexing movement now in progress continues until the web 98 (Figs. 11–13) below the arm head 60 approaches stop cylinder 92 and engages the raised stop bar 95 thereof. This arrests the turret rotation with all five sets of flask receiving arms 61—62 in accurate register with the cooperating apparatus at the five surrounding Stations I—II—III—IV—V. It also is accompanied by closure of indexing limit switch A (see Fig. 12) at the end of the indexing stroke travel by piston 90 of turret drive cylinder 82 (Figs. 11–12).

Such closing of limit switch A picks up relay RA of Fig. 59; the pick up circuit here represented extending from the first supply conductor 280 through conductor 310, the winding of relay RA, conductor 320, the closed contacts of limit switch A, and conductor 312 to the second supply conductor 281. Contact 283 or relay RA now completes parallel energizing circuits for the right windings of the six solenoid valves SV1, SV2, SV3, SV4, SV5, and SV7; all six of these circuits including the common conductor represented at 293 in Fig. 59 as being joined with the first supply conductor 280 when RA contact 283 is picked up. Between said common conductor 293 and the second supply conductor 281; (*a*) the right SV1 winding 286 is connected via a timer shown at 321 in Fig. 59; (*b*) the right SV2 winding 287 is connected via conductor shown at 322; (*c*) the right SV3 winding 288 is connected via conductor 323; (*d*) the right SV4 winding 289 is connected via conductor 324; (*e*) the right SV5 winding 290 is connected via conductor 325; and (*f*) the right SV7 winding 291 is connected via conductor 326.

With the central machine turret 54 which thus is at the end of its 72 degree indexing travel, the stop bar 95 of cylinder 92 (Figs. 11, 13) is restraining indexing cylinder 82 from turning the turret beyond the aforesaid position of accurate register with the five cooperating stations, and the relay RA has just been picked up completing the six circuits mentioned above. In the case of SV1 winding 286 this completion is delayed for a matter of a few seconds as determined by the setting of timer 321; this setting being such as to assure that the relatively heavy turret 54 comes to full and final rest against stop bar 95 before the torque originating in cylinder 82 is discontinued. Temporary maintenance of such torque is found to eliminate bouncing which otherwise might occur immediately after the turret web 98 encounters stop bar 95.

At the end of the delay interval imposed by said timer 321 the right SV1 winding 286 is energized over a circuit extending from the first supply conductor 280 through conductor 313; closed contact 283 of relay RA, conductor 293, one side of timer 321, the SV1 winding 286, the other side of timer 321 and conductor 312 to the second supply conductor 281.

This energization shifts the stem of valve SV1 to the right thereby admitting pressure fluid from main supply line 276 through conduit 91′ and to the return port 91 (Figs. 11–12) for the turret indexing cylinder 82. Cylinder 82 now returns piston 90 to the full line position represented in Fig. 12, bringing pawl 85 behind the next tooth of ratchet wheel 86 preparatory to imparting another indexing movement to the machine turret 54. Such return opens limit switch A and closes limit switch B.

But before limit switch A has opened (and while timer 321 is delaying the energization of valve SV's right winding 286) the closed contact 283 of relay RA causes advancement of the carriage cylinders at Stations I, II, IV and V and activation of the turnover apparatus at Station III. These respective advancement and activations will now be examined.

At Station I the aforementioned energization of the right SV2 winding 287 moves the stem of that valve to the right flowing pressure fluid from main supply line 276 through conduit 175′ and into port 175 of carriage cylinder 171. As shown by Fig. 38 this causes cylinder 171 to push carriage 168 to the right, thus moving sand-charged drag 12 into the upper arm 61 of the assembly machine head 60 that is in register with Station I; the drag 12 thereupon being engaged by the arms in the position shown by Fig. 22. At the end of its forward travel carriage 168 closes limit switch C and energizes the left winding 297 of valve SV2 over a circuit shown by Fig. 59 as including conductor 328. This shifts the stem of valve SV2 to the left admitting pressure fluid from supply line 276 through conduit 176' and into the return port 176 of carriage cylinder 171 (Fig. 38). Such admission returns carriage 168 from position 4 to position 3 of Fig. 38 preparatory to moving another sand-charged drag into the next set of flask receiving arms that later is brought to Station I by turret 54.

At Station II the aforesaid energization of the right SV3 winding 288 shifts the stem of that valve to the right thereby flowing pressure fluid from supply line 276 through conduit 202' and into the forward port 202 of the cylinder shown at 200 in Fig. 41. That cylinder now forces carriage 198 beneath arms 61—62 of assembling machine head 60 at Station II and carries core box 26 with finished core 15 resting therein from location 4 of Fig. 41 to location 5 wherein the core box has been received and engaged by lower arm 62 as represented by Fig. 28. In thus moving forward carriage 198 closes limit switch H and thereby energizes the right winding 298 of valve SV3 over a circuit shown by Fig. 59 as including conductor 329. Such energization shifts the SV3 valve stem to the left flowing pressure fluid from supply line 276 through conduit 206' and into the return port 206 (Fig. 41) of cylinder 200. This returns carriage 198 at Station II to the retracted position 4 of Fig. 41 thus conditioning the apparatus for receiving another core box 26 with finished core 15 therein and pushing same into the lower arm of the next machine head 60 which turret 54 later brings into register with Station II.

At Station III the aforesaid energization of the right SV7 winding 291 shifts the stem of that valve to the right and flows pressure fluid from supply line 276 through conduit 234 and thence into forward port 106' (see Figs. 43–44) of turnover motors 211—212. These motors now rotate shaft 210 (counterclockwise as viewed in Fig. 44) carrying the turnover table 208 from its original position adjacent return track 187 of Fig. 1 (shown in full lines at the right of Fig. 44) to the opposed position adjacent the assembling machine arms 61—62 at Station III (shown in dotted lines at the left of Figs. 43–44 and in full lines by Fig.1). During this rotation of the turnover table 208 a projection 330 from the mount 209 therefore (arranged as shown in Fig. 43) engages normally open switch Y (stationarily mounted at the location indicated by Figs. 43 and 49) and effects closure of the switch contacts as said table mount projection 330 travels past the switch.

This closure energizes the left winding 303 of solenoid valve SV8 and shifts the valve stem to the left thereby flowing pressure fluid from supply line 276 through conduit 230 and behind the withdrawn piston 222 of manipulator cylinder 220 (Figs. 43 and 49). Manipulator 220 now moves carriage 223 out of turnover table 208 bringing the carriage latch 227 behind the inverted core box 26 in the upper arm 62 of the assembling machine head 60 at Station III as shown at the right of Fig. 49.

As soon as the turnover table 208 has seated itself on support 217 (at left of Fig. 44) the table edge engages limit switch S (see also Fig. 49) and closes contacts of same thereby energizing the right winding 304 of valve SV8 over a circuit represented in Fig. 59 as including conductor 332. Such energization shifts the stem of valve SV8 to the right thus flowing pressure fluid from supply line 276 through conduit 231 and into the other end of manipulator cylinder 220 (see the left of Fig. 44). This causes manipulator 220 to withdraw carriage 223 back into table 208 thereby causing latch 227 (see right of Fig. 49) to pull inverted core box 26 out of the upper assembling machine arm 62 and into the turnover box 208 as represented by Fig. 50.

Upon full entry of core box 26 into turn over table 208 at horizontal position 2 in Fig. 49 the core box engages switch R and closes its contacts. This closure completes for the left winding 302 of valve SV7 an energizing circuit shown in Fig. 59 as including conductor 333. Such energization shifts the stem of valve SV7 to the left producing flow of pressure fluid from supply line 276 through conduit 233 and into port 107' (see Figs. 43–44) of turn over motors 211—212. These motors now rotate the turn over table 208 on shaft 210 counterclockwise as viewed in Fig. 49 (clockwise as viewed in Fig. 44) from the position shown dotted by Fig. 44 to the position shown in full lines at the right thereof over stand 216.

This corresponds to position 2 in Fig. 49 wherein the empty core box 26 carried by table 208 has been turned over and lies adjacent the Station III end of the return track shown at 187 in Fig. 1. During this turn over movement by table 208 the projection 330 on mount 209 engages the actuator of switch Y but the arrangement is such that no closure of the switch contacts occurs; that closure being produced only by the earlier-described travel of projection 330 in the opposite direction of turn over motor rotation.

With the turn over table 208 thus resting on stand 216 (at right of Fig. 44 and at left of Fig. 49) the core box 26 therein engages switch U and closes the contacts of same. This closure energizes the left winding 303 of valve SV8 over the circuit previously mentioned as including conductor 331; such energization shifts the stem of valve SV8 to the left and flows pressure fluid through conduit 230 and into manipulator 220 at the inner end port indicated at 230 in Figs. 43–44. This forces piston 222 out away from the main turn over shaft 210 and moves carriage 223 in said outward direction.

Ejector 228 accordingly forces the empty core box to the left in Fig. 49 and on to the side rollers 238 (see Fig. 51) constituting the beginning of the return track 187 of Fig. 1. Once carriage 223 has been fully extended the end 226 thereof engages switch T shown at the right of Fig. 44 and at the left of Fig. 49. Resulting closure of this switch T energizes the right winding 304 of valve SV8 over conductor 332 of Fig. 59. This energization shifts the stem of valve SV8 to the right thereby flowing pressure fluid through conduit 231 to the outer end of manipulator 220. This produces withdrawal of the carriage 223 back into turn over table 208 and conditions the turn over apparatus at Station III for accomplishment of another cycle duplicating the one just explained hereinabove.

At Station IV the earlier mentioned energization of the right SV4 winding 289 over relay RA contact 283 shifts the stem of valve SV4 to the right thereby flowing pressure fluid from supply line 276 through conduit 254' and into port 254 of carriage cylinder 250 (Fig. 52). This causes said cylinder to push carriage 247 from position 3 to position 4 of Fig. 52 and thereby move the sand-charged cope 14 into the upper arm of the assembling machine head 60 that is in register with Station IV. Completion of this movement is accompanied by closure of limit switch K. That closure in turn energizes the left winding 299 of valve SV4 over a circuit shown by Fig. 59 as including conductor 335. Such energization shifts the stem of valve SV4 to the left thus flowing pressure fluid via conduit 255' into port 255 of cylinder 250. Such flow moves piston 252 to the left in Fig. 52 and thus returns carriage 247 from position 4 to position 3. This return conditions the apparatus at Station IV for repeating the cycle herein described above.

At Station V the aforesaid energization of the right SV5 winding 290 over relay RA contact 283 shifts the stem of valve SV5 to the right thereby flowing pressure fluid from supply line 276 through conduit 269' and into the port 269 of the carriage cylinder represented at 263 in Fig. 54. This forces piston 265 to the right in Fig. 54 moving carriage 262 therewith and bringing latches 271—272 behind the assembled molds 12—14 that are respectively in positions 2 and 1 of Fig. 54; the assembled mold presently in position 2 having earlier been delivered to Station V while the assembled mold presently in position 1 having just arrived at that Station V and still being in the closed arms 61—62 of the assembling machine head shown at 60 in Fig. 54.

This positioning by the station carriage 262 of latches 271—272 behind the two assembled molds just mentioned is accompanied by closure of limit switch O (Fig. 54). Such closure energizes the left winding 300 of oil valve SV5 over a circuit shown by Fig. 59 as including conductor 336. This shifts the stem of SV5 to the left and transfers the flow of pressure fluid for carriage cylinder 263 to conduit 268. Cylinder 263 now returns piston 265 to the left in Fig. 54 moving carriage 262 therewith and via latches 271—272 transferring the two assembled molds from positions 2 and 1 to positions 3 and 2 of Fig. 54. In this way the arms of assembling machine head 60 have the assembled molds 12—14 withdrawn therefrom at Station V and the other assembled mold previously delivered to Station V is moved to position 3 immediately adjacent the main mold track 32 for transfer via hoist chain and frame 273—274 to one of the empty mold cars 33 on that track.

After the drag and cope flasks 12 and 14 are secured together by the clamps 19 of Figs. 3—5—6 each assembled mold so delivered to a mold car is ready for pouring while being moved along the portion of main track 32 represented in the upper left portion of Fig. 1. Meanwhile, the cylinder 263 at Station V continues to maintain carriage 262 in the extreme left position shown by the full lines of Fig. 54 until there arrives at Station V another turret arm head 60 carrying another assembled mold 12—14 in the closed arms 61—62 thereof. When that happens there is initiated at Station V the cycle of operation just described by reference to Figs. 54 and 59.

But prior to that cycle repetition, the turret arm head 60 initially at Station V is indexed on to Station I via advancement of the turret 54 through 72 degrees in the clockwise direction shown by the large arrows of Figs. 1 and 8. During such indexing the closed arms 61—62 leaving Station V are reopened on their way to Station I as the diagram of Fig. 37 indicates. This reopening is accomplished by the hydraulic spacing motor 64 carried by the arm head, which motor now has pressure fluid admitted thereto via the valve shown at 112 in Figs. 8, 32—35 and 57 already described. In arriving at Station I from Station V the arms 61—62 of the turret head 60 thus have the open position shown at the left of Fig. 36*e*. The mold assembling apparatus herein disclosed is now ready to go through another cycle of operations which duplicates the one just described hereinabove. From said description it will have become apparent that the relay shown at RA in Fig. 59 serves upon each pick up by limit switch A of indexing cylinder 82 to activate simultaneously the carriage cylinder 171 (Fig. 38) at Drag Station I, the carriage cylinder 200 (Fig. 41) at Core Station II, the turn over motors 211—212 (Figs. 43—44, 49) at Core-Box Take-Off Station III (and indirectly the manipulator cylinder 220 in the turn over apparatus at that Station), the carriage cylinder 250 (Fig. 52) at Cope Station IV and the carriage cylinder 263 (Fig. 54) at Mold-Off Station V.

It is significant to note that this relay RA can be picked up by limit switch A only at the end of a completed indexing rotation of the central assembling machine turret 54; that each such indexing rotation of the turret must first be preceded by energization of the left winding 294 of indexing control valve SV1; and that the circuit for accomplishing said energization as set up by contact 284 of relay RB can be completed only when all of the various interlock switches at the five stations (D—E at I, F—G at II, W at III, X—J at IV, L—M—N at V, and P at stop cylinder 92 beneath the turret) are closed to connect conductor 315 of Fig. 59 with the second supply conductor 281 via conductor 316.

As earlier brought out, such connection and accompanying energization of winding 294 of indexing control valve SV1 is accomplished only when the apparatus at each of the five stations I—II—III—IV—V has fully completed its preparation for a subsequent indexing of the turret; until that time a failure by any one of the five stations to complete full preparation for the indexing serves to delay same even though all other points in the installations are ready and waiting. But once everything is in full readiness the interlock circuit (right of Fig. 59) supplies the SV1 winding 294 with energizing current which shifts the stem of valve SV1 to the left admitting pressure fluid into port 89 of indexing cylinder 82 and causing clockwise rotation of turret 54 through an additional 72 degrees, as earlier described in detail.

Should it be desired to hold the mold assembling machine turret 54 in any one of its five station-registering positions, this may be done by opening the interlock break switch shown at 307 in Fig. 59. Such opening prevents energization of the right SV1 winding 294 until this switch 307 is manually closed by an operator. Moreover, should it be desired to produce turret rotation before the apparatus at all five of the cooperating stations is in full readiness this may be done by closing the interlock short-out switch shown at 308 in Fig. 59. Such closure by-passes all of the interlock contacts between conductors 306 and 316 and connects conductor 315 directly with conductor 316; that direct connection assuring immediate energization of the SV1 winding 294 just as soon as relay RB has been picked up by closure of limit switch B on the indexing cylinder 82 (Figs. 11—12).

Normally however the interlock break switch 307 is kept closed as shown and the interlock short-out switch 308 is kept open as shown thereby allowing each indexing rotation of the assembling machine turret 54 to be initiated automatically as hereinbefore described.

*How the complete installation of Fig. 1 functions*

Actual use of an automatic mold assembling installation laid out in accordance with the diagram of Fig. 1 has confirmed the high practical utility of the novel technique and apparatus here disclosed. The manner in which such a complete installation operates will have become apparent from the foregoing detailed description of the various apparatus components comprised thereby when considered with the explanatory captions which appear in the view of Fig. 1.

This operation has the advantage of being a "continuous" one from which a high rate of casting production is possible. Even though operators are required at Stations I—I—IV—V (none at Station III) the manual effort which need be exerted by each of these operators is reduced to a minimum and the degree of skill called for also is cut down far below that required to prepare the molds for pouring in accordance with all past techniques with which we are familiar.

It has already been seen that the assembled molds taken out of the central machine 30 at Station V are successively transferred to the portion of track 32 that is adjacent to said station (or if desired in advance thereof). As these assembled molds travel further around the track 32 pouring thereof is accomplished in conventional manner prior to their approach to the cope shake out 47 identified with Station IV. By the time the poured molds have arrived at said shake out 47 the molten iron therein has solidified to a point where the end clamps 19 (Figs. 4-5-6) may be removed and the copes 14 lifted away from the drags 12 which now carry the exposed solidified castings 10 as represented in the upper left portion of Fig. 1.

These molds 12 with the castings 10 therein then continue to travel on cars 33 counterclockwise around the main track 32; they passing beneath the core box return track 187 which extends from Station III to Station II. As the drags 12 with their aforesaid cooled castings 10 approach the casting shake out 45 of Fig. 1, operators there withdraw (by the aid of the cutomary hooks) the castings 10 from the drag sand along with the sprue iron (not shown) which had solidified in the sprue passage shown at 23—24 in Figs. 4, 5 and 7.

The castings 10 and their attached "sprues" are by said operators placed on the vibrating grate of shake out 45 which functions to shake all sand therefrom in conventional manner; said sand being collected by underground conveyor 43 for return to the sand plant 37. While on this shake out 45 the sprues are knocked loose from the castings 10 which, having thus been freed of sand (and the sprues), can be regarded as "finished." These finished castings 10 then are moved from the shake out grating 45 on to a traveling apron conveyor 340 which carries them away from the shake out of discharge into a container 341 or other suitable receiver.

After thus having the castings 10 (and sprues) removed therefrom, the drag flasks 12 with the sand still therein continue to move counterclockwise around track 32 from the casting shake out 45 to the location of drag shake out 46 (upper right of Fig. 1). Here another operator utilizes an overhead hoist (not shown) as previously mentioned to lift the drag flasks 12 from cars 33 on to shake out 46. By this shake out 46 all sand is removed from those flasks 12 which then are placed with their open sides down (refer to Fig. 38 plus earlier descriptions) upon drag return track 161 via which they pass through the drag charging machine 160 and thence successively into the upper arms (see Figs. 22, 36*a*, 38) of assembling machine heads 60 progressively brought into register with Station I.

Each sand charged drag flask 12 thus received by the indexing machine 30 at Station I is moved on to Station II where a core 15 in a box 26 is added (see Figs. 28, 36*b*, 41) to the empty lower arm of the assembling machine head 60 stopping at Station II. In thereafter moving on to Station III the drag 12 and core box 36 are brought together (see Figs. 36*b*, 37) and then turned over so that the core 15 rests in the mold cavity of the drag 12 upon arrival at Station III. Here the empty core box 26 is withdrawn (see Fig. 36*c*) from the assembling machine arms and automatically turned over (see Figs. 43 to 50) for return via track 187 back to Station II.

In further progressing from Station III to Station IV the drag 12 with core 15 resting therein continues (see Fig. 36*c*) in the lower arm of the turret head 60. At Station IV there is inserted (see Fig. 36*d*) into the upper arm of the head a sand-charged cope 14. The flask for this cope 14 had previously passed through charging machine 240 after having been brought thereto along return track 241 from shake out 47; the transfer of each flask 14 from a poured mold carried by car 33 moving on track 32 already having been explained.

In further advancing from Station IV to Station V the arms of each head 60 close bringing the sand charged cope 14 down upon the drag 12 over the core 15 resting therein. It is in this condition that the assembled mold 12—14 reaches Station V. Here it is withdrawn from the arms of turret head 60 and transferred to an empty car 33 approaching along the main track 32. There this assemled mold is poured as earlier descried.

It will thus be seen that the installation of Fig. 1 makes successive re-use of each of the drag flasks 12 and of each of the core boxes 26 and of each of the cope flasks 14 which are utilized in accomplishing the complete mold assembling cycle just outlined, and also re-uses all of the sand utilized to charge the drag and cope flasks and to form the cores 15. The aforesaid cycle is a continuous one and its employment not only raises the casting output obtainable within a given area of foundry space but it also cuts down both the time and the labor needed to prepare the mold components and assemble them into condition ready for pouring.

One installation organized as shown by Fig. 1 and other drawing views hereof is capable of preparing, assembling and pouring the molds 12—14 at the high rate of 240 per hour; the assembly time for each mold thus being only fifteen seconds.

This means that once every fifteen seconds a sand charged drag 12 is inserted into the upper arm of the turret head 60 at Station I, a core box 26 with finished core 15 therein is inserted into the lower arm of the turret head 60 at Station II, an empty core box 26 is withdrawn from the upper arm of the rolled over head 60 at Station III and then turned over and placed upon track 187 for return to Station II, a sand-charged cope 14 is inserted into the empty upper arm of the turret head 60 at Station IV, an assembled mold 12—14 is withdrawn from the closed arms of the turret 60 at Station V and prepared for transfer to a car 33 moving around track 32, and an indexing movement (of 72°) is imparted to turret 54 of the central machine 30 thereby advancing all five arm heads 60 to the next stations in the direction of turret rotation.

The speed of mold-car movement around main track 32 is selected (at drive means 35) so that the aforesaid fifteen seconds is required for each car 33 to pass a given point; this assuring coordinated supply of the drag flasks 12 to the shake-out 46 which leads to Station I, of empty cars 33 to the location of Station V at which assembled molds are transferred to those cars for pouring, of cope flasks 14 (from the poured molds) to shake-out 47 which leads to Station IV, and of cooled castings 10 (from the drags 12 passing beneath core box track 187) to the shake-out 45 which leads to the receiver 341 for the finished castings.

For the illustrative installation represented in Fig. 1 we find the upper limit in mold assembly speed (and hence the frequency with which the central machine turret 54 can be indexed) to be set by the closing, roll over and reopening movements through which the arms 61—62 on each turret head 60 must pass during advance of the head from Station II to Station III; the actions at all other points in the system being performable at least as fast as or even faster than the aforesaid closing-rollover-reopening of the flask-receiving arms 61—62 during progress thereof from Station II to Station III.

*Alternate uses for disclosed mold assembling apparatus*

The technique and apparatus here disclosed may successfully be used to prepare and assemble molds for producing castings of a wide variety of sizes, shapes and forms (solid as well as hollow) other than the quarter-bend soil pipe fitting here illustratively shown at 10 in Fig. 3. Thus in the Fig. 1 installation production of some other casting in molds utilizing the drag and cope flasks 12 and 14 may be set up merely by substituting at **12*a* in Fig. 38 (Station I) and at 14*a* in Fig. 52 (Station IV) the appropriate pattern halves for said other casting, and when a core is involved also by substituting at 26 and 26*a*** in Fig. 41 (Station II) the appropriate core box halves therefor; but if the casting to be produced is of solid formation requiring no core, then said core box halves along with the functions of Stations II and III can be completely dispensed with.

As earlier indicated, the installation depicted in Fig. 1 has been illustratively explained as being adapted to prepare and assemble molds intended for the production of castings such as shown at 10 in Fig. 3; which castings are hollow and which therefore require a core 15 in the molds 12—14 used to produce them. The Fig. 1 installation has further been explained as being adapted for employment of "green" sand in the formation of each of these cores 15; the apparatus utilized for such formation being as shown at Station II and cooperating apparatus used to return the empty core boxes 26 being as further depicted at Station III.

For producing castings of hollow formation this unique coordination for core forming facilities at Station II and of core box turnover and return facilities at Station III is especially advantageous and it constitutes one of the important features contributing to the overall success of the Fig. 1 installation. But it will be obvious that the remaining portions of the installation can readily be adapted to foundry set ups wherein the core 15 of Fig. 3 is formed of "dry" sand and prepared by well known facilities (involving a baking oven or the like not herein shown) which may be external to the Fig. 1 area.

For operation in such set ups the apparatus disclosed by Fig. 1 may with advantage be utilized in the following slightly modified manner. The core box halves 26 can be used as fixtures to support and position the dry sand cores which are manually inserted thereinto by an operator at Station II; the upper core box half 26*a* and machines 185 and 186 not now being required. In this way the dry sand cores may respectively be carried into the central assembling machine 30 with the core fixtures 26 as those fixtures are successively introduced into the machine arms by the apparatus at the right of Fig. 41 in the same way as when "green" sand cores are employed; and the empty fixtures taken from the central machine 30 at Station III and there ended over then are returned to Station II via gravity track 187 for reuse there. In many castings the use of a "dry" sand core is mandatory, and the above technique allows such castings to be produced with efficiency by the mold assembling apparatus here disclosed.

Also for operation with dry sand cores it likewise is possible for those cores to be placed manually directly into the mold cavities of the drags 12 that are carried in the central assembling machine arms; in this case the apparatus disclosed by Fig. 1 can be utilized in the manner schematically indicated by Fig. 61*a*.

That drawing view (Fig. 61*a*) shows an assembling machine 30′ provided with five sets of arm carrying heads 60 for cooperating with five stations equally spaced around the machine; this machine 30′ being generally similar to the earlier described machine 30 but differing therefrom in being arranged so that each set of flask-receiving arms 61—62 will roll over immediately after leaving the "Drag-On" Station instead of between Stations II and III as in Fig. 1. At the five stations surrounding machine 30′ there can be performed the respective functions which the captions of Fig. 61*a* indicate; the dry sand cores produced independently as aforesaid being set into the cavity of the drags 12 (upturned following roll over) at the two stations so marked which respectively correspond to II and III of Fig. 1. In other respects the general operation will be as already explained for the "green" sand core system of Fig. 1 and related views.

Referring now to Fig. 61*b* a further simplification is there indicated taking the form of a central indexing machine 30″ provided with only four arms heads 60 (instead of the five shown by earlier drawing views). In the arrangement of Fig. 61*b* the dry sand cores will be set in the drag cavities at the single station marked "Set Dry Sand Core." In other respects the operation will be as already commented on the connection with Fig. 61*a*.

Referring finally to Fig. 61*c* the central indexing machine 30‴ there shown is still further simplified by being provided with only three arm heads 60. Such a simplified machine is usable for the assembly of molds which are to produce castings of solid formation not requiring any core. In such a simplified installation the three stations represented in Fig. 61*c* respectively correspond to Stations I, IV and V of Fig. 1; Stations II and III being totally dispensed with.

At these three stations of Fig. 61*c* there can respectively be performed the functions carried out at Stations I, IV and V in the Fig. 1 installation. In fact even the five-station installation of Fig. 1 can without modification be used as in Fig. 61*c* to assemble molds that are adapted to produce castings (corresponding to 10 in Fig. 3) which are of solid formation and for which no cores of any kind are required in the mold.

Finally, it further is to be pointed out that the central assembling machine 30 can if desired be organized to produce two, or three or even a greater number of assembled molds simultaneously, instead of only the one assembled mold as here illustratively disclosed. Thus machine 30‴ of Fig. 61*c* can be provided with six, nine or twelve arm heads 60 organized with cooperating station apparatus to assemble simultaneously two, three or four molds not requiring a core; likewise machine 30 of Figs. 1 and 2 can be provided with ten, fifteen or twenty arm heads 60 organized to assemble simultaneously two, three or four molds which do require a core or cores; similarly machine 30″ of Fig. 61*b* can be provided with eight, twelve or sixteen arm heads 60 organized to assemble simultaneously two, three or four molds of the dry-sand-core type there involved. In each of the foregoing instances the single-mold assembly hereinbefore described in detail will be carried out on a multiple basis with selected groups of arm heads and cooperating stations acting in parallel.

*Summary*

The technique and facilities herein disclosed are therefore capable of an inherently wide and diversified application and the specific mold assembling functions described therefor are accordingly to be interpreted in an illustrative rather than in a restrictive sense.

It will thus be seen that our invention makes it possible to prepare and assemble molds for castings of all kinds (solid as well as hollow) much faster and more efficiently than has been possible heretofore; that our inventive improvements have raised the casting output obtainable within a given area of foundry floor space; that they have cut down both the time and the labor needed to assemble the mold components; that they have removed the limitation in casting production speed previously imposed by such required time and labor and have provided a continuous mold assembling cycle from which a high rate of casting production is possible; that they have uniquely coordinated the mold preparing and assembling operations so that a majority thereof can be performed mechanically and more or less automatically without the aid of manual handling and by exercise of a relatively low degree of skill on the part of operating personnel; and that for carrying out these improvements our invention has provided mold assembling mechanism of new and improved form and has novelly organized same for reliable automatic operation with a minimum of attention by operating personnel.

Our inventive improvements are therefore extensive in their adaptation and hence are not to be restricted to the specific form here disclosed by way of illustration.

What we claim is:

1. In an installation for assembling molds, the combination of an assembling machine, apparatus at a first station for supplying said machine with drags successively introduced thereinto with pattern cavities facing down, mechanism in said machine for rolling each received drag over thereby facing the pattern cavity thereof up and advancing said drag to another station, apparatus at said other station for supplying said machine with copes successively introduced thereinto with pattern cavities facing down, mechanism in said machine for bringing each received cope together with one of the aforesaid rolled-over drags with respective pattern cavities in register and for advancing said cope and drag to a further station, and apparatus at said further station for withdrawing from said machine each assembled mold made up of a drag and cope brought together as aforesaid.

2. In mechanism for assembling drag and cope components into completed molds, the combination of an arm head provided with an upper arm and a lower arm; support means for said arm head adapted to move it into successive positional register with a drag station, a cope station and a mold-off station; means at said drag station operable during positional registry of said head therewith for inserting into the head's upper arm a sand-charged drag with pattern cavity facing down; means effective upon movement of said arm head from the drag station towards said cope station for rolling the upper and lower arms thereof over thereby placing the aforesaid drag on the bottom with pattern cavity facing up; means at said cope station for inserting into the upper arm of the rolled over arm head arriving thereat a sand-charged cope with pattern cavity facing down; means effective upon movement of said arm head from the cope station towards said mold-off station for closing together the head's upper and lower arms thereby bringing the cope upon the drag with respective pattern cavities in register; and means at said mold-off station for withdrawing from the closed upper and lower arms of the said arm head arriving thereat the assembled mold made up of the drag and cope brought together as aforesaid.

3. In mold assembling apparatus, the combination of a rotatable turret, a plurality of heads mounted on said turret and each carrying an upper arm and a lower arm, a plurality of operating stations at which the turret is adapted successively to position the respective arm heads, means at a first one of said stations for inserting into the upper arm of each head arriving thereat a sand-charged drag with pattern impression facing down, means operable on each head that is advanced beyond said first station for rolling the upper and lower arms thereof over thereby placing said arm-carried drag on the bottom with pattern impression facing up, means at a further one of said stations for inserting into the upper arm of each rolled over head arriving thereat a sand-charged cope with pattern impression facing down, means operable on each head leaving said further station for closing the upper and lower arms thereof together thereby bringing the cope now in the upper arm together with the drag now in the lower arm with respective pattern impressions in register, and means at a still further one of said stations for withdrawing from the closed upper and lower arms of each head arriving thereat the assembled mold made up of the drag and cope brought together as aforesaid.

4. In mechanism for assembling drag and cope components into completed molds, the combination of a rotatable turret, at least three heads mounted on said turret at points spaced therearound, an upper arm and a lower arm carried by each head, means at a drag station along the turret periphery's travel path for inserting into the upper arm of each head arriving thereat a sand-charged drag with pattern cavity facing down, means for causing each turret head advanced beyond the drag station to roll the upper and lower arms thereof over thereby placing the aforesaid drag on the bottom with pattern cavity facing up, means at a cope station further along said travel path for inserting into the upper arm of each rolled over turret head arriving thereat a sand-charged cope with pattern cavity facing down, means for causing each turret head leaving the cope station to close together its upper and lower arms thereby bringing the cope upon the drag with respective pattern cavities in register, means at a mold-off station still further along said travel path for withdrawing from the closed upper and lower arms of each turret head arriving thereat the assembled mold made up of the drag and cope brought together as aforesaid, and means for causing each turret head leaving the mold-off station to move its empty upper and lower arms apart in preparation for their return to the aforesaid drag station.

5. In mechanism for assembling drag, core and cope components into completed molds, the combination of an arm head provided with an upper arm and a lower arm; support means for said arm head adapted to move it into successive positional register wtih a drag station, a core station, a core-box-off station, a cope station and a mold-off station; means at said drag station operable during positional registry of said head therewith for inserting into the head's upper arm a sand-charged drag with pattern cavity facing down; means at said core station for inserting into the lower arm of the said head arriving thereat a core box with core therein facing up; means effective when the said head moves away from the core station to close together its upper and lower arms and then to roll them over and thereafter to reopen them thereby raising the core box now in the upper arm upwardly away from the drag now in the lower arm and away from the core now in the drag cavity; means at said core-box-off station for withdrawing the empty core box from the upper arm of the said arm head arriving thereat; means at said cope station for inserting into the upper arm of the said arm head arriving thereat a sand-charged cope with pattern cavity facing down; means effective when the said head moves away from the cope station to close the head's upper and lower arms together thereby bringing the cope now in the upper arm upon the drag now in the lower arm and over the core now resting in the drag cavity; and means at said mold-off station for withdrawing from the closed upper and lower arms of the said arm head arriving thereat the assembled mold made up of the drag, core and cope brought together as aforesaid.

6. In an installation for assembling molds, the combination of an assembling machine, apparatus at a first station for supplying said machine with drags successively introduced thereinto with pattern cavities facing down, means in said machine for advancing each received drag to a second station, apparatus at said second station for supplying said machine with core boxes successively introduced thereinto with each box carrying a core facing up from the box, mechanism in said machine for bringing each received core box together with an earlier received drag and rolling the pair over and advancing the pair to a third station and then separating the inverted core box from the rolled over drag thereby leaving the core in and facing up from the pattern cavity of the drag, apparatus at said third station for withdrawing from the machine each inverted core box that has been separated from its associated core and drag as aforesaid, means in said machine for advancing each of said rolled over drags with core therein to a fourth station, apparatus at said fourth station for supplying said machine with copes successively introduced thereinto with pattern cavities facing down, mechanism in said machine for bringing each received cope together with one of the aforesaid rolled-over drags and over the core now in the drag cavity and advancing these mold parts to a fifth station, and apparatus at said fifth station for withdrawing from said machine each assembled mold made up of a drag, core and cope brought together as aforesaid.

7. In apparatus for assembling drag, core and cope components into completed molds, the combination of a rotatable turret; a plurality of heads mounted on said turret and each carrying an upper arm and a lower arm; a plurality of operating stations at which the turret is adapted successively to position the respective arm heads; means at a first or drag station for inserting into the upper arm of each head arriving thereat a sand-charged drag with pattern cavity facing down; means at a second or core station for inserting into the lower arm of each turret head arriving thereat a core box with core therein facing up; means for causing each turret head leaving the core station to close together its upper and lower arms and then to roll them over and thereafter to reopen them thereby raising the core box now in the upper arm upwardly away from the drag now in the lower arm and away from the core now in the drag cavity; means at a third or core-box-off station for withdrawing the empty core box from the upper arm of each turret head arriving thereat; means at a fourth or cope station for inserting into the upper arm of each turret head arriving thereat a sand-charged cope with pattern cavity facing down; means for causing each turret head leaving the cope station to close its upper and lower arms together thereby bringing the cope now in the upper arm upon the drag now in the lower arm and over the core now resting in the drag cavity; and means at a fifth or mold-off station for withdrawing from the closed upper and lower arms of each turret head arriving thereat the assembled mold made up of the drag, core and cope brought together as aforesaid.

8. In mechanism for assembling molds, the combination of a rotatable turret provided with a plurality of arm heads spaced circumferentially therearound; upper and lower flask-receiving arms carried by each head and being adapted for roll over and for movement towards and away from each other; means for indexing said turret in successive rotative steps each equal to the angular distance between arm heads whereby each set of head-carried arms progressively occupies at-rest positions spaced at predetermined station locations around the turret periphery's rotative path; apparatus at a first or drag station for inserting into the upper arm of each turret head there coming to rest a sand-charged drag flask having its pattern impression facing down; apparatus at a second or core station for inserting into the lower arm of each turret head there coming to rest a core box half having a finished core therein facing up from the box half; means effective during advancement by said turret of each arm head away from said core station for first closing the two arms on that head together thus bringing the core into said drag's pattern cavity and then rolling said arms over thus placing the drag on the bottom and the core on top thereof with the core box half above the core and then opening the two arms away from each other thus lifting the core box half free both of the drag and of the core now in the drag's pattern cavity; apparatus at a third or core-box-off station for withdrawing the empty and now inverted core box half out of the upper arm of each turret head there coming to rest and for thereupon turning that core box over and then returning it to the aforesaid core station; apparatus at a fourth or cope station for inserting into the upper arm of each turret head there coming to rest a sand-charged cope flask having its pattern impression facing down; means effective during advancement by said turret of each arm head away from said cope station for closing the two arms on that head together thus bringing the cope upon the drag with the cope's pattern cavity fitting over the core now supported by the drag; apparatus at a fifth or mold-off station for withdrawing from the two thus closed arms of each turret head there coming to rest an assembled mold made up of drag, core and cope brought together as aforesaid and means effective during advancement by said turret of each arm head beyond the mold-off station for opening the two arms on that head away from each other preparatory to a starting at the aforesaid drag station of those arms through another mold assembly cycle duplicating the one hereinabove defined.

9. In a machine for assembling molds, the combination of a turret rotatable about a generally vertical axis; an arm head carried by said turret; mean mounting said head for roll over about a substantially horizontal axis generally radial to the turret center; upper and lower sets of flask receiving arms carried by and extending outwardly from said head in generally parallel relation to the head's roll over axis, said upper and lower arm sets being arranged for movement towards and away from each other and each of the arm sets being arranged to receive and support a mold flask; and means for indexing said turret in successive rotative steps whereby said head-carried arms progressively occupy at-rest positions spaced at predetermined station locations around the turret periphery's rotative path.

10. In a method of assembling drag and cope components into completed molds, the steps which comprise inserting each sand-charged drag flask endwise in direction along the drag's lengthwise axis into a first support arranged initially to hold the inserted drag with pattern cavity facing down, next rolling over said first support with drag flask therein around an axis parallel to said lengthwise axis of the drag thereby facing the drag's pattern cavity up, then inserting each sand-charged cope flask endwise in direction along the cope's lengthwise axis into a second support positioned directly above said rolled-over first support and serving initially to hold the inserted cope spacedly above the aforesaid drag in that first support with the cope's pattern cavity facing down towards the opposing pattern cavity of the drag, thereupon closing said first and second supports towards one another thereby bringing the cope upon the drag with respective pattern cavities in register, and finally withdrawing endwise in direction along the lengthwise axis of both drag and cope from the two thus closed supports the assembled mold made up of the drag and cope brought together as aforesaid.

11. In a method of assembling drag, core and cope components into completed molds, the steps which comprise inserting each sand-charged drag flask endwise in direction along the drag's lengthwise axis into a first support adapted initially to hold the inserted drag with pattern cavity facing down; next inserting each core via a carrying core box endwise in direction along the box's lengthwise axis into a second support initially positioned directly below said first support and adapted initially to hold the core box spacedly beneath the aforesaid drag in that first support with the core facing up from its carrying box towards the down-facing pattern cavity of the drag; thereupon closing said first and second supports together thus bringing said core into said drag's pattern cavity and then rolling those supports over around an axis parallel to said lengthwise axis of the drag and the core box thus placing the drag on the bottom and the core on top thereof with the core box above the core and then opening the two supports away from each other thus lifting the core box free of the drag and of the core now in the drag's pattern cavity; next withdrawing the empty and inverted core box endwise in direction along said lengthwise axis of the box out of said second support now positioned above the first support since the aforesaid roll over; then inserting each sand-charged cope flask endwise in direction along the cope's lengthwise axis into said empty second support which now serves initially to hold the inserted cope spacedly directly above the aforesaid drag in the first support with the cope's pattern cavity facing down towards said core in the drag's pattern cavity; thereupon closing said first and second supports together thus bringing the cope upon the drag with the cope's pattern cavity fitting over the core in the drag cavity; and finally withdrawing endwise in direction along the lengthwise axes of both drag and cope from the two thus closed supports the assembled mold made up of drag, core and cope brought together as aforesaid.

12. In a method of assembling molds, the steps which comprise inserting a drag endwise in direction along the drag's lengthwise axis into a first support adapted initially to hold the drag with pattern cavity facing down; inserting a core box with core therein endwise in direction along the box's lengthwise axis into a second support initially directly below the first support and adapted initially to hold the core box spacedly beneath the aforesaid drag with the core facing up from the box towards the down-facing pattern cavity of the drag; closing the first and second supports together and then rolling them over around an axis parallel to said lengthwise axes of the drag and core box and thereafter reopening them thereby raising the core box in the second support now above the first support upwardly away from the drag in the first support and away from the core now in the drag cavity; withdrawing the empty and now inverted core box endwise in direction along said lengthwise axis of the box out of the second support and turning that withdrawn core box over around an axis generally parallel to the sidewise axis of the box preparatory to reuse of the box in a succeeding cycle of mold assembly; inserting a cope endwise in direction along the cope's lengthwise axis into the empty second support which now serves to hold that cope spacedly directly above the drag in the first support therebeneath and with the cope's pattern cavity facing down towards the core in the drag's pattern cavity; closing the first and second supports together thus bringing the cope upon the drag with the cope's pattern cavity fitting over the core in the drag cavity; and withdrawing endwise in direction along the lengthwise axes of both drag and cope from the two closed supports the assembled mold made up of the drag, core and cope brought together as aforesaid.

13. In a machine for assembling molds, the combination of a turret rotatable about a generally vertical axis; a plurality of arm heads carried by said turret and spaced circumferentially therearound; means mounting each head for roll over about a substantially horizontal axis generally radial to the turret center; upper and lower sets of flask receiving arms carried by and extending outwardly from each head in generally parallel relation to the head's roll over axis, said upper and lower arm sets being arranged for movement towards and away from each other and each of the arm sets being arranged to receive and support a mold flask; and means for indexing said turret in successive rotative steps each equal to the angular distance between arm heads whereby each set of head-carried arms progressively occupies at-rest positions spaced at predetermined station locations around the turret periphery's rotative path.

14. In a mold assembling machine the combination of a rotatable turret, a plurality of arm heads mounted on the turret in circumferential spacing therearound with each head being arranged for roll over about a substantially horizontal axis generally radial to the turret center, upper and lower sets of arms carried by each head each of which arm sets is arranged to receive and support a mold flask, motor means arranged to index said turret in successive rotative steps each equal to the angular distance between arm heads whereby each set of head-carried arm sets progressively occupies at-rest positions spaced at predetermined station locations around the turret periphery's rotative path, apparatus at said station locations for variously inserting drag and cope flasks into certain of the head arm sets there coming to rest and for withdrawing assembled molds from others of those arm sets, and control means automatically responsive to the condition of said station apparatus and effective to cause said motor means to impart indexing rotation to said turret when and only when the apparatus at all of the several stations has been fully prepared therefor.

15. In a mold assembling machine a turret rotatable about a generally vertical axis, a plurality of arm heads mounted on said turret in circumferential spacing therearound with each head being arranged for roll over about a substantially horizontal axis generally radial to the turret center, upper and lower sets of flask-receiving arms carried by each of said heads each of which arm sets is arranged to receive and support a mold flask, motor means adapted to index said turret in successive rotative steps each equal to the angular distance between arm heads whereby each set of head-carried arms progressively occupies at-rest positions spaced at predetermined station locations around the turret periphery's rotative path, apparatus at said station locations for inserting various mold components into certain of the head arm sets there coming to rest and for withdrawing assembled molds from others of those arm sets, control means automatically responsive to the condition of said station apparatus and effective for bringing said indexing motor means into action when the aforesaid apparatus at all of said station locations has been fully prepared for another rotative movement on the part of said machine turret, and stop means for arresting each of said rotative movements when the turret heads have been indexed by said motor means into new positions that accurately register with the aforesaid station locations.

16. In a mold assembling machine, the combination of a rotatable turret, a plurality of arm heads carried by the turret in circumferential spacing therearound, upper and lower sets of flask-receiving arms carried by each head and mounted thereon for movement towards and away from each other with each arm set being arranged to receive and support a mold flask, an arm-spacing motor included in each head assemblage and arranged to produce the aforesaid movement of the two head arm sets towards and away from each other, support means for each head serving to mount the entire head assemblage on the turret in a way permitting rollover of said assemblage around the support means axis, a roll-over motor for each head mounted on the turret and connected with the head assemblage to impart rollover movements thereto, means governed by changes in the rotational position of said machine turret for controlling said arm-spacing motors for the arm heads, and means also governed by changes in the rotational position of the machine turret for controlling said roll-over motors for the arm heads.

17. In a mold assembling machine, a rotatable turret, a plurality of arm heads carried by the turret, upper and lower sets of arms carried by each head with each arm set being arranged to receive and support a mold flask, an arm-spacing hydraulic motor included in each head and arranged to move the head's flask-receiving arm sets towards and away from each other, means mounting each head on the turret in a way permitting roll-over of the entire head assemblage, a roll-over hydraulic motor for each head adapted to impart roll-over movements thereto, a fluid pressure line and a fluid exhaust line for transmitting operating fluid to and from said roll-over hydraulic motors and said arm-spacing hydraulic motors, a hydraulic coupling disposed centrally of the rotatable turret and being connected with said fluid pressure and fluid exhaust lines, branch pressure and exhaust lines extending from said central coupling to each roll over motor and to each arm spacing motor for each of said turret heads, a fluid control valve disposed in the branch pressure and exhaust lines leading to each of said motors, and means responsive to the rotational position of said machine turret for causing each of said control valves to supply its associated motor at times with pressure fluid that produces forward rotation of the motor and at other times with pressure fluid that produces reverse rotation of the motor.

18. In a mold assembling machine, a rotatable turret, a plurality of arm heads carried by the turret, upper and lower sets of arms carried by each head with each arm set being arranged to receive and support a mold flask, means mounting each head on the turret in a way permitting roll over of the entire head assemblage, a roll-over hydraulic motor for each head arranged to rotate the head assemblage in the forward direction when pressure fluid is admitted into a first port of the motor and in the reverse direction when pressure fluid is admitted into a second port of the motor, a fluid pressure line and a fluid exhaust line for transmitting operating fluid to and from each of said roll-over motors, a control valve disposed in the said pressure and exhaust lines for each motor, means for causing each of said control valves to flow pressure fluid into said first port of its associated motor at times and into said second port at other times thereby respectively producing forward and reverse roll-over of the associated arm head, first stop means for each head for mechanically blocking each forward roll-over travel thereof at a predetermined point therein, and second stop means for each head for mechanically blocking each reverse roll-over travel thereof at a predetermined point therein.

19. In a mold assembling machine, a rotatable turret provided with a head equipped with upper and lower sets of arms each of which arm sets is arranged to receive and support a mold flask, means mounting said head on the turret in a way permitting roll-over of the entire head assemblage, a hydraulic motor for said head arranged to impart either forward or reverse roll-over movement to the head assemblage, a fluid pressure line and a fluid exhaust line for transmitting operating fluid to and from said roll-over motor, a fluid control valve disposed in said pressure and exhaust lines, and means governed by changes in the rotational position of said turret for causing said control valve to supply said roll-over motor at times with pressure fluid that causes the motor to roll said arm head over in said forward direction and at other times with pressure fluid that causes the motor to roll the arm head over in said reverse direction.

20. In a mold assembling machine, a rotatable turret, a plurality of arm heads carried by the turret, upper and lower sets of arms carried by each head each of which arm sets is arranged to receive and support a mold flask, an arm-spacing hydraulic motor for each head arranged to move the head's flask-receiving arm sets towards each other in the closing direction when pressure fluid is admitted into a first port of the motor and away from each other in the opening direction when pressure fluid is admitted into a second port of the motor, a fluid pressure line and a fluid exhaust line for transmitting operating fluid to and from each of said arm-spacing motors, a control valve disposed in the said pressure and exhaust lines for each motor, and means for causing each of said control valves to flow pressure fluid into said first port of its associated motor at times and into said second port at other times thereby respectively producing closing and opening movements of the associated sets of flask arms, each of said closing movements being mechanically blocked when the upper and lower sets of arms involved come together or when mold flasks carried thereby similarly come together.

21. In a mold assembling machine, a rotatable turret provided with a head equipped with upper and lower sets of arms each of which arm sets is arranged to receive and support a mold flask, a hydraulic motor for said head arranged to move the flask-receiving arm sets thereof either towards each other in the closing direction or away from each other in the opening direction, a fluid pressure line and a fluid exhaust line for transmitting operating fluid to and from said arm-spacing motor, a fluid control valve disposed in said pressure and exhaust lines, and means governed by changes in the rotational position of said turret for causing said control valve to supply said arm-spacing motor at times with pressure fluid that causes the motor to move said flask-receiving arms in said closing direction and at other times with pressure fluid that causes the motor to move the flask-receiving arms in said opening direction.

22. In a mold assembling machine having movable support mechanism that is provided with a head equipped with an arm adapted to receive a mold flask or core box, the combination of first and second side portions for said arm facing each other and spaced apart by the width of said mold flask or core box which the arm is to receive, and upper and lower rows of rollers disposed along the inner face of each of the arm's said first and second side portions and being spaced to accommodate between the roller rows a side member of the aforesaid mold flask or core box whereby such flask or box can be slid endwise between the arm's two side portions with each of said two side members of the flask or box occupying the space between upper and lower roller rows along the arm side portion engaged.

23. In a mold assembling machine having a turret that is provided with a head equipped with an arm adapted to receive a mold flask or core box, the combination of first and second side portions for said arm facing each other and spaced apart by the width of said mold flask or core box which the arm is to receive, and upper and lower rows of rollers disposed along the inner face of each of the arm's said first and second side portions and being spaced to accommodate between the roller rows a side member of the aforesaid mold flask or core box whereby such flask or box can be slid endwise between the arm's two side portions with each of said two side members of the flask or box occupying the space between upper and lower roller rows along the arm side portion engaged.

24. In a mold assembling machine, the combination of a rotatable turret; a plurality of arm heads carried by said turret in circumferential spacing therearound; upper and lower arms carried by and extending outwardly from each head for the purpose of receiving mold flasks or the like, each of said arms comprising left and right side portions facing each other and being spaced apart by the width of the said mold flask or the like which the arm is to receive; and spaced upper and lower rows of rollers disposed along the inner face of each of the arm's said left and right side portions, each such pair of roller rows being adapted to accommodate therebetween a side member of the aforesaid mold flask or the like when that flask is inserted endwise between said left and right side portions of the arm.

25. In a mold assembling machine, a turret; arm heads carried by said turret; upper and lower arms carried by and extending outwardly from each head for the purpose of receiving mold flasks or the like, each of said arms comprising left and right side portions facing each other and being spaced apart by the width of the said mold flask or the like which the arm is to receive; spaced upper and lower rows of rollers disposed along the inner face of each of the arm's said left and right side portions, each pair of said roller rows being adapted to accommodate therebetween a side support member of the aforesaid mold flask or the like when that flask is inserted endwise between said left and right side portions of the arm; and means for yieldingly restraining each so inserted flask or the like against endwise movement out of the said side portions of the turret head arm which receives it.

26. In a mold assembling machine having a turret that is provided with a head equipped with an arm adapted to receive a mold flask or core box, the combination of first and second side portions for said arm facing each other and spaced apart by the width of the said mold flask or core box which the arm is to receive; upper and lower rows of flask-support rollers disposed along the inner face of each of the arm's said first and second side portions and being spaced to accommodate between the roller rows a side support bar of the aforesaid mold flask or core box when that flask or box is inserted endwise between the first and second side portions of said arm; and means for yieldingly restraining each so inserted flask or core box against endwise movement out of the side portions of the arm, said means comprising a retention roller provided in one of the arm side portions between the upper and lower rows of that portion's flask-support rollers and there yieldingly urged inwardly for engagement with a mating notch in the flask-or-box-side support bar that is accommodated between those support-roller rows.

27. In an installation comprising a mold assembling machine into which drags are successively introduced at one station and rolled over in the machine and into which copes are successively introduced at another station and respectively brought together with rolled-over drags to form assembled molds and from which machine the assembled molds are successively withdrawn at a further station, the combination of apparatus at said one station for there introducing each of said drags into the machine with pattern impression facing down, said apparatus comprising means for receiving empty drag flasks and charging each with sand in which the pattern impression is made, a carriage for transferring each drag from said charging means to said assembling machine, means for moving said carriage between a normally withdrawn position and an extended position, a latch on said carriage adapted to push a sand-charged drag into the assembling machine when the carriage travels to said extended position and to engage another sand-charged drag when the carriage returns to said withdrawn position, means responsive to placement of said machine in readiness to receive a sand-charged drag for initiating advancement of said carriage to said extended position, and means responsive to arrival by said carriage at said extended position for causing return of the carriage to said withdrawn position.

28. In an installation comprising a mold assembling machine into which drags are successively introduced at one station and rolled over in the machine and into which copes are successively introduced at another station and respectively brought together with rolled-over drags to form assembled molds and from which machine the assembled molds are successively withdrawn at a further station, said machine including a rotatable turret provided with means for indexing the turret through the angular distance between station locations following each reception by the machine of a drag and a cope accompanied by discharge of an assembled mold, the combination of apparatus at said one station for there introducing each of said drags into the machine with pattern impression facing down, said apparatus comprising means for receiving empty drag flasks and charging each with sand in which the pattern impression is made, means including a carriage for transferring each drag from said charging means to said assembling machine, and an interlocking circuit organized to permit said turret indexing means to be activated only after a sand-charged drag has been fully inserted into the assembling machine by the aforesaid transfer carriage at said one station.

29. In an installation comprising a mold assembling machine into which drags are successively introduced at a first station and into which cores in core boxes are successively introduced at a second station and respectively rolled over with drags that then receive the cores from the boxes and from which machine the empty core boxes are successively withdrawn at a third station and into which machine copes are successively introduced at a fourth station and brought together with rolled-over drags and cores to form assembled molds and from which machine the assembled molds are successively withdrawn at a fifth station, the combination of apparatus at said second station for there introducing each of said cores into the machine in a core box which carries the core facing up therefrom, said apparatus comprising means for receiving empty core boxes and forming in each a sand core facing up from the box as aforesaid, a carriage for transferring each core box and core from said core-forming means to said assembling machine, means for moving said carriage between a normally withdrawn position and an extended position, a latch on said carriage adapted to push a core-carrying core box into the assembling machine when the carriage travels to said extended position and to engage another core-carrying core box when the carriage returns to said withdrawn position, means responsive to placement of said machine in readiness to receive a core-carrying core box for initiating advancement of said carriage to said extended position, and means responsive to arrival by said carriage at said extended position for causing return of the carriage to said withdrawn position.

30. In an installation comprising a mold assembling machine into which drags are successively introduced at a first station and into which cores in core boxes are successively introduced at a second station and respectively rolled over with drags that then receive the cores from the boxes and from which machine the empty core boxes are successively withdrawn at a third station, said machine including a rotatable turret provided with means for indexing the turret through the angular distance between station locations following each reception by the machine of a drag and core-carrying core box accompanied by discharge of an empty core box, the combination at said second station of means for receiving empty core boxes and forming in each a sand core facing up from the box, means including a carriage for transferring each core box with core therein from said core-forming means to said assembling machine, and an interlocking circuit organized to permit said turrent indexing means to be activated only after a core-carrying core box has been fully inserted into the assembling machine by the aforesaid transfer carriage at said second station.

31. In combination with a mold assembling machine, apparatus at a first station for supplying said machine with drags successively introduced thereinto with pattern cavities facing down, apparatus at a second station for supplying said machine with core boxes successively introduced thereinto with each box carrying a core facing up from the box, means in said machine for bringing each received core box together with an earlier received drag and rolling the pair over and then separating the inverted core box from the rolled over drag thereby leaving the core in and facing up from the pattern cavity of the drag, and apparatus at a third station for withdrawing from the machine each inverted core box that has been separated from its associated core and drag as aforesaid, said withdrawing apparatus comprising a manipulator device, a carriage movable by said device between an extended position and a withdrawn position, a latch on said carriage adapted to engage an inverted core box within the machine at said third station when the carriage travels to its said extended position and to pull the core box out of the machine when the carriage travels to its said withdrawn position, means responsive to delivery by the machine of a rolled-over core box to said third station for causing said manipulator to advance the carriage to said extended position, and means responsive to arrival by said carriage at said extended position for causing the manipulator to return the carriage to said withdrawn position.

32. In an installation comprising a mold assembling machine into which core boxes are successively introduced at one station and rolled over in the machine and delivered thereby to another station, the combination of apparatus at said other station for withdrawing each rolled over core box from the machine, said apparatus comprising table structure adapted to receive a core box therein, a carriage and a manipulator device therefor mounted on said table structure, said carriage being movable by the device between an extended position and a withdrawn position, a latch on said carriage adapted to engage a rolled over core box within the machine when the carriage travels to its said extended position and to pull the core box out of the machine into said table structure when the carriage travels to its said withdrawn position, means responsive to delivery by the machine of a rolled over core box to said other station for causing said manipulator to advance the carriage to said extended position, and means responsive to arrival by said carriage at said extended position for causing the manipulator to return the carriage to said withdrawn position.

33. In an installation comprising a mold assembling machine into which drags are successively introduced at a first station and into which core boxes are successively introduced at a second station and within which each received core box is brought together with an earlier received drag and rolled over therewith and then separated therefrom, the combination of apparatus at a third station for withdrawing each so separated core box from said machine, said apparatus comprising a manipulator cylinder, a carriage actuated by said cylinder and adapted to be moved thereby between an extended position and a withdrawn position, a latch on said carriage adapted to engage a rolled-over core box within the machine at said third station when the carriage travels to its said extended position and to pull the core box out of the machine when the carriage travels to its said withdrawn position, and means responsive to delivery by the machine of a rolled-over core box to said third station for causing said cylinder first to extend the carriage as aforesaid and then to withdraw the carriage as aforesaid thereby removing from the machine the core box that has been engaged by said latch.

34. In an installation comprising a mold assembling machine into which core boxes are successively introduced at one station and rolled over in the machine and delivered thereby to another station, the combination of apparatus at said other station for withdrawing each rolled over core box from the machine, said apparatus comprising a manipulator cylinder, a carriage actuated by a piston that is adapted to travel back and forth through said cylinder, said carriage being adapted for movement by the piston between an extended position and a withdrawn position, a latch on said carriage adapted to engage a rolled-over core box within the machine when the carriage travels to its said extended position and to pull the core box out of the machine when the carriage travels to its said withdrawn position, means responsive to delivery by the machine of each core box to said other station for admitting pressure fluid into the manipulator cylinder on one side of said piston whereby then to extend the carriage and engage the said latch thereof with the box, and means responsive to arrival by the carriage at said extended position for thereafter admitting pressure fluid into the cylinder on the other side of said piston whereby then to withdraw the carriage and with it the core box from the machine.

35. In an installation comprising a mold assembling machine into which drags are successively introduced at a first station and into which cores in core boxes are successively introduced at a second station and respectively rolled over with the drags that then receive the cores from the boxes, said machine including a rotatable turret provided with means for indexing the turret through the angular distance between station locations following each reception by the machine of a drag and a core box, the combination of apparatus at a third station for withdrawing from the machine each of the empty core boxes which each indexing of said turret causes the machine to bring to said third station, said apparatus comprising a carriage, means for moving said carriage between a withdrawn position and an extended position, a latch on said carriage adapted to engage an empty core box in the machine when the carriage travels to said extended position and to pull the engaged core box out of the machine when the carriage travels to said withdrawn position, and an interlocking circuit organized to permit said turret indexing means to be activated only after an empty core box has been fully withdrawn from the assembling machine by the aforesaid apparatus at the third station.

36. In an installation for assembling molds, the combination with an assembling machine of apparatus at a first station for supplying said machine with drags successively introduced thereinto with pattern cavities facing down, means in said machine for advancing each received drag to a second station, apparatus at said second station for supplying said machine with core boxes successively introduced thereinto with each core box carrying a core facing up from the box, mechanism in said machine for bringing each received core box together with an earlier received drag and rolling the pair over and advancing the pair to a third station and then separating the inverted core box from the rolled over drag thereby leaving the core in and facing up from the pattern cavity of the drag, a device at said third station for withdrawing from the machine each inverted core box that has been separated from its associated core and drag as aforesaid, apparatus also at said third station for turning each withdrawn core box over preparatory to a return thereof to the apparatus at said second station, and means responsive to delivery by said machine of each inverted core box to said third station for initiating activation of said withdrawing device and of said turnover apparatus.

37. In combination with a mold assembling machine into which drags are successively introduced at a first station and into which core boxes are successively introduced at a second station and within which each received core box is brought together with an earlier received drag and rolled over therewith and then separated therefrom, apparatus at a third station for withdrawing each so separated core box from said machine and for turning the core box over in a way which interchanges the two box ends, said apparatus comprising a turnover table adapted to receive a core box therein, pivotal mounting means for said table permitting arcuate movement thereof around a turn-over axis between a box-receiving position adjacent the assembling machine and a turn-over position on the other side of said axis away from the machine, a manipulator device mounted on said table along with a carriage movable by the device between an extended position and a withdrawn position, a latch on said carriage adapted to engage a core box within the machine at said third station when the carriage travels to its said extended position with the table in said box-receiving position and to pull the core box out of the machine into said table when the carriage thereafter travels to its said withdrawn position, and a turn-over motor coupled with said table and adapted to move it arcuately about said axis from said box-receiving position to said turned-over position and vice versa.

38. In combination with a mold assembling machine into which drags are successively introduced at a first station and into which core boxes are successively introduced at a second station and within which each received core box is brought together with an earlier received drag and rolled over therewith and then separated therefrom, core box withdrawing and turn over apparatus at a third station comprising a turn-over table adapted to receive a core box therein, pivotal mounting means for said table permitting arcuate movement thereof around a turnover axis between a box-receiving position adjacent the assembling machine and a turned-over position on the other side of the axis away from the machine, a manipulator device mounted on said table along with a carriage movable by the device between an extended position and a withdrawn position, a latch on said carriage adapted to engage a core box within the machine at said third station when the carriage travels to its said extended position with the table in said box receiving position and to pull the core box out of the machine into said table when the carriage thereafter travels to its said withdrawn position, a turn-over motor coupled with said table and adapted to move it arcuately about said axis from said box-receiving position to said turned-over position and vice versa, and an ejector member on said carriage adapted to engage each core box which is drawn into said table and to push that box out of the table when the carriage travels to its said extended position with the table in said turned-over position.

39. In an installation comprising a mold assembling machine into which core boxes are successively introduced at one station and rolled over in the machine and delivered thereby to another station, the combination at said other station of a turn-over table adapted to receive a core box therein; pivotal mounting means for said table permitting movement thereof around a turn-over axis back and forth through an up-over-down arcuate path between a generally horizontal box-receiving position adjacent the assembling machine and a generally horizontal turned-over position on the other side of the axis away from the machine; a manipulator device mounted on said table along with a carriage movable by the device between an extended position and a withdrawn position; a latch on said carriage suspended therefrom by gravity and adapted to hook behind a core box within the machine at said other station when the carriage travels to its said extended position with the table in said box-receiving position and to pull the core box out of the machine into said table when the carriage thereafter travels to its said withdrawn position, said latch being further adapted to drop by gravity out of register with the core box within said table when the table subsequently is moved through said up-over-down arcuate path from its box-receiving position adjacent the machine to its said turned-over position away from the machine; and an ejector member on said carriage adapted to engage each core box which is drawn into the table as aforesaid and to push that box out of the table past said dropped-out latch when the carriage travels to its said extended position with the table in said turned-over position.

40. In an installation comprising a mold assembling machine into which core boxes are successively introduced at one station and rolled over in the machine and delivered thereby to another station, the combination at said other station of a turn-over table adapted to receive a core box therein, pivotal mounting means for said table permitting arcuate movement thereof around a turn-over axis between a box-receiving position adjacent the assembling machine and a turned-over position away from the machine, a carriage device on said table adapted when the table is in said box-receiving position to reach into the machine and engage a core box and withdraw same from the machine into the table, a turn-over motor coupled with said table and adapted to rotate the table from its said box-receiving position to its said turned-over position and vice versa, means effective following each delivery by the assembling machine of a rolled-over core box to said other station for activating said motor in a first sense causing it then to bring the table to said box-receiving position, and means effective following each withdrawal by said carriage device of a core box from the machine into said table for activating said motor in a second sense causing it then to bring the table and core box to said turned-over position.

41. In an installation comprising a mold assembling machine into which core boxes are successively introduced at one station and rolled over in the machine and delivered thereby to another station, the combination at said other station of a turn-over table adapted to receive a core box therein, pivotal mounting means for said table permitting arcuate movement thereof around a turn-over axis between a box-receiving position adjacent the assembling machine and a turned-over position away from the machine, a carriage device on said table adapted when the table is in said box-receiving position to reach into the machine and engage a core box and withdraw same from the machine into the table, a hydraulic turn-over motor coupled with said table and adapted to rotate the table to its said box-receiving position when pressure fluid is admitted into a first port of the motor and to the table's said turned-over position when pressure fluid is admitted into a second port of the motor, means effective following each delivery by the assembling machine of a rolled-over core box to said other station for supplying said first motor port with pressure fluid which brings the table to said box-receiving position, and means effective following each withdrawal by said carriage device of a core box from the machine into said table for supplying said second motor port with pressure fluid which brings the table and core box to said turned-over position.

42. In an installation comprising a mold assembling machine into which drags are successively introduced at a first station and into which cores in core boxes are successively introduced at a second station and respectively rolled over with the drags that then receive the cores from the boxes and from which machine the empty core boxes are withdrawn at a third station, said machine including a rotatable turret provided with means for indexing the turret through the angular distance between station locations following each reception by the machine of a drag and core-carrying core box accompanied by withdrawal of an empty core box from the machine, the combination at said third station of a device for accomplishing the said withdrawal from the machine of each empty core box that is brought therein to said third station and of cooperating apparatus for turning each withdrawn core box over in a way which interchanges the two box ends, and an interlocking circuit organized to permit said turret indexing means to be activated only after an empty core box has been withdrawn from the assembling machine by said device and fully turned over as aforesaid by the apparatus at said third station.

43. In an installation for assembling molds, the combination with an assembling machine of apparatus at a first station for supplying said machine with drags successively introduced thereinto with pattern cavities initially facing down, means in said machine for advancing each received drag to a second station, apparatus at said second station for supplying said machine with core boxes successively introduced thereinto with each box carrying a core formed in the box and facing up therefrom, mechanism in said machine for bringing each received core box together with an earlier received drag and rolling the pair over and advancing the pair to a third station and then separating the inverted core box from the rolled-over drag thereby leaving the core in and facing up from the pattern cavity of the drag, a device at said third station for withdrawing from the machine each inverted core box that has been separated from its associated core and drag as aforesaid, apparatus also at said third station for turning each withdrawn core box over in a way which interchanges the two box ends, and means cooperating with said third station apparatus and including a track for returning each so turned-over core box to the aforesaid second station in proper position to have another core formed therein by the said apparatus at the second station.

44. In an installation comprising a mold assembling machine, a core station and a core-box-off station cooperating with said machine, apparatus at said core station for successively introducing core boxes into said machine, and mechanism in said machine for rolling each received core box over and advancing it to said core-box-off station, the combination at said core-box-off station of a device for withdrawing each rolled-over core box from the machine and of cooperating apparatus for turning each withdrawn core box over with the two ends thereof interchanged, a gravity track inclining downwardly from said core-box-off station apparatus to the location of said core station apparatus, and ejector means included in said core-box-off station apparatus for pushing each of said turned-over core boxes onto the entrance and of said track for return under the action of gravity via that track to said core station apparatus.

45. In an installation comprising a mold assembling machine, a core station and a core-box-off station cooperating with said machine, apparatus at said core station for successively introducing into said machine core boxes with cores therein, and mechanism in said machine for rolling each received core box over and delivering it empty to said core-box-off station, the combination at said core-box-off station of a device for withdrawing each empty core box from the machine and of cooperating apparatus for turning each withdrawn core box over with the two ends thereof interchanged, a track external to said machine and leading from said core-box-off station apparatus to the location of said core station apparatus, means comprised by said core-box-off station apparatus for pushing each of said turned-over core boxes onto the entrance end of said track for returning along that track to said core station apparatus, and facilities included in said core station apparatus for receiving each empty core box from the track and forming a core therein and then introducing that box and core into the assembling machine in the manner aforesaid.

46. In an installation comprising a mold assembling machine, the combination of first, second and third stations cooperating with said machine, apparatus at said first station for supplying said machine with drags successively introduced thereinto with pattern cavities facing down, means in said machine for advancing each received drag to said second station apparatus at said second station, for successively forming cores in core boxes and successively introducing those core boxes into said machine with the core in each box facing up therefrom, mechanism in said machine for bringing each received core box together with an earlier received drag and rolling the pair over and advancing the pair to said third station and then separating the inverted core box from the rolled over drag thereby leaving the core in the pattern cavity of the drag, a device at said third station for withdrawing from the machine each inverted core box that has been separated from its associated core and drag as aforesaid, apparatus also at said third station for turning each withdrawn core box over with ends interchanged, a track leading from said third station apparatus to the aforesaid core-forming apparatus at said second station, ejector means included in said third station apparatus for pushing each empty core box withdrawn from the machine and turned over as aforesaid onto said track for return therealong to said second station apparatus, and core processing means included in said second station apparatus for receiving each core box delivered thereto by said track and forming a core therein and then introducing that box and core into the assembling machine in the manner aforesaid.

47. In an installation comprising a mold assembling machine into which drags are successively introduced at one station and rolled over in the machine and into which copes are successively introduced at another station and respectively brought together with rolled over drags to form assembled molds and from which machine the assembled molds are successively withdrawn at a further station, the combination of apparatus at said other station for there introducing each of said copes into the machine with pattern impression facing down, said apparatus comprising means for receiving empty cope flasks and charging each with sand in which the pattern impression is made, a carriage for transferring each cope from said charging means to said assembling machine, means for moving said carriage between a normally withdrawn position and an extended position, a latch on said carriage adapted to push a sand-charged cope into the assembling machine when the carriage travels to said extended position and to engage another sand-charged cope when the carriage returns to said withdrawn position, means responsive to placement of said machine in readiness to receive a sand-charged cope for initiating advancement of said carriage to said extended position, and means responsive to arrival by said carriage at said extended position for causing return of the carriage to said withdrawn position.

48. In an installation comprising a mold assembling machine into which drags are successively introduced at one station and rolled over in the machine and into which copes are successively introduced at another station and respectively brought together with rolled-over drags to form assembled molds and from which machine the assembled molds are successively withdrawn at a further station, said machine including a rotatable turret provided with means for indexing the turret through the angular distance between station locations following each reception by the machine of a drag and a cope accompanied by discharge of an assembled mold, the combination at said other station of means for receiving empty cope flasks and charging each with sand in which the pattern impression is made, means including a carriage for transferring each cope from said charging means to said assembling machine, and an interlocking circuit organized to permit said turret indexing means to be activated only after a sand-charged cope has been fully inserted into the assembling machine by the aforesaid transfer carriage at said other station.

49. In an installation comprising a mold assembling machine into which drags are successively introduced at one station and rolled over in the machine and into which copes are successively introduced at another station and each brought together with a rolled-over drag to form an assembled mold that is carried by the machine to a further station, the combination of apparatus at said further station for withdrawing from the machine each of the said assembled molds arriving thereat, said apparatus comprising a carriage, means for moving said carriage between a normally withdrawn position and an extended position, a latch on said carriage adapted to engage an assembled mold within the machine when the carriage travels to said extended position and to pull the engaged mold out of the machine when the carriage travels to said withdrawn position, means responsive to delivery by the machine of an assembled mold to said further station for initiating advancement of said carriage to said extended position, and means responsive to arrival by said carriage at said extended position for causing return of the carriage to said withdrawn position.

50. In an installation comprising a mold assembling machine into which drags are successively introduced at one station and rolled over in the machine and into which copes are successively introduced at another station and each brought together with a rolled over drag to form an assembled mold that is carried by the machine to a further station, the combination of apparatus at said further station for withdrawing from the machine each of the assembled molds arriving thereat, said apparatus comprising a receiving platform adapted to accommodate at least two withdrawn molds, a carriage movable lengthwise of said platform, means for moving said carriage between a normally withdrawn position and an extended position, first and second latches on said carriage adapted upon travel of the carriage to said extended position respectively to engage an assembled mold within the machine and an assembled mold previously withdrawn from the machine onto said platform at the machine-adjoining end thereof, said first and second latches being further adapted upon travel of the carriage to said withdrawn position respectively to pull the mold engaged by the first latch out of the machine and to move the mold engaged by the second latch along said platform to the machine-removed end thereof, means responsive to delivery by the machine of an assembled mold to said further station for initiating advancement of said carriage to said extended position, and means responsive to arrival by said carriage at said extended position for causing return of the carriage to said withdrawn position.

51. In an installation comprising a mold assembling machine into which drags are successively introduced at one station and rolled over in the machine and into which copes are successively introduced at another station and each brought together with a rolled-over drag to form an assembled mold that is carried by the machine to a further station, said machine including a rotatable turret provided with means for indexing the turret through the angular distance between station locations following each reception by the machine of a drag and a cope, the combination of apparatus at said further station for withdrawing from the machine each of the said assembled molds arriving thereat, said apparatus comprising a mold receiving platform, a carriage, means for moving said carriage between a normally withdrawn position and an extended position, a latch on said carriage adapted to engage an assembled mold within the machine when the carriage travels to said extended position and to pull the engaged mold out of the machine onto said platform when the carriage travels to said withdrawn position, and an interlocking circuit organized to permit said turret indexing means to be activated only after an assembled mold has been fully withdrawn from the assembling machine onto said platform in the manner aforesaid.

52. In an installation for assembling molds, the combination of a central assembling machine having a rotatable turret; drag, cope and mold-off operating stations successively spaced around said machine at positions with which the machine turret is adapted successively to register upon rotative advancement in a given direction; indexing means for producing said given direction of rotative advancement; apparatus at said drag station for successively inserting into the machine when in register therewith sand-charged drag flasks with pattern cavities facing down; means forming a part of said machine for rolling over each thus inserted drag thereby facing the pattern cavity of the drag up; apparatus at said cope station for successively inserting into the machine sand-charged copes spaced above the rolled over drags and with pattern cavities facing down; means forming a part of said machine operative to bring each cope upon a drag therebeneath; apparatus at said mold-off station for successively withdrawing from the machine the assembled molds; a continuous track encircling said central assembling machine and the cooperating apparatus at the aforesaid three stations therearound; mold cars on said track coupled into a continuous train and each adapted to have placed thereon one of the assembled molds as taken from the central machine at the mold-off station; and means for moving said train of cars around the track in a direction opposite to said given direction of rotation of said central machine turret.

53. In an installation for assembling molds, the combination of a central assembling machine having a turret adapted to be rotatively indexed in a given direction; apparatus at a first or drag station along the turret periphery's rotative path for supplying said machine with drags successively introduced thereinto with pattern cavities facing down; apparatus at a second or core station succeeding said first station along said path for supplying said machine with core boxes successively introduced thereinto with each box carrying a core facing up from the box; means in said machine for bringing each received core box together with an earlier received drag and rolling the pair over and then separating the inverted core box from the rolled over drag thereby leaving the core in and facing up from the pattern cavity of the drag; apparatus at a third or core-box-off station succeeding said second station along said path for withdrawing from the machine each inverted core box that has been separated from its associated core and drag as aforesaid and for turning the core box over and then returning it to the aforesaid core station; apparatus at a fourth or cope station succeeding said third station along said path for supplying said machine with copes successively introduced thereinto with pattern cavities facing down; means in said machine for bringing each received cope upon one of the aforesaid rolled-over drags and over the core now in the drag cavity; apparatus at a fifth or mold-off station succeeding said fourth station along said path for withdrawing from said machine each assembled mold made up of a drag, core and cope brought together as aforesaid; a continuous track encircling said central assembling machine and said cooperating apparatus at the aforesaid five stations therearound; mold cars on said track coupled into a continuous train and each adapted to have placed thereon one of the assembled molds as taken from the central machine at the mold-off station; and means for moving said train of cars around the track in a direction opposite to said given-direction rotation of said central machine turret whereby the assembled molds placed on the cars adjacent the mold-off station in readiness for pouring travel with the cars towards and adjacent said cope station thus facilitating removal after pouring of the cope flasks for repassage via said cope station apparatus into said central assembling machine and whereby the drags with their poured castings thereafter remaining on the cars further travel with the cars away from the cope station thus facilitating a taking of the castings out of the drags during such further travel and whereby the drag flasks thereafter remaining on the cars still further travel with the cars towards and adjacent said drag station thus facilitating removal of the drag flasks for repassage via said drag station apparatus into said central assembling machine, which latter removal empties the cars before they move still further on towards and adjacent the aforesaid mold-off station.

54. In mold assembling apparatus, the combination of mechanism for receiving mold flasks and for turning each received flask over around a horizontal axis parallel to the lengthwise axis of the flask from a first or flask-received position of the mechanism to a second or flask-inverted position of the mechanism, said mechanism comprising left and right side members that face each other in opposed relationship and that are spaced apart by the width of a mold flask to be received with those spaced members being parallel and fixedly mounted one relative to the other and being horizontally disposed when the mechanism occupies said first position, upper and lower rows of rollers disposed along the inner face of each of said opposed left and right side members with the two roller rows thus carried by each of those left and right side members being vertically spaced to receive and accommodate therebetween and provide both top and bottom support for left and right side support bars of the aforesaid mold flask whereby such flask and its side support bars can be slid endwise in direction along the lengthwise axis of both flask and bars between the mechanism's said left and right side members with each of the left and right side support bars of the flask occupying the space between the upper and the lower roller rows along the side member engaged and with full and complete support for each so inserted mold flask being imparted thereto through such side bar engagement and being derived solely from said left and right side members, and means for rotating said mechanism around its aforesaid horizontal axis parallel to said lengthwise axis of the inserted flask from said first position to said second position and from said second position to said first position, and supporting means opposite said mold flask receiving mechanism for supporting said flasks and for inserting them lengthwise into said left and right side members of that flask receiving mechanism when same occupies its aforementioned first position.

55. In mold assembling apparatus, the combination of mechanism for receiving a drag flask with pattern cavity facing down and for further receiving beneath the drag a core box with carried core facing up and for thereafter turning said received drag and core box over around a horizontal axis from a first or flask-received position of the mechanism to a second or flask-inverted position of the mechanism, said mechanism comprising upper and lower sets of left and right side members that face each other with the members in both the upper set and the lower set being horizontally disposed when the mechanism occupies said first position and with said left and right members in said upper set being spaced apart horizontally by the dimension of a drag flask to be received and with said left and right members in said lower set also being spaced apart by the dimension of a core box to be received, said left and right side members in the upper set having opposed inner face means comprising upper and lower rows of rollers arranged to engage and support left and right support bars of the aforesaid drag flask whereby such flask and its support bars can be slid between those upper left and right side members with each of the left and right support bars of the drag occupying the space between said upper and lower roller rows along the side member engaged, said left and right side members in the lower set having opposed inner face means comprising upper and lower rows of rollers arranged to engage and support left and right support bars of the aforesaid core box whereby such core box and its support bars can be slid between those lower left and right side members with each of the left and right support bars of the box occupying the space between said upper and lower roller rows along the side member engaged, and means for rotating said mechanism around its aforesaid horizontal axis from said first position to said second position and from said second position to said first position.

56. In apparatus for assembling flask components into complete molds, the combination of mechanism having upper and lower arm sets which extend in a generally horizontal direction and each of which arm sets comprises left and right side members that face each other and that are spaced apart by the width of mold flasks to be received, said left and right side members of each arm set having inner face means arranged to engage and support left and right side support bars of a received mold flask when that flask with its support bars is inserted endwise between said left and right side members of the arm set, support means for said arm mechanism mounting same in a way that permits roll over of the entire mechanism assemblage about a generally horizontal axis substantially parallel to the aforesaid direction in which said upper and lower sets of flask-receiving arms extend, means for imparting rollover movements to said mechanism assemblage, and means effective to move the mechanism's said upper and lower sets of flask-receiving arms towards and away from each other.

57. In mold assembling apparatus, the combination of an arm head, means mounting said head to permit rollover thereof about a generally horizontal axis, upper and lower flask-receiving arms extending from said head in directions substantially parallel to each other and to said rollover axis, each of said upper and lower arms comprising left and right side members that face each other and that are spaced apart by the width of mold flasks to be received, said left and right side members of each arm having inner face means arranged to engage and support left and right side support bars of a received mold flask when that flask with its side bars is inserted endwise between said left and right side members of the arm, means for imparting rollover movements to said head assemblage, and means effective to move the head's said upper and lower flask-receiving arms toward and away from each other.

References Cited in the file of this patent

UNITED STATES PATENTS

| | | |
|---|---|---|
| 1,512,721 | Sutton | Oct. 21, 1924 |
| 1,570,658 | Wickland et al. | Jan. 26, 1926 |
| 1,722,371 | Feltes | July 30, 1929 |
| 1,757,226 | Smith et al. | May 6, 1930 |
| 1,765,021 | McWane | Aug. 17, 1930 |
| 1,879,393 | Miller | Sept. 27, 1932 |
| 2,049,967 | Luton | Aug. 4, 1936 |
| 2,112,830 | Corbin | Apr. 5, 1938 |
| 2,229,492 | Christensen et al. | Jan. 21, 1941 |
| 2,325,501 | Gedris | July 27, 1943 |
| 2,396,936 | Wylie | Mar. 19, 1946 |
| 2,424,252 | Orlando | July 22, 1947 |
| 2,438,218 | Johnston | Mar. 23, 1948 |
| 2,525,572 | Woody et al. | Oct. 10, 1950 |
| 2,545,799 | Snow | Mar. 20, 1951 |
| 2,624,084 | Row | Jan. 6, 1953 |
| 2,627,335 | Gedris | Feb. 5, 1953 |

FOREIGN PATENTS

| | | |
|---|---|---|
| 252,668 | Great Britain | Apr. 22, 1927 |
| 615,205 | Great Britain | Dec. 10, 1948 |